US012811181B2

(12) United States Patent
Yushin et al.

(10) Patent No.: US 12,811,181 B2
(45) Date of Patent: Nov. 24, 2026

(54) LITHIUM-ION BATTERY WITH ANODE COMPRISING BLEND OF INTERCALATION-TYPE ANODE MATERIAL AND CONVERSION-TYPE ANODE MATERIAL

(71) Applicant: Sila Nanotechnologies Inc., Alameda, CA (US)

(72) Inventors: Gleb Yushin, Atlanta, GA (US); Adam Kajdos, Alameda, CA (US); Valentin Lulevich, Oakland, CA (US); Nicholas Ingle, El Cerrito, CA (US); Kostiantyn Turcheniuk, Oakland, CA (US)

(73) Assignee: Sila Nanotechnologies, Inc., Alameda, CA (US)

( * ) Notice: Subject to any disclaimer, the term of this patent is extended or adjusted under 35 U.S.C. 154(b) by 0 days.

(21) Appl. No.: 17/222,017

(22) Filed: Apr. 5, 2021

(65) Prior Publication Data

US 2021/0313617 A1 Oct. 7, 2021

Related U.S. Application Data

(60) Provisional application No. 63/005,044, filed on Apr. 3, 2020.

(51) Int. Cl.
*H01M 10/0525* (2010.01)
*H01M 4/02* (2006.01)
(Continued)

(52) U.S. Cl.
CPC ....... *H01M 10/0525* (2013.01); *H01M 4/386* (2013.01); *H01M 4/505* (2013.01);
(Continued)

(58) Field of Classification Search
None
See application file for complete search history.

(56) References Cited

U.S. PATENT DOCUMENTS

| | | | | |
|---|---|---|---|---|
| 10,424,786 | B1 * | 9/2019 | Mason | H01M 4/133 |
| 2002/0164479 | A1 * | 11/2002 | Matsubara | H01M 4/362 428/408 |

(Continued)

FOREIGN PATENT DOCUMENTS

| | | | |
|---|---|---|---|
| CN | 107204438 | A | 9/2017 |
| JP | 2009212074 | A | 9/2009 |

(Continued)

OTHER PUBLICATIONS

Wang, W., Favors, Z., Ionescu, R. et al. Monodisperse Porous Silicon Spheres as Anode Materials for Lithium Ion Batteries. Sci Rep 5, 8781 (2015) (Year: 2015).*

(Continued)

*Primary Examiner* — Daniel S Gatewood
(74) *Attorney, Agent, or Firm* — MUNCY GEISSLER OLDS & LOWE P.C.; Daniel Podhajny

(57) ABSTRACT

An aspect is directed to a Li-ion battery, comprising anode and cathode electrode, an electrolyte ionically coupling the anode and the cathode electrodes, and a separator electrically separating the anode and the cathode electrodes, wherein the anode electrode comprises a mixture of conversion-type anode material and intercalation-type anode material, wherein the conversion-type anode material exhibits its median specific reversible capacity in the range from about 1400 mAh/g to about 2200 mAh/g, and wherein the conversion-type anode material exhibits first cycle coulombic efficiency in the range from about 88% to about 96%.

26 Claims, 10 Drawing Sheets

(51) Int. Cl.

| | |
|---|---|
| ***H01M 4/38*** | (2006.01) |
| ***H01M 4/505*** | (2010.01) |
| ***H01M 4/525*** | (2010.01) |
| ***H01M 4/583*** | (2010.01) |
| ***H01M 4/62*** | (2006.01) |
| ***H01M 10/0568*** | (2010.01) |
| ***H01M 10/0569*** | (2010.01) |

(52) U.S. Cl.

CPC ........... *H01M 4/525* (2013.01); *H01M 4/583* (2013.01); *H01M 4/622* (2013.01); *H01M 10/0568* (2013.01); *H01M 10/0569* (2013.01); *H01M 2004/021* (2013.01); *H01M 2300/0028* (2013.01)

(56) References Cited

U.S. PATENT DOCUMENTS

| | | | | |
|---|---|---|---|---|
| 2012/0007560 | A1* | 1/2012 | Smart | H01M 4/525 429/188 |
| 2012/0202112 | A1* | 8/2012 | Yushin | H01M 10/0525 429/246 |
| 2014/0193712 | A1 | 7/2014 | Yushin et al. | |
| 2015/0099187 | A1* | 4/2015 | Cui | H01M 4/366 429/209 |
| 2017/0170477 | A1* | 6/2017 | Sakshaug | H01M 4/386 |
| 2019/0081359 | A1 | 3/2019 | Yushin et al. | |
| 2019/0123339 | A1 | 4/2019 | Yushin et al. | |
| 2020/0020935 | A1* | 1/2020 | Costantino | C01B 33/029 |
| 2020/0044241 | A1* | 2/2020 | Gigler | H01M 4/1395 |
| 2020/0127277 | A1* | 4/2020 | Lu | H01M 4/387 |

FOREIGN PATENT DOCUMENTS

| | | | |
|---|---|---|---|
| JP | 2019526915 | A | 9/2019 |
| KR | 20170136855 | A | 12/2017 |
| KR | 20190077319 | A | 7/2019 |
| WO | WO2013183524 | A1 | 12/2013 |
| WO | WO2019107990 | A1 | 6/2019 |

OTHER PUBLICATIONS

Hwa et al.: “High capacity and rate capability of coreshell structured nano-Si/C anode for Li-ion batteries”, Electrochimica Acta, Elsevier, Amsterdam, NL, vol. 71, Mar. 27, 2012 (Mar. 27, 2012), pp. 201-205, XP028421985, ISSN: 0013-4686, DOI: 10.1016/J. ELECT ACT A.2012.03.138.

Ashuri et al.: “Silicon as a potential anode material for Li-ion batteries: where size, geometry and structure matter”, Nanoscale, vol. 8, No. 1, Jan. 1, 2016 (Jan. 1, 2016), pp. 74-103, XP055818027, United Kingdom ISSN: 2040-3364, DOI: 10.1039/C5NR05116A.

Wang et al. : “Rice husk derived carbon-silica composites as anodes for lithium ion batteries”, RSC Adv., vol. 4, No. 110, Jan. 1, 2014 (Jan. 1, 2014), pp. 64744-64746, XP055818024, DOI: 10.1039/C4RA09627D.

Cancado, L. “Measuring the absolute Raman cross section of nanographites as a function of laser energy and crystallite size,” Physical Review B 76, 064304-7 (2007).

Sato, K. “D-band Raman intensity of graphitic materials as a function of laser energy and crystallite size,” Chemical Physics Letters 427 117-121 (2006).

Pimenta, M. “Studying Disorder in Graphite-Based Systems by Raman Spectroscopy,” Phys. Chem. Chem. Phys., 2007, 9, 1276-1291.

* cited by examiner

LITHIUM-ION BATTERY WITH ANODE COMPRISING BLEND OF INTERCALATION-TYPE ANODE MATERIAL AND CONVERSION-TYPE ANODE MATERIAL

CROSS-REFERENCE TO RELATED APPLICATIONS

The present application for patent claims the benefit of U.S. Provisional Application No. 63/005,044, entitled "LITHIUM-ION BATTERY ANODES COMPRISING BLENDS OF INTERCALATION-TYPE CARBONACEOUS ANODE MATERIALS AND CONVERSION-TYPE ANODE MATERIALS AND COMPOSITIONS OF BATTERY CELLS COMPRISING SAME," filed Apr. 3, 2020, which is expressly incorporated herein by reference in its entirety.

BACKGROUND

Field

Embodiments of the present disclosure relate generally to energy storage devices, and more particularly to battery technology and the like.

Background

Owing in part to their relatively high energy densities, relatively high specific energy, light weight, and potential for long lifetimes, advanced rechargeable batteries are desirable for a wide range of wearables, portable consumer electronics, electric vehicles, grid storage, aerospace and other important applications.

However, despite the increasing commercial prevalence of conventional rechargeable Li-ion batteries, further development of these batteries is needed, particularly for potential applications in battery-powered ground, sea and aerial transportation (including unmanned or self-driving vehicles), consumer electronics, drones and aerospace applications, among others. Fabrication of anodes with high specific and volumetric capacities, sufficiently low irreversible Li losses during the formation cycles, long cycle life, stable performance at both low and elevated temperatures, ability to provide fast charging and high rate performance is important for reducing battery cost and increasing volumetric and gravimetric battery energy densities. Unfortunately, conventional routes to produce such electrodes typically fail to achieve the desired performance characteristics, often require excessive efforts and costs, and often exhibit undesirably low rate performance and stability.

Accordingly, there remains a need for improved battery cells, components, and other related materials and manufacturing processes.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a Li-ion battery includes anode and cathode electrodes; an electrolyte ionically coupling the anode and the cathode electrodes; and a separator electrically separating the anode and the cathode electrodes; wherein the anode electrode comprises a mixture of conversion-type anode material and intercalation-type anode material, wherein the conversion-type anode material exhibits median specific reversible capacity in the range from about 1400 mAh/g to about 2200 mAh/g, and wherein the conversion-type anode material exhibits first cycle coulombic efficiency in the range from about 88% to about 96%.

In some aspects, the conversion-type anode material comprises from about 40 wt. % to about 60 wt. % Si.

In some aspects, the conversion-type anode material comprises a core-shell nanocomposite particle.

In some aspects, an average thickness of an outer shell in the core-shell nanocomposite particle ranges from about 1 nm to about 20 nm.

In some aspects, the conversion-type anode material comprises one or more internal pores inaccessible to the electrolyte.

In some aspects, a volume of the one or more internal pores ranges from about 0.1 to about 1 cm3/g.

In some aspects, an average size of the one or more internal pores ranges from about 1 nm to about 50 nm.

In some aspects, the conversion-type anode material exhibits density in the range from about 1 to about 2 g/cm$^3$.

In some aspects, the conversion-type anode material exhibits specific surface area in the range from about 1 to about 25 m$^2$/g.

In some aspects, the conversion-type anode material comprises Si-comprising nanoparticles having volume-averaged size in the range from about 2 nm to about 40 nm.

In some aspects, the conversion-type anode material comprises less than about 2 wt. % oxygen (O).

In some aspects, the conversion-type anode material comprises less than about 0.5 wt. % hydrogen (H).

In some aspects, the conversion-type anode material comprises from about 6 wt. % to about 60 wt. % carbon (C).

In some aspects, the conversion-type anode material exhibits a core-shell structure, wherein a shell of the core-shell structure comprises sp2-bonded carbon.

In some aspects, a ratio of intensities of Raman D-band to Raman G-band (ID/IG) is in the range from about 0.7 to about 2 when recorded on the conversion-type anode material while arranged as a powder using a Raman spectrometer equipped with a laser operating at a wavelength of around 532 nm.

In some aspects, the anode electrode, the cathode electrode, or both, exhibits reversible areal capacity in the range from about 3 to about 4.5 mAh/cm$^2$ or from about 4.5 to about 8 mAh/cm$^2$.

In some aspects, the anode electrode, the cathode electrode, or both, exhibits reversible areal capacity in the range from about 3 to about 4.5 mAh/cm$^2$ or from about 4.5 to about 8 mAh/cm$^2$.

In some aspects, the anode electrode comprises soft carbon, hard carbon, synthetic graphite, natural graphite.

In some aspects, the anode electrode, excluding any current collector foil component, exhibit a density in the range from about 1.2 g/cm$^3$ to about 1.8 g/cm$^3$.

In some aspects, the anode electrode comprises a polymer or co-polymer binder.

In some aspects, the anode electrode, excluding any current collector foil component, comprises from about 2 wt. % to about 7 wt. % of the polymer or co-polymer binder.

In some aspects, the polymer or co-polymer binder comprises alginic acid and their various salts, polyacrylic acid (PAA) or its salts, carboxymethyl cellulose (CMC), alginic acid of its salts, styrene-butadiene rubber (SBR), or a combination thereof.

In some aspects, the cathode electrode comprises intercalation-type cathode material that includes Ni, Co, Mn, Fe, or a combination thereof.

In some aspects, the electrolyte comprises both one or more esters and one or more cyclic carbonates.

In some aspects, the volume fraction of the one or more esters ranges from about 20 vol. % to about 90 vol. % as a fraction of all solvents in the electrolyte.

In some aspects, the one or more esters comprise one or more branched esters, and the one or more branched esters comprise ester molecules that have on average between around 5 and around 7 carbon (C) atoms per molecule.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Figure 1:
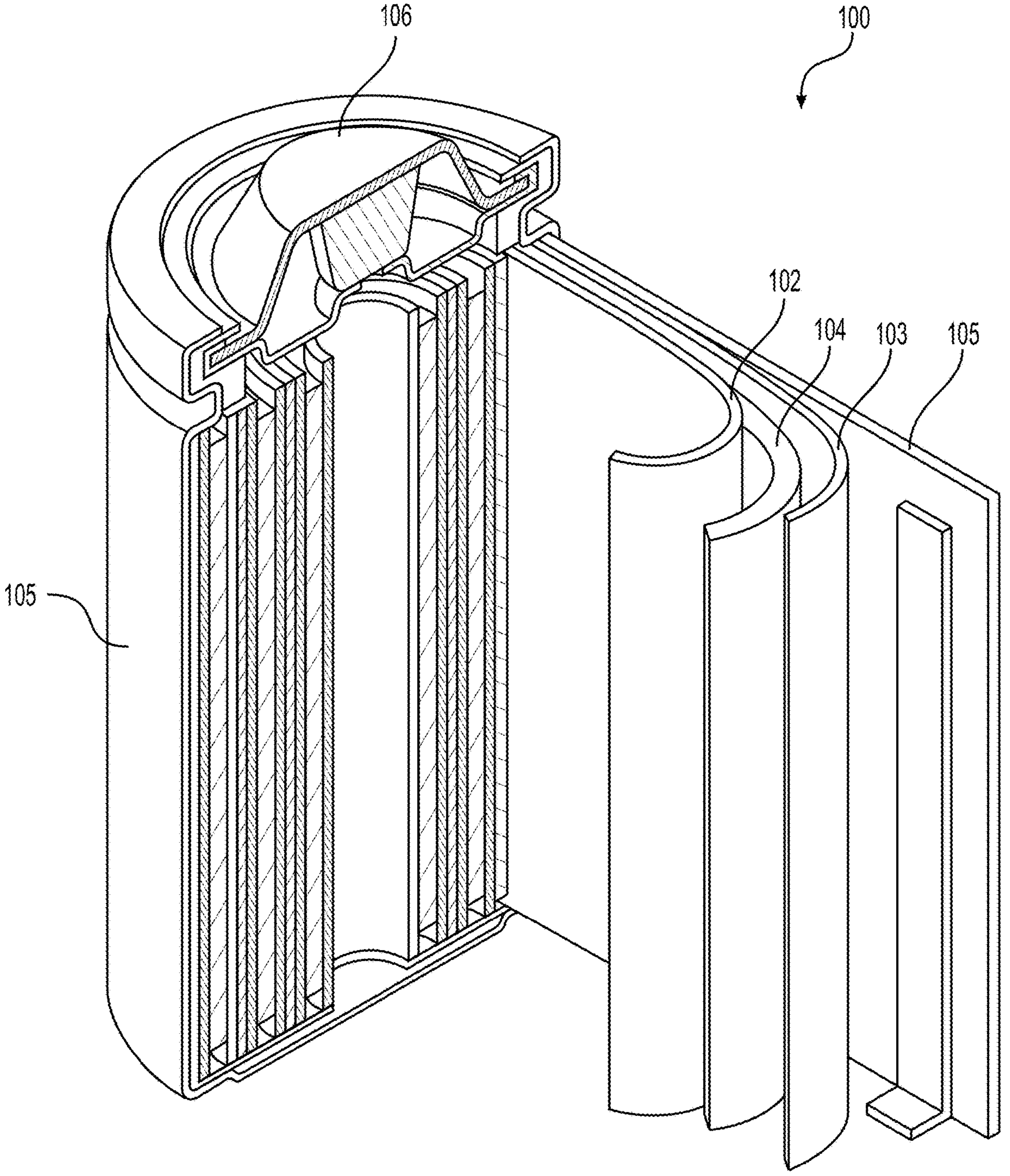
FIG. 1 illustrates an example (e.g., Li-ion) battery in which the components, materials, methods, and other techniques described herein, or combinations thereof, may be applied according to various embodiments.

Aspects of the present invention are disclosed in the following description and related drawings directed to specific embodiments of the invention. The term "embodiments of the invention" does not require that all embodiments of the invention include the discussed feature, advantage(s), process(es), or mode(s) of operation, and alternate embodiments may be devised without departing from the scope of the invention. Additionally, well-known elements of the invention may not be described in detail or may be omitted so as not to obscure other, more relevant details.

While the description below may describe certain examples in the context of rechargeable and primary Li and Li-ion batteries (for brevity and convenience, and because of the current popularity of Li technology), it will be appreciated that various aspects may be applicable to other rechargeable and primary batteries (such as Na-ion, Mg-ion, K-ion, Ca-ion, Al-ion and other metal-ion batteries, anion-ion (e.g., F-ion) batteries, dual ion batteries, alkaline batteries, acid batteries, solid state batteries, etc.) as well as electrochemical capacitors (including double layer capacitors and so-called supercapacitors) with various electrolytes and various hybrid devices (e.g., where one electrode is a battery-like and another one is a supercapacitor-like).

While the description below may describe certain examples of the material formulations for several specific types of cathode or anode materials, it will be appreciated that various aspects may be applicable to various other electrode materials.

While the description below may describe certain embodiments in the context of preparation of porous electrodes comprising specific polymer or co-polymer binder(s), it will be appreciated that various aspects may be applicable to porous electrodes comprising other types of binder(s) or mixture(s) of binders or not comprising binder at all.

While the description below may describe certain embodiments in the context of preparation of porous electrodes comprising specific conductive additive(s), it will be appreciated that various aspects may be applicable to porous electrodes comprising other types of additives(s) or mixture(s) of additives or not comprising conductive additives at all.

Any numerical range described herein with respect to any embodiment of the present invention is intended not only to define the upper and lower bounds of the associated numerical range, but also as an implicit disclosure of each discrete value within that range in units or increments that are consistent with the level of precision by which the upper and lower bounds are characterized. For example, a numerical distance range from 50 μm to 1200 μm (i.e., a level of precision in units or increments of ones) encompasses (in μm) a set of [50, 51, 52, 43, . . . , 1199, 1200], as if the intervening numbers 51 through 1199 in units or increments of ones were expressly disclosed. In another example, a numerical percentage range from 0.01% to 10.00% (i.e., a level of precision in units or increments of hundredths) encompasses (in %) a set of [0.01, 0.02, 0.03, . . . , 9.99, 10.00], as if the intervening numbers between 0.02 and 9.99 in units or increments of hundredths were expressly disclosed. Hence, any of the intervening numbers encompassed by any disclosed numerical range are intended to be interpreted as if those intervening numbers had been disclosed expressly, and any such intervening number may thereby constitute its own upper and/or lower bound of a sub-range that falls inside of the broader range. Each sub-range (e.g., each range that includes at least one intervening number from the broader range as an upper and/or lower bound) is thereby intended to be interpreted as being implicitly disclosed by virtue of the express disclosure of the broader range.

Below, reference is made to battery electrode compositions comprising particles at various stages. For example, after their manufacture, electrode particles (e.g., anode active material particles, cathode active material particles, etc.) may be arranged as a dry powder, where individual particles are free-moving. Later, these dry powder particles may be mixed with solvent(s), binder(s) and/or other materials to form a slurry (e.g., in a liquid or substantially liquid phase). The slurry may then be casted (e.g., onto a current collector) to form an electrode, and then dried. Once casted as an electrode, the electrode particles are bound together via the binder(s) and are no longer free-moving, although the particles may still move somewhat during battery operation due to active material expansion, etc.

FIG. 1 illustrates an example metal-ion (e.g., Li-ion) battery 100 in which the components, materials, methods, and other techniques described herein, or combinations thereof, may be applied according to various embodiments. A cylindrical battery is shown here for illustration purposes, but other types of arrangements, including prismatic, coin-shaped or pouch (laminate-type) batteries, may also be used as desired. The example battery 100 includes a negative anode 102, a positive cathode 103, a separator 104 interposed between the anode 102 and the cathode 103, an electrolyte (not shown) impregnating the separator 104, a battery case 105, and a sealing member 106 sealing the battery case 105.

Conventional electrodes utilized in Li-ion batteries may be produced by (i) formation of a slurry comprising active materials, conductive additives, binder solutions and, in some cases, surfactant or other functional additives; (ii) casting the slurry onto a metal foil (e.g., Cu foil for most Li-ion battery anodes and Al foil for most Li-ion battery cathodes); (iii) drying the casted electrodes to completely evaporate the solvent; and (iv) calendering (densification) of the dried electrodes by uniform pressure rolling.

Cylindrical and other batteries may be produced by (i) assembling/stacking (or rolling into so-called jellyroll) the anode/separator/cathode/separator sandwich; (ii) inserting the stack (or jellyroll) into the battery housing (casing); (iii) filling electrolyte into the pores of the electrodes and the separator (and also into the remaining areas of the casing)—often under vacuum; (iv) pre-sealing the battery cell (often under vacuum); (v) conducting so-called "formation" cycle(s) where the battery is slowly charged and discharged (e.g., one or more times); (vi) removing formed gases, sealing the cell and shipping to customers.

Both liquid and solid electrolytes may be used for the designs herein. Exemplary electrolytes for Li-based batteries of this type may be composed of a single Li salt (such as $LiPF_6$ for Li-ion batteries) in a mixture of organic solvents (such as a mixture of carbonates). Other suitable organic solvents include nitriles, esters, sulfones, sulfoxides, phosphorous-based solvents, silicon-based solvents, ethers, and others. In some designs, such solvents may be modified (e.g., be sulfonated or fluorinated). In some designs, the electrolytes may also comprise ionic liquids (in some designs, neutral ionic liquids; in other designs, acidic and basic ionic liquids). In some designs, the electrolytes may also comprise mixtures of various salts (e.g., mixtures of several Li salts or mixtures of Li and non-Li salts for rechargeable Li and Li-ion batteries).

The most common salt used in a Li-ion battery electrolyte, for example, is $LiPF_6$, while less common salts include lithium tetrafluoroborate ($LiBF_4$), lithium perchlorate ($LiClO_4$), lithium bis(oxalato)borate ($LiB(C_2O_4)_2$, lithium difluoro(oxalate)borate ($LiBF_2(C_2O_4)$), various lithium imides (such as $SO_2FN^-(Li^+)SO_2F$, $CF_3SO_2N^-(Li^+)SO_2CF_3$, $CF_3CF_2SO_2N^-(Li^+)SO_2CF_3$, $CF_3CF_2SO_2N^-(Li^+)SO_2CF_2CF_3$, $CF_3SO_2N^-(Li^+)SO_2CF_2OCF_3$, $CF_3OCF_2SO_2N^-(Li^+)SO_2CF_2OCF_3$, $C_6F_5SO_2N^-(Li^+)SO_2CF_3$, $C_6F_5SO_2N^-(Li^+)SO_2C_6F_5$ or $CF_3SO_2N^-(Li^+)SO_2PhCF_3$, and others), and others. Electrolytes for Na-ion, Mg-ion, K-ion, Ca-ion, and Al-ion batteries are often more exotic as these batteries are in earlier stages of development. In some designs, such electrolytes may comprise different salts and solvents (in some cases, ionic liquids may replace organic solvents for certain applications).

Certain conventional cathode materials utilized in Li-ion batteries are of an intercalation-type. In such cathodes, metal ions are intercalated into and occupy the interstitial positions of such materials during the charge or discharge of a battery. Such cathodes use intercalation-type active material as the exclusive active material type (i.e., no convention-type active material) and experience very small volume changes during operation (cycling). Such cathodes also may exhibit high density (e.g., about 3.8-6 g/cm$^3$). Illustrative examples of such intercalation-type cathodes include but are not limited to lithium cobalt oxide (LCO), lithium nickel cobalt aluminum oxide (NCA), lithium nickel manganese cobalt oxide (NMC), lithium nickel manganese cobalt aluminum oxide (NMCA), lithium manganese oxide (LMO), lithium nickel oxide (LNO), lithium metal (e.g., iron (Fe or "F") or manganese (Mn or "M") or mixed) phosphate (e.g., LMP such as lithium iron phosphate (LFP) or lithium manganese iron phosphate (LMFP)), lithium metal silicates ($Li_2MSiO_4$), various other intercalation cathode materials including those that comprise surface coatings or exhibit gradient composition within individual particles, among others and their various mixtures. Polyvinylidene fluoride, or polyvinylidene difluoride (PVDF), is the most common binder used in these electrodes. Carbon black and carbon nanotubes are the most common conductive additive used.

Conversion-type (including displacement-type, chemical transformation-type, true conversion-type, etc.) cathode materials for rechargeable Li-ion or Li batteries may offer higher energy density, higher specific energy, or higher specific or volumetric capacities compared to intercalation-type cathode materials. For example, fluoride-based cathodes may offer outstanding technological potential due to their very high capacities, in some cases exceeding about 300 mAh/g (greater than about 1200 mAh/cm$^3$ at the electrode level). For example, in a Li-free state, $FeF_3$ offers a theoretical specific capacity of 712 mAh/g; $FeF_2$ offers a theoretical specific capacity of 571 mAh/g; $MnF_3$ offers a theoretical specific capacity of 719 mAh/g; $CuF_2$ offers a theoretical specific capacity of 528 mAh/g; $NiF_2$ offers a theoretical specific capacity of 554 mAh/g; $PbF_2$ offers a theoretical specific capacity of 219 mAh/g; $BiF_3$ offers a theoretical specific capacity of 302 mAh/g; $BiF_5$ offers a theoretical specific capacity of 441 mAh/g; $SnF_2$ offers a theoretical specific capacity of 342 mAh/g; $SnF_4$ offers a theoretical specific capacity of 551 mAh/g; $SbF_3$ offers a theoretical specific capacity of 450 mAh/g; $SbF_5$ offers a theoretical specific capacity of 618 mAh/g; $CdF_2$ offers a theoretical specific capacity of 356 mAh/g; and $ZnF_2$ offers a theoretical specific capacity of 519 mAh/g. Mixtures (for example, in the form of alloys) of fluorides may offer a theoretical capacity approximately calculated according to the rule of mixtures. In some designs, the use of mixed metal fluorides may sometimes be advantageous (e.g., may offer higher rates, lower resistance, higher practical capacity, or longer stability). In a fully lithiated state, metal fluorides convert to a composite comprising a mixture of metal and LiF clusters (or nanoparticles). Examples of the overall reversible reactions of the conversion-type metal fluoride cathodes may include $2Li^+CuF_2 \leftrightarrow 2LiF+Cu$ for $CuF_2$-based cathodes or $3Li^+FeF_3 \leftrightarrow 3LiF+Fe$ for $FeF_3$-based cathodes). It will be appreciated that metal fluoride-based cathodes may be prepared in both Li-free or partially lithiated or fully lithiated states.

Another example of a promising conversion-type Li-ion battery cathode (or, in some cases, anode) material is sulfur (S) (in a Li-free state) or lithium sulfide ($Li_2S$, in a fully lithiated state). In order to reduce dissolution of active material during cycling, to improve electrical conductivity, or to improve mechanical stability of S/$Li_2S$ electrodes in some designs, one may advantageously utilize porous S, $Li_2S$, porous S—C (nano)composites, $Li_2S$—C(nano)composites, $Li_2S$-metal oxide (nano)composites, $Li_2S$—C-metal oxide (nano)composites, $Li_2S$—C-metal sulfide (nano)composites, $Li_2S$-metal sulfide (nano)composites, $Li_2S$—C-mixed metal oxide (nano)composites, $Li_2S$—C-mixed metal sulfide (nano)composites, porous S-polymer (nano)composites, or other composites or (nano)composites comprising S or $Li_2S$, or both. In some designs, such (nano)composites may advantageously comprise conductive carbon. In some designs, such (nano)composites may advantageously comprise metal oxides or mixed metal oxides. In some designs, such (nano)composites may advantageously comprise metal sulfides or mixed metal sulfides. In some examples, mixed metal oxides or mixed metal sulfides may comprise lithium metal. In some examples, mixed metal oxides may comprise titanium metal. In some examples, lithium-comprising metal oxides or metal sulfides may exhibit a layered structure. In some examples, metal oxides or mixed metal oxides or metal sulfides or mixed metal sulfides may advantageously be both ionically and electrically conductive. In some examples, various other intercalation-type active materials may be utilized instead of or in addition to metal oxides or metal sulfides. In some designs, such an intercalation-type active material exhibits charge storage (e.g., Li insertion/extraction capacity) in the potential range close to that of S or $Li_2S$ (e.g., within about 1.5-3.8 V vs. $Li/Li^+$).

Unfortunately, many conversion-type electrodes used in Li-ion batteries suffer from performance limitations. Formation of (nano)composites may, at least partially, overcome such limitations. For example, (nano)composites in some designs may offer reduced voltage hysteresis, improved capacity utilization, improved rate performance, improved mechanical and sometimes improved electrochemical stability, reduced volume changes, and/or other positive attributes. Examples of such composite cathode materials include, but are not limited to, LiF—Cu—Fe—C nanocomposites, LiF—Ni—Fe—C nanocomposites, LiF—Mn—Fe—C nanocomposites, LiF—Ni—Mn—Fe—C nanocomposites, LiF—Cu—CuO—C nanocomposites, LiF—Ni—NiO—C nanocomposites, LiF—Cu—Fe—CuO—C nanocomposites, LiF—Ni—Fe—NiO—C nanocomposites, LiF—Cu—Fe—CuO—$Fe_2O_3$—C nanocomposites, LiF—Ni—Fe—NiO—$Fe_2O_3$—C nanocomposites, $FeF_2$—C nanocomposites, $FeF_2$—$Fe_2O_3$—C nanocomposites, $FeF_3$—C nanocomposites, $FeF_3$—$Fe_2O_3$—C nanocomposites, $CuF_2$—C nanocomposites, CuO—$CuF_2$—C nanocomposites, LiF—Cu—C nanocomposites, $NiF_2$—C nanocomposites, NiO—$NiF_2$—C nanocomposites, LiF—Ni—C nanocomposites, LiF—Cu—C-polymer nanocomposites, LiF—Fe—C-polymer nanocomposites, LiF—Ni—C-polymer nanocomposites, LiF—Cu—CuO—C-polymer nanocomposites, LiF—Fe—$Fe_2O_3$—C-polymer nanocomposites, LiF—Fe-metal-polymer nanocomposites, LiF—Fe-metal1-metal2-polymer nanocomposites, and many other porous nanocomposites comprising LiF, $FeF_3$, $FeF_2$, $MnF_3$, $CuF_2$, $NiF_2$, $PbF_2$, $BiF_3$, $BiF_5$, $CoF_2$, $SnF_2$, $SnF_4$, $SbF_3$, $SbF_5$, $CdF_2$, or $ZnF_2$, or other metal fluorides or oxyfluorides or their alloys or mixtures, or Fe, Mn, Cu, Ni, Pb, Bi, Co, Sn, Sb, Cd, Co, Zn or other metals or metal alloys, and optionally comprising metal oxides and their alloys or mixtures. In some examples, metal sulfides or mixed metal sulfides may be used instead of or in addition to metal oxides in such (nano)composites. In some examples, metal fluoride nanoparticles may be infiltrated into the pores of porous carbon (for example, into the pores of activated carbon particles) to form these metal-fluoride-C nanocomposites. In some examples, such composite particles may also comprise metal oxides (including mixed metal oxides or metal oxyfluorides or mixed metal oxyfluorides) or metal sulfides (including mixed metal sulfides). In some examples, mixed metal oxides or mixed metal sulfides may comprise lithium metal. In some examples, lithium-comprising metal oxides or metal sulfides may exhibit a layered structure. In some examples, metal oxides or mixed metal oxides or metal sulfides or mixed metal sulfides may advantageously be both ionically and electrically conductive.

In some examples, various intercalation-type active materials may be utilized instead of or in addition to metal oxides or metal sulfides or metal fluorides or oxyfluorides in the Li-ion battery cathodes. In some designs, such an intercalation-type active material may exhibit charge storage (e.g., Li insertion/extraction capacity) in the same potential range as metal fluorides or metal oxyfluorides or metal sulfides or other conversion-type active materials (e.g., if present in the same cathodes) or in the nearby potential range (e.g., within about 1.5-4.2 V vs. $Li/Li^+$). In some examples, such metal oxides may encase the metal fluorides or oxyfluorides or sulfides (or other suitable conversion-type cathodes) and advantageously prevent (or significantly reduce) direct contact of metal fluorides (or oxyfluorides or other conversion-type active materials) with liquid or gel-type or polymer-type electrolytes (e.g., in order to reduce or prevent metal corrosion and dissolution during cycling). In some examples, nanocomposite particles may comprise carbon shells or carbon coatings. In some designs, such a coating may enhance electrical conductivity of the particles and may also prevent (or help to reduce) undesirable direct contact of metal fluorides (or oxyfluorides or other conversion-type active materials) with liquid electrolytes. In some designs, such fluoride-comprising (nano)composite particles may be used in nonlithiated, fully lithiated and partially lithiated states.

Some conventional anode materials utilized in Li-ion batteries are also of an intercalation-type. The most common anode material in conventional intercalation-type Li-ion batteries is carbon, such as synthetic or natural graphite, soft or hard carbons or their various mixtures and others. PVDF, carboxymethyl cellulose (CMC), alginic acid and their various salts, polyacrylic acid (PAA) and their various salts are some of the most common binders used in these electrodes, although other binders may also be successfully used. Carbon black and carbon nanotubes are some of the most common conductive additive used in these electrodes.

Conversion-type (including alloying-type, displacement-type, chemical transformation-type, among others) anode materials for use in Li-ion batteries offer higher gravimetric and volumetric capacities compared to intercalation-type anodes. For example, silicon (Si) offers approximately 10 times higher gravimetric capacity and approximately 3 times higher volumetric capacity compared to an intercalation-type graphite (or graphite-like) anode. However, Si suffers from significant volume expansion during Li insertion (up to approximately 300 vol. %) and thus may induce thickness changes and mechanical failure of Si-comprising anodes in some designs. In addition, Si (and some Li—Si alloy compounds that may form during lithiation of Si) suffers from relatively low electrical conductivity and relatively low ionic (Li-ion) conductivity. Electronic and ionic conductivity of Si is lower than that of graphite. In some designs, formation of (nano)composite Si-comprising (nano)particles of various shapes and size or (nano)structured Si (including, but not limited to various Si-carbon composites, Si-metal composites, Si-polymer composites, Si-metal-polymer composites, Si-carbon-polymer composites, Si-metal-carbon-polymer composites, Si-ceramic composites, or other types of porous composites comprising nanostructured Si or nanostructured or nano-sized Si particles of various shapes and forms) and their combinations may reduce volume changes during Li-ion insertion and extraction, which, in turn, may lead to better cycle stability in rechargeable Li-ion cells. In addition to Si-comprising nanocomposite anodes, other examples of such nanocomposite anodes comprising alloying-type active materials include, but are not limited to, those that comprise germanium, antimony, aluminum, magnesium, zinc, gallium, arsenic, phosphorous, silver, cadmium, indium, tin, lead, bismuth, their various alloys, and others. In addition to (nano)composite anodes comprising alloying-type active materials, other interesting types of high capacity (nano)composite anodes may comprise metal oxides (including silicon oxide, lithium oxide, other metal oxides and suboxides, etc.), metal nitrides (including silicon nitride and other metal nitrides and sub-nitrides), metal phosphides (including lithium phosphide and other metal phosphides and sub-phosphides), metal hydrides (including metal hydrides), and others as well as their various mixtures, alloys and combinations. Such material compositions may also be doped by other elements in order to enhance their electrochemical performance or achieve other benefits.

As used here, a "blended" anode for Li-ion batteries refers to an anode that comprises a blend of active (Li-ion storing) materials, where at least one component of the blend comprises intercalation-type (e.g., carbonaceous) active material (such as natural or synthetic graphite, soft or hard carbon(s) or their various mixtures, among others) and at least one other component of the blend comprises conversion-type (including alloying type) active material.

In some designs, at least one intercalation-type component of the blend comprises (e.g., carbonaceous) active material contributes from around 20 wt. % to around 98 wt. % of all active materials in the blended anode.

In some designs, at least one conversion-type component of the blend comprises (e.g., carbonaceous) active material contributes from around 2 wt. % to around 80 wt. % of all active materials in the blended anode.

In some applications, in order to reduce the relative fraction of inactive materials (e.g., current collector foils, separators, etc.), it may be highly advantageous to produce high areal capacity loading of electrodes, which may advantageously range from about 4.0 to about 20.0 $mAh/cm^2$; in some designs from about 4.0 to about 7.0 $mAh/cm^2$; in some designs from about 7.0 to about 10.0 $mAh/cm^2$; in some designs from about 10.0 to about 20.0 $mAh/cm^2$. However, if purely intercalation-type (e.g., carbonaceous) anodes (graphite(s) or soft or hard carbons) are used in the design of Li-ion batteries with such high areal loadings, the typical thickness of the anodes becomes so high (e.g., about 70-350 microns) that the battery charging rate characteristics at suitable (for a given application) temperatures becomes reduced to undesirably low numbers (e.g., from about 40 min to about 2000 min or even more for charging from about 0 to about 80% state of charge (SoC) at near room temperature). One or more embodiments of the present disclosure relates to various routes to achieve substantially lower electrode thickness and substantially faster charging time for medium (e.g., about 1.0 to about 4.0 $mAh/cm^2$) and, most importantly, high (e.g., about 4.0 to about 20.0 $mAh/cm^2$) areal loadings. In some designs, some of such routes may advantageously involve the use of so-called blended anodes, comprising (i) at least one type of intercalation-type (e.g., carbonaceous) anode material particles (e.g., natural or synthetic graphite(s) or soft or hard carbons or their various mixtures) and (ii) at least one type of conversion-type (including alloying-type) anode material particles (e.g., those that comprise Si or Sn or Sb or Ge or Al or Mg or Zn or Ga or P or Ag or Cd or In or Pb or Bi or their various mixtures and alloys, as well as those that comprise oxides, nitrides, hydrides, phosphides and other metal-comprising compositions, including compositions with various dopings) that exhibit substantially higher volumetric capacity than the corresponding intercalation-type anode active materials. As previously mentioned, Si-comprising conversion-type (including alloying-type) anode particles are particularly attractive due to their higher specific capacity, abundance of Si and lower Si cost. In some designs, it may be preferable for the conversion-type (including alloying-type) active anode material particles of the blended anodes to comprise from about 50 to about 100 at. % Si as a fraction of all (non-carbon) metals and semi-metals in their composition. In some designs, it may be preferable for the conversion-type (including alloying-type) active anode material particles of the blended anodes to exhibit specific reversible capacities in the range from about 700 mAh/g to about 2800 mAh/g (in some designs, from about 1400-1500 mAh/g to about 2200 mAh/g; in some designs, from about 700 mAh/g to about 1200 mAh/g; in other designs from about 1200 mAh/g to about 1400 mAh/g; in other designs from about 1400 mAh/g to about 1500 mAh/g; in other designs from about 1500 mAh/g to about 1600 mAh/g; in other designs from about 1600 mAh/g to about 1700 mAh/g; in other designs from about 1700 mAh/g to about 1800 mAh/g; in other designs from about 1800 mAh/g to about 2200 mAh/g; in other designs, from about 2200 mAh/g to about 2800 mAh/g). In some designs, if a range of conversion-type active particles with different capacities are used in the design of blended anodes, it may be advantageous for the weight-average values of their specific reversible capacities to remain in the range from about 700 mAh/g to about 2800 mAh/g. Too high values of the weight-average specific capacity may induce undesirably fast degradation, particularly at elevated temperatures and in cells with the blended compositions comprising high fractions of conversion-type active materials (e.g., in excess of about 50-60% of specific capacities). In some designs, it may be preferable for the conversion-type (including alloying-type) active anode material particles of the blended anodes to exhibit first cycle coulombic efficiencies in the range from about 80% to about 98% (in some designs, from about 80% to about 85%; in other designs from about 85% to about 90%; in other designs from about 90% to about 93%; in other designs, from about 93% to about 98%). In some designs, if a variety of conversion-type active particles with different first cycle coulombic efficiencies is used in the design of blended anodes, it may be advantageous for the weight-average values of their first cycle coulombic efficiency to remain in the range from about 80% to about 98%. In some designs, it may be preferable for the conversion-type (including alloying-type) anode active material particles to comprise from about 20 to about 90 wt. % Si as a fraction of all the elements within such particles. In some designs, it may be preferable for the (e.g., blended) anodes to comprise from about 2 wt. % to about 74 wt. % Si as a fraction of the total weight of all the anode active materials (e.g., in the blend of active materials), including but not limited to graphite, carbon and all the components (including inactive component) of Si-comprising active conversion-type (incl. alloying-type) anode active particles (such as Si, Ge, Sn, Sb, Zn, H, C, S, P, O, N, Ca, Mg, Al, Ag, In, Bi, Pb, Fe, V, Sr, Ba, etc.).

In some designs, instead of pure conversion-type anode particles in the blend, one may utilize intercalation-type (e.g., carbonaceous) particles (e.g., graphite or graphite-like) with a conversion-type (e.g., Si-containing) material physically (and/or chemically) mixed with it or attached to it as a coating or particles on its surface or in its pore(s), thus forming composite particles exhibiting both intercalation and conversion electrochemical behaviors. In such cases, depending on the relative ratio of the weight fractions of the intercalation-type component and a conversion-type component of such composites as well as their corresponding capacities, the composite particles' (reversible) specific capacities may range from about 400 mAh/g to about 1400-1800 mAh/g (although higher values of up to about 2800 mAh/g may also be attained in some designs). In some designs, such mixed intercalation/conversion-type composite particles may preferably exhibit first cycle coulombic efficiency in the range from about 80% to about 98% (in some designs, more preferably from about 88% to about 98%). Such composite particles may similarly be mixed with intercalation-type (e.g., carbonaceous such as graphite or graphite-like) particles in order to form blended anodes.

The relative contributions of (i) intercalation-type carbonaceous active materials (e.g., graphite-comprising) and (ii) conversion-type (incl. alloying type) active materials (e.g., silicon-comprising) to the total volumetric capacity (capacity per unit volume) and the total specific (gravimetric) capacity (capacity per unit mass) of the blended anodes may vary, depending on the particular battery (e.g., Li-ion) application requirements as well as the properties of the corresponding active materials. For example, some conversion-type (e.g., silicon-comprising) anode materials may suffer from higher cost or higher volume changes during the first cycle or higher volume changes during subsequent cycles or larger first cycle losses or faster degradation or inferior performance at elevated temperatures or other inferior characteristics than the corresponding intercalation-type active materials (e.g., graphite-comprising). Some of such conversion-type (e.g., silicon-comprising) anode materials may similarly demand an undesirable component of the electrolyte in the battery designs in order to prevent gassing during high temperature storage (e.g., between about 60-80° C. battery storage in a charged state at, say, from about 70% to about 100% state of charge, SOC) or high temperature operation (e.g., between about 40-80° C.). In such and other cases, for example, it may be advantageous in some designs to use a smaller faction of conversion-type active materials in the blended anodes. In other designs, for example, it may be advantageous to use higher fraction of conversion-type active materials in the blended anodes in order to maximize their volumetric and gravimetric capacities. However, in most cases, it may be advantageous for the intercalation-type carbonaceous active materials (e.g., graphite) to comprise from about 50 wt. % to about 97 wt. % of the total weight of active materials in the blended anodes (so that the conversion-type active materials comprise from about 3 wt. % to about 50 wt. %; in some designs, from about 5 wt. % to about 25 wt. %) in a discharged, de-lithiated and often essentially Li-free state. In some designs, it may be advantageous for the intercalation-type (e.g., carbonaceous) active materials (e.g., graphite) to contribute from about 20 vol. % to about 90 vol. % of the total volume of the blended anode (in a fully expanded, fully charged, fully lithiated state) in some designs. In some designs, it may be advantageous for the intercalation-type carbonaceous active materials (e.g., graphite) to contribute to contribute from about 10% to about 85% of the total areal capacity loading of the blended anode (in the units of $mAh/cm^2$) so that the conversion-type (incl. alloying-type) active materials (e.g., silicon-comprising) contributes to a range from about 15% to about 90% of the total areal capacity of the blended anode. In some designs it may be advantageous for the intercalation-type carbonaceous active materials (e.g., graphite) to contribute from about 10% to about 85% of the total reversible capacity of the blended anode (in a discharged, de-lithiated and often essentially Li-free state). Accordingly, in such designs it may be advantageous for the conversion-type (incl. alloying-type) active materials (e.g., silicon-comprising) to contribute from about 15% to about 90% of the total reversible capacity of the blended anode (in a fully discharged, delithiated and often essentially Li-free state).

In some designs, the intercalation-type (e.g., carbonaceous) active material (e.g., graphite, such as natural or synthetic graphite or graphite-like material, among others or their combination) may be added into the blended anode not because of its better electrochemical stability relative to the conversion-type active material, but because of its higher deformability (e.g., during densification or calendering) or better thermal properties or reduced heat release during thermal runaway or other attributes that otherwise improve the performance of pure conversion-type (incl. alloying-type) active materials (e.g., silicon-comprising). In such cases, even a relatively small fraction of carbonaceous active materials (e.g., below about 30% of the areal capacity or below about 50 wt. %) may be advantageously added to form a blended anode, in some designs.

A broad range of conversion-type active materials may be utilized in the blended anodes. However, the authors identified that certain size distributions, certain density ranges, certain composition, certain surface properties, certain capacities and certain ranges of the volume changes during cycling of conversion-type (incl. alloying-type) anode material particles (or composite particles that comprise conversion-type active material) may be particularly advantageous for applications in Li-ion batteries with blended anodes.

In particular, high-capacity conversion-type (incl. alloying-type) anode powders (or mixture of powders, which may include composite particles that comprise conversion-type active material), which (i) exhibit moderately high average volume changes (e.g., between about 8-180 vol. %; in some cases between about 8-220 vol. %) during the first cycle, moderate average volume changes (e.g., between about 4-60 vol. %; in some cases between about 4-80 vol. %) during the subsequent charge-discharge cycles, (ii) an average size (e.g., average diameter) in the range from about 0.2 to about 40 microns (more preferably from about 0.3 to about 20 microns; in some designs preferably from about 1 to about 10 microns; in yet some designs preferably from about 2 to about 6 micron) and (iii) average specific surface area in the range from about 0.1 to about 100.0 $m^2/g$ (in some designs, more preferably from about 0.25 to about 25.0 $m^2/g$; in some designs from about 0.5 to about 10 $m^2/g$; in some designs from about 1 to about 5 $m^2/g$) may be particularly attractive for applications in blended anodes in terms of manufacturability and performance characteristics. In some designs, a near-spherical (or spheroidal) shape of these conversion-type active particles (or composite particles that comprise conversion-type active material) may additionally be attractive for optimizing rate performance and volumetric capacity of the blended anodes.

In addition, for many metal-ion (e.g., Li-ion) battery cell designs, it may be advantageous for the first cycle losses in blended anodes to range from about 1% to about 16% (in some designs, from about 1% to about 4%; in some designs, from about 4% to about 6%; in some designs, from about 6% to about 8%; in some designs, from about 8% to about 10%; in some designs, from about 10% to about 16%). Smaller first cycle losses in the Li-ion battery anodes are particularly advantageous for some designs when the Li-ion battery cathodes in the full cells exhibit smaller irreversible Li capacity (e.g., from about 0% to about 15%; in some designs from about 2% to about 10%). In general, the smaller irreversible capacity losses in the cathodes, the smaller is the preferred first cycle losses in the blended anodes. As such, depending on the first cycle losses in the intercalation-type (e.g., carbonaceous) materials (e.g., graphite or carbon or graphite mixtures; in some designs, in the first cycle such materials may experience irreversible Li capacity losses may range from about 2% to about 10%) and the fraction of the specific capacity contributed by the intercalation-type (e.g., carbonaceous) materials (e.g., from about 10% to about 80% of the total specific capacity of the blended anode) the ideal first cycle losses in the conversion-type material(s) would be determined by the cell designs (e.g., negative-to-positive electrode loading ratio, cathode properties including irreversible Li capacity, electrolyte composition, etc.).

Furthermore, as previously described, it may be particularly important in some applications for the blended anodes to attain the desirable performance characteristics in Li-ion batteries (e.g., close to ideal first cycle losses, sufficiently fast charging rate, sufficiently stable cycle performance in the desired temperature range, low gassing during high temperature storage in a charged state or high temperature cycling, low volume changes during cycling, low swelling till the end of life, etc.) when produced at moderate electrode capacity loadings (e.g., between about 1-4 $mAh/cm^2$) or preferably high electrode capacity loadings (e.g., between about 4-20 $mAh/cm^2$). Attaining a combination of such properties in the blended anodes may be challenging at these loadings and is not trivial, particularly for water-based (or water-compatible) slurry processing. For example, conventionally used conversion-type anode materials for the blended anodes may suffer from high first cycle losses (e.g., in the range from about 20 to about 40%), irreversible growth of the surface area in contact with the electrolyte, instability of the solid electrolyte interphase (SEI) layer and the resulting losses of cycling Li ions, faster degradation, undesirably high volume changes during cycling, undesirably high swelling at the end of life and other undesirable properties, which limits their suitable weight fractions to about 2-5 wt. % (in some special designs up to 10 wt. %) (relatively to the total weight of active materials in the blended anodes) and their specific capacity contribution to about 5-40% and in many cases undesirably prevent their use in pouch cells (limit their used for hard case prismatic and cylindrical cells) or at loadings in excess of about 3-6.5 $mAh/cm^2$. One or more embodiments of the present disclosure are directed to (at least partially) overcoming at least some (or all) of the limitations of such blended anodes, achieve performance beyond what is known or shown by the conventional state-of-the-art and attain one, two or more of the following characteristics: (i) longer cycle life (for the same or higher wt. fraction of conversion active materials in the blended anodes), (ii) higher wt. % of conversion-type active materials (e.g., in the range of about 5-50 wt. % and/or their corresponding specific capacity contribution in the range to about 10-80% of the total capacity in the blended anodes for the same of higher cycle life); (iii) lower battery swelling till end of life (for the same or higher wt. fraction of conversion active materials or the same or higher specific capacity contribution); (iv) higher areal capacity loading (e.g., about 4-20 $mAh/cm^2$) for the same or better charging rate or cycle life; (v) ability to use in pouch (soft-case) cells; (vi) lower first cycle losses (for the same or higher wt. fraction of conversion-type active materials); (vii) higher specific capacity (for the same cycle life); (viii) lower gassing during high temperature (e.g., about 60-80° C.) storage at about 80-100% SOC (for the or higher wt. fraction of conversion-type active materials or for the same or higher specific capacity contribution of conversion-type anode materials) in Li-ion batteries.

Different architectures of the high-capacity conversion-type (incl. alloying-type) anode powders may be advantageously used in the blended metal-ion (e.g., Li-ion) battery anode designs in accordance with one or more embodiments of the present disclosure.

In some designs, high-capacity conversion-type (incl. alloying-type) anode powders may comprise porous composite comprising a plurality of agglomerated nanocomposites, wherein each of the nanocomposites comprises (i) either (i.a) a dendritic particle comprising a three-dimensional, randomly-ordered assembly of nanoparticles of a non-carbon Group 4A element (such as Si, Sn and others) or other metals that form electrochemical alloys with Li) or mixture thereof or (i.b) a dendritic particle comprising a three-dimensional, randomly-ordered assembly of nanoparticles (of various shapes, including but not limited to nanoflakes, nanofibers, elongated or elliptical or near-spherical nanoparticles) of carbon or a conductive polymer decorated with nanoparticles of a non-carbon Group 4A element (such as Si, Sn and others) or other metals that form electrochemical alloys with Li); and (ii) a coating of electrically conductive material deposited on a surface of the dendritic particle, wherein each of the nanocomposites has at least a portion of the dendritic particle in electrical communication with at least a portion of a dendritic particle of an adjacent nanocomposite in the plurality of agglomerated nanocomposites. In some designs, such a porous composite may further comprise (iii) a Li-ion permeable layer disposed on at least a portion of a surface of the agglomerated nanocomposites, wherein the lithium-ion permeable layer forms a total pore volume within the porous composite that has a range of about 0.5 to about 3 times the volume occupied by the non-carbon Group 4A element in the porous composite. In some designs, a coating of the electrically conductive material or the Li-ion permeable layer may comprise a carbon or a polymer. In some designs, a significant portion (e.g., about 50-100%; preferably from about 90% to about 100%) of the pore volume within the porous composite is not accessible by the electrolyte solvent in the assembled cell. In some designs, the total volume fraction of all the pores in the porous composite may range from around 10 vol. % to around 70 vol. % (for example, in some designs, from around 10 vol. % to around 20 vol. %; in other designs from around 20 vol. % to around 30 vol. %; in other designs from around 30 vol. % to around 40 vol. %; in other designs from around 40 vol. % to around 50 vol. %; in other designs from around 50 vol. % to around 60 vol. %; in other designs from around 60 vol. % to around 70 vol. %). In some designs, the total volume of all the pores (including closed and open pores) in the porous composite may range from around 0.07 $cm^3/g$ to around 1.3 $cm^3/g$ (for example, in some designs, from around 0.07 $cm^3/g$ to around 0.1 $cm^3/g$; in other designs, from around 0.1 $cm^3/g$ to around 0.2 cm3/g; in other designs, from around 0.2 $cm^3/g$ to around 0.3 $cm^3/g$; in other designs, from around 0.3 $cm^3/g$ to around 0.4 $cm^3/g$; in other designs, from around 0.4 $cm^3/g$ to around 0.5 $cm^3/g$; in other designs, from around 0.5 $cm^3/g$ to around 0.6 $cm^3/g$; in other designs, from around 0.6 $cm^3/g$ to around 0.7 $cm^3/g$; in other designs, from around 0.7 $cm^3/g$ to around 0.8 $cm^3/g$; in other designs, from around 0.8 $cm^3/g$ to around 0.9 $cm^3/g$; in other designs, from around 0.9 $cm^3/g$ to around 1.0 $cm^3/g$; in other designs, from around 1.0 $cm^3/g$ to around 1.1 $cm^3/g$;

in other designs, from around 1.1 $cm^3/g$ to around 1.2 $cm^3/g$; in other designs, from around 1.1 $cm^3/g$ to around 1.3 $cm^3/g$). Both too large of a pore volume and too small of a pore volume may lead to undesirably fast degradation or otherwise inferior performance of the anode (such as a blended anode). In some designs, the average size of nanoparticles (of a non-carbon Group 4A element such as Si and others or other metals that form electrochemical alloys with Li or mixture thereof) in such composite may range from about 2 nm to about 250 nm. In some designs, the average size of the pores in the porous composite comprising a plurality of agglomerated nanocomposites and not accessible by electrolyte solvent may range from about 0.5 nm to about 100 nm. In some designs, a portion of the pores (e.g., about 10 vol. % or more) may be of slit shape or near-slit shape. In some designs, the porous composite comprising a plurality of agglomerated nanocomposites may comprise from about 2 at. % to about 82 at. % of $sp^2$-bonded carbon. In some designs, the porous composite comprising a plurality of agglomerated nanocomposites may comprise from about 0.5 wt. % to about 25 wt. % of a polymer (which may be at least partially carbonized in some designs). In some designs, it may be preferable for the porous composite particles to comprise from about 20 wt. % to about 90 wt. % Si as a fraction of the total weight of such particles. In some designs, it may be preferable for the porous composite particles to comprise from about 10 at. % to about 80 at. % Si as a fraction of all the elements within such particles. In some designs, it may be preferable for the porous composite particles to comprise from about 2 at. % to about 84 at. % C as a fraction of all the elements within such particles. In some designs, it may be preferable for the (nano)composite particles to comprise less than about 1-5 wt. % O as a fraction of all the elements within such particles. In some designs, it may be preferable for the (nano)composite particles to comprise less than about 2-10 wt. % nitrogen (N) as a fraction of all the elements within such particles.

Multiple suitable techniques may be used to determine porosity or pore volume of porous materials or components. In many cases, the pore size distribution of open pores may suggest the most suitable technique to measure the total pore volume (e.g., as measured in $g/cm^3$). Pores are commonly divided into three categories, depending on the pore size: (i) micropores (<2 nm); (ii) mesopores (2-50 nm) and (iii) macropores (>50 nm). For example, by collecting the gas sorption isotherms (e.g., nitrogen sorption isotherms or argon sorption isotherms—measuring the gas adsorbed as a function of relative pressures at constant temperature, such as 77K, is very common for collecting nitrogen or argon sorption isotherms) one may effectively measure the volume of open micropores, mesopores and small macropores (commonly <100-200 nm). The technique commonly assumes certain average density of the adsorbed gases. In most cases, such density is assumed to approximately be the density of the liquified gas at the sorption-collected temperature. By measuring the total amount (e.g., mass) of the gas (e.g., nitrogen gas) adsorbed in the pores at around 0.99 atm. pressure (e.g., at gas liquefaction or boiling temperature at atmospheric pressure, such as 77K in case of nitrogen) and knowing gas density one may calculate the total volume of the pores (volume of adsorbed gas is approximated to be the volume of the pores). This volume (e.g., measured in $cm^3$) may be approximated to be mass of the adsorbed nitrogen divided by the density of the liquid nitrogen. The specific pore volume (measured in $cm^3/g$) may then be calculated by dividing the measured pore volume (in $cm^3$) by the mass of the porous adsorbent (in g). In order to calculate the porosity (in %) one may need to know the approximate density of the solid in the porous adsorbent. For example, if the porous material comprises a porous carbon one may need to assume the "true" density of solid carbon (often approximated as around 2 $g/cm^3$). For example, if the specific pore volume of the porous carbon powder is measured as 0.5 $cm^3/g$ one may estimate its porosity as 50% because the volume occupied by 1 g of a solid carbon would also be ½=0.5 $cm^3$. For solids with open pores larger than about 3-6 nm one may use so-called mercury porosimetry. Mercury porosimeter generates high pressures and measures simultaneously both the pressure and volume of mercury taken up by a porous material. In mercury porosimetry, an apparatus is used to evacuate the porous sample (e.g., by applying vacuum) and then to surround the sample with mercury. By measuring the volume taken up by the pores one can similarly measure the pore volume and porosity of the porous solids. However, mercury commonly cannot penetrate the smallest pores at reasonable pressures (commonly 207 MPa (30,000 psia) or 414 MPa, depending on the mercury porosimetry system used) and such volume may be excluded from the measurements. Mercury porosimetry may be used on both powders and bulk objects (e.g., separators or electrodes) to calculate the total pore volume. In addition, total (open and closed) porosity of bulk objects (e.g., separators or electrodes in both $cm^3/g$ units or in %) may also be determined by measuring their mass and outer volume (e.g., thickness and area), if one knows the weight fraction of each component of the object and approximate density of such components. The volume of closed pores may be estimated from the measurements of the open pore volume (assuming the total pore volume is known or could be estimated based on the density measurements). The density may be measured using liquid or gas (e.g., nitrogen or argon) pycnometry, where the volume of the material (e.g., powder or bulk) is determined by the volume of the gas it displaces (aka Archimedes method). This technique may be most suitable for materials not comprising open micropores (to avoid gas or liquid condensation in such small pores).

In some designs, high-capacity conversion-type (incl. alloying-type) anode powders may exhibit a core-shell composite architecture, wherein such composites may comprise (i) an active material (such as a non-carbon Group 4A element such as Si and others or other metals that form electrochemical alloys with Li or mixture thereof) provided to store and release Li ions during battery operation, whereby the storing and releasing of the metal ions causes a substantial (e.g., about 40-400%) change in volume of the active material; (ii) a collapsible core disposed in combination with the active material to accommodate the changes in volume (e.g., as used herein, a collapsible core refers to a core that undergoes permanent and irreversible plastic or inelastic deformation during one or more formation cycles so as to define pore space that can accommodate active material expansion during subsequent cycles without undergoing deformation); and (iii) a shell at least partially (e.g., as used herein, "at least partially" means partially or fully) encasing the active material and the core, the shell being formed from a material that is substantially permeable to the Li ions stored and released by the active material. In some designs, the collapsible core is formed from a porous material that absorbs the changes in volume via a plurality of open or closed pores (e.g., which may be defined in part by active material expansion during one or more formation cycles). In some designs, the porous material of the core may comprise a porous and electrically conductive (e.g., $sp^2$-bonded) carbon material or a conductive polymer. In some designs, the active material may be interspersed with the porous material of the core. In some designs, a core may be formed as a monolithic particle. In some designs, the porous material may comprise a porous substrate formed of one or more curved linear or planar backbones (which may be inter-penetrating, in some designs). In some designs, the average pore size of the porous material in the core may range from about 0.5 nm to about 50 nm (in some designs, from about 0.5 nm to about 10 nm). In some designs, a significant portion of the pores (e.g., about 20-100 vol. %) may advantageously be of slit shape or near-slit shape. In some designs, the collapsible core may additionally comprise one, two or more voids (larger pores), which may be in a direct contact with the active material. In some designs, the average size of the void(s) may range from about 10 nm to about 100 nm. In some designs, the shape of at least a significant portion (e.g., about 20-100 vol. %) of the void(s) may be near-spherical or elliptical. In some designs, the total volume fraction of all the pores (including voids) in such core-shell composite particles may range from around 10 vol. % to around 70 vol. % (for example, in some designs, from around 10 vol. % to around 20 vol. %; in other designs from around 20 vol. % to around 30 vol. %; in other designs from around 30 vol. % to around 40 vol. %; in other designs from around 40 vol. % to around 50 vol. %; in other designs from around 50 vol. % to around 60 vol. %; in other designs from around 60 vol. % to around 70 vol. %). In some designs, the total volume of all the pores (including voids) in such core-shell composite particles may range from around 0.07 $cm^3/g$ to around 1.3 $cm^3/g$ (for example, in some designs, from around 0.07 $cm^3/g$ to around 0.1 $cm^3/g$; in other designs, from around 0.1 $cm^3/g$ to around 0.2 $cm^3/g$; in other designs, from around 0.2 $cm^3/g$ to around 0.3 $cm^3/g$; in other designs, from around 0.3 $cm^3/g$ to around 0.4 $cm^3/g$; in other designs, from around 0.4 $cm^3/g$ to around 0.5 $cm^3/g$; in other designs, from around 0.5 $cm^3/g$ to around 0.6 $cm^3/g$; in other designs, from around 0.6 $cm^3/g$ to around 0.7 $cm^3/g$; in other designs, from around 0.7 $cm^3/g$ to around 0.8 $cm^3/g$; in other designs, from around 0.8 $cm^3/g$ to around 0.9 $cm^3/g$; in other designs, from around 0.9 $cm^3/g$ to around 1.0 $cm^3/g$; in other designs, from around 1.0 $cm^3/g$ to around 1.1 $cm^3/g$; in other designs, from around 1.1 $cm^3/g$ to around 1.2 $cm^3/g$; in other designs, from around 1.1 $cm^3/g$ to around 1.3 $cm^3/g$). Both too large of a pore volume and too small of a pore volume may lead to undesirably fast degradation or otherwise inferior performance of the anode (such as a blended anode).

In some designs, the shell in the core-shell particles may comprise a protective coating at least partially encasing the active material and the core to prevent oxidation of the active material. In some designs, the shell may comprise a porous coating at least partially encasing the active material and the core, the porous coating having a plurality of open or closed pores to further accommodate changes in volume. In some designs, at least a portion of such pores in the porous core material and/or the porous coating may be filled with a filler material. In some designs, such a filler material may comprise carbon. In some designs, at least a portion of such a shell material may be deposited by a chemical vapor deposition (CVD). In some designs, at least a portion of such a shell material may be deposited by an atomic layer deposition (ALD). In some designs, the shell may be a composite material comprising an inner layer and an outer layer, and may optionally comprise one or more intervening layers. In some designs, the inner layer is one of a protective coating layer or a porous coating layer, and the outer layer is the other of the protective coating layer or the porous coating layer. In some designs, at least a portion of the shell may comprise a CVD deposited $sp^2$-bonded carbon. In some designs, at least a portion of the shell may comprise a polymer layer (in some designs, CVD deposited polymer). In some designs, one or more of the core-shell composite particles may comprise from about 2 at. % to about 82 at. % of $sp^2$-bonded carbon as a fraction of all elements in the respective composite particle(s). In some designs, the core-shell composite may comprise from about 0.5 wt. % to about 25 wt. % of a polymer (which may be at least partially carbonized in some designs). In some designs, it may be preferable for one or more of the core-shell composite particles to comprise from about 20 wt. % to about 90 wt. % Si as a fraction of the total weight of such particle(s). In some designs, it may be preferable for one or more of the core-shell composite particles to comprise from about 10 at. % to about 70 at. % Si as a fraction of all the elements within such particle(s). In some designs, it may be preferable for one or more of the porous composite particles to comprise from about 2 at. % to about 84 at. % C as a fraction of all the elements within such particle(s). In some designs, it may be preferable for one or more of the (nano)composite particles to comprise less than about 1-5 wt. % O as a fraction of all the elements within such particle(s). In some designs, it may be preferable for one or more of the (nano)composite particles to comprise less than about 2-10 wt. % nitrogen (N) as a fraction of all the elements within such particle(s).

In some designs, high-capacity conversion-type (incl. alloying-type) anode powders may comprise (nano)composite particles, which comprise (i) active material provided to store and release ions during battery operation (e.g., a non-carbon Group 4A element (such as Si and others) or other metals that form electrochemical alloys with Li), whereby the storing and releasing of the ions causes a substantial change in volume of the active material (e.g., about 40 vol. % or more); and (ii) a porous, electrically-conductive scaffolding matrix within which the active material is disposed, wherein the scaffolding matrix structurally supports the active material, electrically interconnects the active material, and at least partially accommodates the changes in volume of the active material. In some designs, the porous scaffolding matrix may advantageously be a porous monolithic particle.

In some designs, each such (nano)composite particle may further comprise a shell at least partially encasing the active material and the scaffolding matrix, the shell being substantially permeable to the Li ions stored and released by the active material. In some designs, the shell may comprise a protective layer formed from a material that is substantially impermeable to electrolyte solvent molecules. In some designs, the shell may also comprise an active material layer, and wherein the active material disposed within the scaffolding matrix is formed from a first active material and the active material layer is formed from a second active material. In some designs, the first active material has a substantially higher capacity relative to the second active material. In some designs, the shell may comprise a porous layer having a smaller average pore size than the scaffolding matrix. In some designs, the active material disposed within the scaffolding matrix may be formed from a first active material, and at least some pores in the porous layer of the shell may be infiltrated with a second active material. In some designs, the shell may be a composite material comprising an inner layer and an outer layer. In some designs, the inner layer may be a porous layer having a smaller average pore size than the scaffolding matrix, and the outer layer may serve as (i) a protective layer formed from a material that is substantially impermeable to electrolyte solvent molecules and/or as (ii) an active material layer formed from an active material that is different from the active material disposed within the scaffolding matrix. In some designs, at least a portion of such a shell material may be deposited by CVD or ALD. In some designs, at least a portion of the shell may comprise a CVD deposited $sp^2$-bonded carbon. In some designs, at least a portion of the shell may comprise a polymer layer. In some designs, one or more of the composite particles may comprise an active material core about which the scaffolding matrix is disposed, whereby the active material disposed within the scaffolding matrix may be formed from a first active material and the active material core may be formed from a second active material. In some designs, the first active material may have a substantially higher capacity relative to the second active material. In some designs, each or some of the composite particles may comprise external channel pores extending from an outer surface of the scaffolding matrix towards the center of the scaffolding matrix, providing channels for faster diffusion of the ions into the active material disposed within the scaffolding matrix by reducing the average diffusion distance of the ions. In some designs, at least some of the external channel pores may be at least partially filled with (i) a porous material having a different microstructure than the scaffolding matrix, (ii) an active material that is different from the active material disposed within the scaffolding matrix, and/or (iii) a solid electrolyte material. In some designs, the change in volume of the volume-changing active material during battery operation exceeds a corresponding change in volume of the scaffolding matrix by more than about 100%. In some designs, the volume-changing active material may be in the form of the nanoparticles (or linked nanoparticles) of various shapes (e.g., in some designs of near-spherical or elliptical or pancake or small flake-shapes or elongated/fiber shaped, etc.). In some designs, the average size of such nanoparticles of the active material may range from about 3 nm to about 100 nm. In some designs, the volume-averaged characteristics pore size of the porous matrix material may range from about 0.5 nm to about 50 nm. In some designs, the surface area-averaged characteristics pore size of the porous matrix material may range from about 0.5 nm to about 50 nm. In some designs, a significant portion of the pores (e.g., about 20-100 vol. %) may advantageously be of slit shape or near-slit shape. In some designs, a portion of the pores (e.g., about 5-75 vol. %) may comprise a spherical or near-spherical pores with an average pore size about 2-to-100 times larger than an average slit-shaped or near-slit shaped pores. In some designs, a volume-changing active material may have a direct contact with such near-spherical pores. In some designs, the total (e.g., average) pore volume in the porous scaffolding matrix may range from around 20 vol. % to around 95 vol. % (for example, in some designs, from around 20 vol. % to around 30 vol. %; in other designs from around 30 vol. % to around 40 vol. %; in other designs from around 40 vol. % to around 50 vol. %; in other designs from around 50 vol. % to around 60 vol. %; in other designs from around 60 vol. % to around 70 vol. %; in other designs from around 70 vol. % to around 80 vol. %; in other designs from around 80 vol. % to around 90 vol. %; in other designs from around 90 vol. % to around 95 vol. %). In some designs, the total volume of all the pores in the porous scaffolding matrix may range from around 0.12 $cm^3/g$ to around 10 $cm^3/g$ (for example, in some designs, from around 0.12 $cm^3/g$ to around 0.3 $cm^3/g$; in other designs, from around 0.3 $cm^3/g$ to around 0.6 $cm^3/g$; in other designs, from around 0.6 $cm^3/g$ to around 1.0 $cm^3/g$; in other designs, from around 1 $cm^3/g$ to around 2 $cm^3/g$; in other designs, from around 2 $cm^3/g$ to around 3 $cm^3/g$; in other designs, from around 3 $cm^3/g$ to around 4 $cm^3/g$; in other designs, from around 4 $cm^3/g$ to around 5 $cm^3/g$; in other designs, from around 5 $cm^3/g$ to around 6 $cm^3/g$; in other designs, from around 6 $cm^3/g$ to around 7 $cm^3/g$; in other designs, from around 7 $cm^3/g$ to around 8 $cm^3/g$; in other designs, from around 8 $cm^3/g$ to around 9 $cm^3/g$; in other designs, from around 9 $cm^3/g$ to around 10 $cm^3/g$). In some designs, the total (e.g., average) volume fraction of all the pores in such (nano)composite particles (that comprise active material provided to store and release ions during battery operation, whereby the storing and releasing of the ions causes a substantial change in volume of the active material, by about 40 vol. % or more) may range from around 10 vol. % to around 70 vol. % (for example, in some designs, from around 10 vol. % to around 20 vol. %; in other designs from around 20 vol. % to around 30 vol. %; in other designs from around 30 vol. % to around 40 vol. %; in other designs from around 40 vol. % to around 50 vol. %; in other designs from around 50 vol. % to around 60 vol. %; in other designs from around 60 vol. % to around 70 vol. %). In some designs, the total (average) volume of all the pores in such (nano)composite particles may range from around 0.07 $cm^3/g$ to around 1.3 $cm^3/g$ (for example, in some designs, from around 0.07 cm3/g to around 0.1 $cm^3/g$; in other designs, from around 0.1 $cm^3/g$ to around 0.2 $cm^3/g$; in other designs, from around 0.2 $cm^3/g$ to around 0.3 $cm^3/g$; in other designs, from around 0.3 $cm^3/g$ to around 0.4 $cm^3/g$; in other designs, from around 0.4 $cm^3/g$ to around 0.5 $cm^3/g$; in other designs, from around 0.5 $cm^3/g$ to around 0.6 $cm^3/g$; in other designs, from around 0.6 $cm^3/g$ to around 0.7 $cm^3/g$; in other designs, from around 0.7 $cm^3/g$ to around 0.8 $cm^3/g$; in other designs, from around 0.8 $cm^3/g$ to around 0.9 $cm^3/g$; in other designs, from around 0.9 $cm^3/g$ to around 1.0 $cm^3/g$; in other designs, from around 1.0 $cm^3/g$ to around 1.1 $cm^3/g$; in other designs, from around 1.1 $cm^3/g$ to around 1.2 $cm^3/g$; in other designs, from around 1.1 $cm^3/g$ to around 1.3 $cm^3/g$). Both too large of a pore volume and too small of a pore volume may lead to undesirably fast degradation or otherwise inferior performance of the anode (such as a blended anode).

In some designs, one or more of the (nano)composite particles may comprise from about 2 at. % to about 82 at. % of $sp^2$-bonded carbon as a fraction of all elements in the respective composite particle(s). In some designs, one or more of the (nano)composite particles may comprise from about 0.5 wt. % to about 25 wt. % of a polymer (which may be at least partially carbonized in some designs). In some designs, it may be preferable for one or more of the (nano)composite particles to comprise from about 20 wt. % to about 90 wt. % Si as a fraction of the total weight of such particle(s). In some designs, it may be preferable for one or more of the (nano)composite particles to comprise from about 10 at. % to about 70 at. % Si as a fraction of all the elements within such particle(s). In some designs, it may be preferable for one or more of the (nano)composite particles to comprise from about 2 at. % to about 84 at. % C as a fraction of all the elements within such particle(s). In some designs, a significant portion of one or more of the (nano) composite particles (e.g., about 10-100 wt. %) may exhibit a near-spherical or elliptical or pancake-like shapes. In some designs, a significant portion of the (nano)composite particles (e.g., about 10-100 wt. %; in some designs, from about 50 wt. % to about 100 wt. %) may exhibit an average size from about 500 nm to about 20 microns. In some designs, it may be preferable for one or more of the (nano)composite particles to comprise less than about 1-5 wt. % oxygen (O) as a fraction of all the elements within such particle(s). In some designs, it may be preferable for one or more of the (nano)composite particles to comprise less than about 2-10 wt. % nitrogen (N) as a fraction of all the elements within such particle(s).

In some designs, some or all of the individual conversion-type active particles may exhibit a gradient in the distribution of active material (e.g., Si) from the center to the surface (e.g., comprise more wt. % Si in the center of the particles and less wt. % Si near the surface (e.g., near about 10-20% of the radius counting shell, if present) of the respective composite particles; or may comprise more vol. % Si in the center of the particles and less vol. % Si near the surface (e.g., near 10-20% of the radius, counting shell, if present) of the respective composite particles). In some designs, some or all individual conversion-type active particles may exhibit a gradient in the distribution of porosity from the center to the surface (e.g., comprise significantly larger (e.g., by about 20% or more) pore volume in the center than near the surface (e.g., near about 10% of the radius) of the composite particles; or comprise significantly larger (e.g., by about 20% or more) size of the pores in the center than near the surface (e.g., near about 10% of the radius) of the composite particles).

In some designs, it may be advantageous for the conversion-type (including alloying-type) active material (e.g., Si-containing) powders (which may be a mixture of different powders, in some designs) used to cast the blended anode (after mixing with a binder, conductive additives and a solvent, in some designs) to exhibit a low median wt. % of hydrogen (H). In some designs, it may be advantageous for the median fraction of H to be below about 0.5 wt. % (in some designs, it may be more advantageous for the fraction of H to be below about 0.1 wt. %; in some designs, it may be more advantageous for the fraction of H to be below about 0.05 wt. %; in some designs, it may be more advantageous for the fraction of H to be below about 0.01 wt. %; in some designs, it may be more advantageous for the fraction of H to be below about 0.001 wt. %). In some designs, it may be advantageous for the core-shell type conversion-type (including alloying-type) active material (e.g., Si-containing) powders (which may be a mixture of different powders, in some designs) used to cast the blended anode to comprise a low median wt. % of hydrogen (H) in the shell. In some designs, it may be advantageous for the median fraction of H to be below about 0.5 wt. % (in some designs, it may be more advantageous for the fraction of H to be below about 0.1 wt. %; in some designs, it may be more advantageous for the fraction of H to be below about 0.05 wt. %; in some designs, it may be more advantageous for the fraction of H to be below about 0.01 wt. %; in some designs, it may be more advantageous for the fraction of H to be below about 0.001 wt. %). In some designs, it may be advantageous for the conversion-type (including alloying-type) active material (e.g., Si-containing) composite powders (which may be a mixture of different powders, in some designs) used to cast the blended anode that comprises carbon material in their composition to have a low median wt. % of hydrogen (H) within its carbon component(s). In some designs, it may be advantageous for the median fraction of H in carbon to be below about 0.5 wt. % (in some designs, it may be more advantageous for the fraction of H to be below about 0.1 wt. %; in some designs, it may be more advantageous for the fraction of H to be below about 0.05 wt. %; in some designs, it may be more advantageous for the fraction of H to be below about 0.01 wt. %; in some designs, it may be more advantageous for the fraction of H to be below about 0.001 wt. %).

In some designs, it may be advantageous for the conversion-type (including alloying-type) active material (e.g., Si-containing) powders (which may be a mixture of different powders, in some designs) to exhibit a median $D_v50$ size (e.g., effective diameter) in the range from about 2 times to about 40 times smaller than that of the median $D_v50$ size (e.g., effective diameter) of the intercalation-type (e.g., carbonaceous, such as graphite in some examples) active material powders (which may be a mixture of different powders, in some designs) used to cast the blended anode.

In some designs, it may be advantageous (e.g., in order to achieve a higher packing density or attain favorable distributions (in space) of components in a blended electrode, etc.) for the conversion-type active material powders to exhibit a shape, described by its surface roundness or irregularity, and its aspect ratio (which may range from about 1 to about 50, in some designs) to be qualitatively similar to the intercalation-type active material powder shape (which may be a mixture of different powders, in some designs). For example, if the intercalation-type active material particles exhibit potato-shape and a median aspect ratio from about 1.1 to about 1.6, then it may be advantageous in some design to use spherical or spheroidal (e.g., potato-shaped or oblate spheroid-shaped) particles with a median aspect ratio from about 1 to about 2.4-3.2 (aspect ratio within around 1.5-2× of that of the intercalation-type active material). In some designs, it may be preferable for the conversion-type active anode material particles to exhibit a shape with more rounded surface features (in some designs, e.g., near-spherical or near-spheroidal, including but not limited to oblate spheroidal, potato-shaped, etc.) and most (e.g., around 50-100 wt. %) particle aspect ratio being in the range from about 1 to about 5 (in some designs, the range from about 1 to about 2) even when the intercalation-type active material powder may exhibit more irregular surface features and a broader distribution of the aspect ratios (which may range from about 1 to about 50, in some designs).

In some designs, conversion-type active material particles (or conversion-type active material comprising composite particles) may comprise silicon oxide with a general composition of $SiO_x$, where x may range from about 0.2 to about 1.2. In some designs, such particles may comprise Si nanoparticles immersed in a $SiO_2$ matrix, where the matrix accommodates some of the volume changes in Si during cycling in cells, thus stabilizing its electrochemical performance. In some designs, such particles may also comprise conductive carbonaceous material (e.g., as a coating or as a part of the composite) in order to enhance their electrical conductivity or stability during cycling. In some designs, due to high electronegativity of oxygen atoms, some of the Li becomes trapped inside such particles (e.g., as $Li_4SiO_4$ or other compositions) and thus irreversibly lost during Li insertion (e.g., during cell charging, lithiation), resulting in the undesirably low first cycle coulombic efficiency when used in the blended anodes (or as stand-alone anode material). In some designs, in order to reduce such first cycle losses, the anodes comprising such a material may be pre-lithiated before assembling into cells by, for example, electrochemical pre-lithiation or by adding Li metal containing particles or coatings onto the anode surface. Such electrode-level pre-lithiation adds undesirably high cost and complexity to the cell fabrication. In some designs, pre-lithiation of the $SiO_x$-based materials at the powder level may generally be less expensive. Unfortunately, in some designs, only a small amount of Li may be effectively pre-inserted into such material because when particles become pre-lithiated to the level to compensate for most of the first cycle losses, they typically become too reactive. In case of the commonly used (e.g., water-based) slurry coatings, excessive amount of added Li may reduce the electrochemical potential of such particles to the level that they start reacting with the slurry solvent (water). During such a reaction, the water may get reduced (thus generating hydrogen bubbles), while particles may get oxidized and leach Li into the aqueous slurry. In some cases, the carbon coating does not help much to stop such a process because partially lithiation carbon (carbon comprising enough Li to be in a chemical equilibrium with the lithiated silicon oxide) is permeable to Li ions, which easily leach through the carbon to water (e.g., as $Li_yC_6+yH_2O \rightarrow y/2H_2(g)+yLiOH+C_6$) to the level when the remaining amount of remaining Li is so small that the electrochemical potential of particles increases to the level when water reduction stops (which provides undesirably small reduction of the first cycle losses in battery cells).

In some designs, in order to compensate for the first cycle losses in $SiO_x$-comprising materials without inducing side reactions in contact with water (or water vapors), it may be advantageous to use other (non-Li) highly electropositive metals to partially reduce $SiO_2$-comprising powder. In some designs, it may be further advantageous to select metals that are less mobile and not permeable through a carbon coating (e.g., due to having larger ion charge than +1 and/or larger ion size) and thus not capable of leaching out during exposure of the carbon-coated (carbon-encapsulated) particles to water-based slurries or moisture-containing environment. In some designs, it may be advantageous for the carbon coating to comprise more than one component. In some designs, it may be advantageous for at least one component of the carbon coating to be deposited by the carbonization of the pre-deposited organic material (e.g., a natural or synthetic polymer or a resin, incl. but not limited to pitch, such as, for example, petroleum pitch, coal tar pitch, or plants' derived pitch) coating. In some designs, it may be advantageous for at least one component of the carbon coating to be deposited by a hydrothermal or a solvothermal process. In some designs, the thickness of such a layer may range from about 2 nm to about 200 nm. In some designs, it may be preferable for such a layer to be conformal (encase all or most of the particle surface). Carbonized carbon may often comprise pores. In some designs, the pore volume in such carbonized carbon may range from about 0.02 $cm^3/g$ to about 0.7 $cm^3/g$. In some designs, it may be advantageous to use vapor-deposited carbon (e.g., chemical vapor deposited (CVD) carbon) as at least a portion of the carbon coating (shell surrounding particles) in order to close potentially remaining pores and minimize its permeability by metal ions. Multiple suitable precursor may be used for CVD carbon deposition, including but not limited to propylene, acetylene, ethylene, methane, among others. In some designs, the volume fraction of such a CVD deposited carbon may range from about 2 vol. % to about 100 vol. % as a fraction of the total carbon in the coating. In some designs, the use of the combination of the carbonized carbon layer and vapor-deposited carbon may be particularly advantageous for the formation of effective carbon shells that not only enhance conductivity of the material, but also protect its interior from the unfavorable reactions with water. In some designs, it may be highly advantageous for at least a portion of such a coating (shell) to be deposited after the $SiO_x$ (e.g., $SiO_2$) reduction. In some designs, magnesium metal (Mg, having a valency of 2+, Mga'$^{O}$ ion size of 72 μm and electronegativity value of 1.31, slightly larger than Li electronegativity value of 0.98 but smaller than Si electronegativity value of 1.90) may be utilized for $SiO_x$ reduction (which may, for example, at least partially reduce $SiO_2$ matrix to MgO, Mg—Si alloys and $Mg_2SiO_4$) forming an overall composition of Si—O—Mg (the relative fractions of Si, O and Mg are omitted here for simplicity of the description, but such fractions would be understood to one of ordinary skill in the art in context with the present disclosure). Such a process may be conducted at elevated temperatures (the process is known as magnesiothermic reduction of silicon oxide). However, this process may undesirably increase the surface area of the material, reduce its mechanical properties, require excessive Mg amounts to induce substantial reductions in the first cycle losses and induce other limitations. In other designs, it may be advantageous to utilize calcium (Ca, having a valency of 2+, ion size of 100 μm and electronegativity value of 1.00) to form an overall composition of Si—O—Ca to partially compensate for the first cycle losses. In other designs, it may be advantageous to utilize strontium (Sr, having a valency of 2+, ion size 118 μm and electronegativity value of 0.95) to form an overall composition of Si—O—Sr to partially compensate for the first cycle losses. In other designs, it may be advantageous to utilize barium (Ba, having a valency of 2+, ion size 135 μm and electronegativity value of 0.89) to form an overall composition of Si—O—Ba to partially compensate for the first cycle losses. In other designs, it may be advantageous to utilize scandium (Sc, having a valency of 3+, ion size 74.5 μm and electronegativity value of 1.36) to form an overall composition of Si—O—Sc to partially compensate for the first cycle losses. In other designs, it may be advantageous to utilize yttrium (Y, having a valency of 3+, ion size 90 μm and electronegativity value of 1.22) to form an overall composition of Si—O—Y to partially compensate for the first cycle losses. In some designs, it may be advantageous (e.g., in terms of achieving better electrochemical behavior or in terms of utilizing more favorable synthesis conditions) to reduce $SiO_x$ compounds with two, three or more metals (each having a weight fraction of at least about 1 wt. % relative to the overall weigh of the partially reduced material), thereby forming Si—O-M1-M2 or Si—O-M1-M2-M3 or Si—O-M1-M2-M3-M4 or other compounds, where M1, M2, M3 and M4 are selected from the group of metals that include Li, Mg, Ca, Sr, Ba, Sc, Y, Zr, Li, Na, Cs, K, among others. In some designs, it may be advantageous for one or more of such metals (among the M1, M2, M3, M4, etc.) to have a valency above +1 (e.g., +2 or +3, etc.). However, many of such metals when in contact with water may produce hydroxides (some of which may be harmful in some applications), and it may particularly critical to produce effective protective coatings (shells) encasing such compositions (Si—O-M1 or Si—O-M1-M2 or Si—O-M1-M2-M3 or Si—O-M1-M2-M3-M4, etc.) so that the corresponding metal ions do not leach into water. In some designs, such shells may comprise carbon (e.g., including CVD-deposited carbons and/or carbonized polymer or resin layer, in some designs). In some designs, a very thin layer (e.g., with an average thickness range of about 0.2-10 nm; in some designs, with an average thickness range of about 0.5-3 nm) of one or more of water-impermeable oxide(s) (e.g., $Al_2O_3$ or $TiO_2$ or $Cr_2O_3$, etc.) may be deposited on the outer surface of such particles as a component of the shell (which, in some designs, may comprise conductive carbon).

In some designs, such oxide(s) may be deposited by a sol-gel process or by an ALD process.

In some designs, instead of silicon oxides or silicon-metal oxides, some or all of the conversion-type active material particles (or conversion-type active material comprising composite particles) may comprise silicon nitride or silicon-metal nitride or silicon oxynitride or silicon-metal oxynitride. In some designs, the presence of nitrogen (N) may enhance electrical and ionic conductivity in the material and additionally improve the properties of the SEI on the particle surface. In an example, a general composition for the silicon (oxy)nitride may be $SiO_xN_y$, where x may range from about 0.0 to about 1.2 and y may preferably range from about 0.05 to about 0.8. In some designs, some or all of such particles may comprise Si nanoparticles immersed in a $Si_3N_4$ (or $Si_2N_2O$) matrix, where the matrix accommodates some of the volume changes in Si during cycling in cells, thus stabilizing its electrochemical performance. In some designs, the distribution of N may be not perfectly uniform within $SiO_xN_y$ and related materials. For example, higher N content near the surface of some or all of the particles or near grain boundaries may be advantageous in some designs. In some designs, there could be a gradient in N distribution from the center to the surface of some or all of the particles. In some designs, some or all of such particles may also comprise conductive carbonaceous material (e.g., as a coating or as a part of the composite) in order to enhance their electrical conductivity or stability during cycling. In some designs, in order to reduce first cycle Li losses in such materials in Li-ion batteries, some or all or the particles may get doped with electropositive metals before assembling into cells by, for example, electrochemical pre-lithiation or by adding one, two, three or more metals (each having a weight fraction of at least about 1 wt. % relative to the overall weight of the partially reduced material) into the bulk of such materials in order to form compositions, such as Si—N-M1 or Si—O—N-M1 or Si—N-M1-M2 or Si—O—N-M1-M2 or Si—N-M1-M2-M3 or Si—O—N-M1-M2-M3 or Si—N-M1-M2-M3-M4 or Si—O—N-M1-M2-M3-M4, etc., where M1, M2, M3 and M4 are selected from the group of metals that include Li, Mg, Ca, Sr, Ba, Sc, Y, Zr, Li, Na, Cs, K, among others. In some design, it may be advantageous for one or more of such metals (among the M1, M2, M3, M4, etc.) have a valency above +1 (e.g., +2 or +3, etc.). In some designs, it may be advantageous to produce effective protective coatings (shells) encasing such compositions (Si—N or Si—O—N or Si—N-M1 or Si—O—N-M1 or Si—N-M1-M2 or Si—O—N-M1-M2 or Si—N-M1-M2-M3 or Si—O—N-M1-M2-M3 or Si—N-M1-M2-M3-M4 or Si—O—N-M1-M2-M3-M4, etc.) so that the corresponding metal ions do not react with water and do not leach into water. In some designs, such shells may comprise carbon. In some designs, it may be advantageous for the carbon coating to comprise more than one component. In some designs, it may be advantageous for at least one component of the carbon coating to be deposited by the carbonization of the pre-deposited organic material (e.g., a natural or synthetic polymer or a resin) coating. In some designs, it may be advantageous for at least one component of the carbon coating to be deposited by a hydrothermal or a solvothermal process. In some designs, the thickness of such a layer may range from about 2 nm to about 200 nm. In some designs, it may be preferable for such a layer to be conformal (encase all or most of the particle surface). As noted above, carbonized carbon may often comprise pores. In some designs, the volume of such pores may range from about 0.02 $cm^3/g$ to about 0.7 $cm^3/g$. In some designs, it may be advantageous to use vapor-deposited carbon (e.g., CVD carbon) as at least a portion of the carbon coating (shell surrounding particles) in order to close potentially remaining pores and minimize its permeability by metal ions. In some designs, the volume fraction of such a CVD deposited carbon may range from about 2 vol. % to about 100 vol. % as a fraction of the total carbon in the coating. In some designs, the use of the combination of the carbonized carbon layer and vapor-deposited carbon may be particularly advantageous for the formation of effective carbon shells that not only enhance conductivity of the material, but also protect its interior from unfavorable reactions with water. In some designs, a very thin layer (e.g., with an average thickness range of about 0.2-10 nm; in some designs, with an average thickness range of about 0.5-3 nm) of one or more of water-impermeable oxide(s) (e.g., $Al_2O_3$ or $TiO_2$ or $Cr_2O_3$, etc.) may be deposited on the outer surface of some or all of such particles as a component of the shell (which, in some designs, may comprise conductive carbon). In some designs, such oxide(s) may be deposited by a sol-gel process or by an ALD process.

In some designs, a mixture of two or more of distinctly different types of conversion (including alloying) or conversion-containing composite particles may be utilized in the design of anodes for Li-ion batteries without adding intercalation-type carbonaceous (e.g., graphite or graphite-like) compounds. This is because it some designs it may be advantageous to attain a certain value of the first cycle losses, cycle stability, thermal stability, price and other properties. For example, Si-based nanocomposite particles (with little-to-no O or little-to-no N) may exhibit very low first cycle losses, excellent stability and relatively high price, while $SiO_x$-based or $SiO_xN_y$-based composite particles may exhibit higher first cycle losses, lower stability and lower price. By blending such particles, one may attain anodes with an ideal (or sufficiently close-to-ideal) first cycle losses, sufficient (for a given application stability) and moderate price. In another example, one type of the conversion (or conversion-containing) particles may exhibit higher first cycle losses and very high rate performance, while another type of conversion (or conversion-containing) particles may exhibit lower first cycle losses and lower rate performance. By combining such particles in one anode, in some designs, one may attain ideal (or sufficiently close to ideal) first cycle losses and sufficiently fast rate performance for at least a portion of the capacity. In some designs, the relative fractions of each of such conversion (including alloying) conversion-containing composite particles may range from about 1 wt. % to about 99 wt. % (e.g., preferably from about 5 wt. % to about 95 wt. %; more preferably from about 10 wt. % to about 90 wt. %; in some designs more preferably from about 20 wt. % to about 80 wt. %) as a % of the total weight of all active materials in the anode. In some designs, two or all types of such conversion or conversion-containing composite particles may exhibit physical properties, composition and morphology similar to those (or the same as those) described above for using in the blended anodes that do comprise intercalation-type carbonaceous materials. For example, in some designs, two or all types of such conversion or conversion-containing composite particles may comprise Si. In some designs, the weight-average fraction of Si in two or all types of such particles may range from about 20 wt. % to about 80 wt. %. As described above, in some designs, two or all type of such particles may preferably (i) exhibit moderately high average volume changes (e.g., about 8-180 vol. %) during the first cycle, moderate average volume changes (e.g., about 4-50 vol. %) during the subsequent charge-discharge cycles, (ii) an average size in the range from about 0.2 to about 40 microns (in some designs, more preferably from about 0.3 to about 20 microns) and (iii) average specific surface area in the range from about 0.1 to about 100.0 $m^2/g$ (in some designs, more preferably from about 0.25 to about 25.0 $m^2/g$). As described above, in some designs, two or all type of such particles may comprise internal (closed) pores. In some designs, the total volume of such pores may range from about 0.07 $cm^3/g$ to about 1.3 $cm^3/g$.

In some designs, a mixture of two, three or more of distinctly different types of intercalation-type particles (e.g., graphite particles produced from different precursors or heat-treated at different temperatures or having substantially different size, shape or surface coatings, hard carbon particles or soft carbon particles produced from different precursors or heat-treated at different temperatures or having substantially different size, shape or surface coatings, etc.) may be advantageously utilized in the design of blended anodes for metal-ion (e.g., Li-ion) batteries that comprise conversion-type (including alloying type) anode materials. This is because in some designs the mixture of different intercalation-type materials may provide the superior (more desirable for a given application) combination of the anode density, anode volumetric capacity, anode cycle stability, anode first cycle coulombic efficiency and anode rate performance (e.g., charging rate performance) in the desired temperature range. In some designs, it may be advantageous for the intercalation-type carbonaceous powders used to cast the blended anode (which may be a mixture of different carbon powders, in some designs) to exhibit a median particle size $D_{50}$ ($D_v50$, median for volume distribution) in the range from about 2.5 micron to about 25 micron (in some designs, from about 2.5 μm to about 5 μm; in some designs, from about 5 μm to about 7 μm; in some designs, from about 7 μm to about m; in some designs, from about 10 μm to about 15 am; in some designs, from about m to about 20 μm; in some designs, from about 20 μm to about 25 μm). In some designs, it may be advantageous to use intercalation-type carbonaceous powders of different size in order to increase the packing density (and thus volumetric capacity) of the blended anodes. In some designs, it may be advantageous for the intercalation-type carbonaceous powders used to cast the blended anode (which may be a mixture of different carbon powders, in some designs) to exhibit reversible capacity in the range from about 300 mAh/g to about 380 mAh/g (in some designs, from about 300 mAh/g to about 340 mAh/g; in some designs, from about 340 mAh/g to about 350 mAh/g; in some designs, from about 350 mAh/g to about 360 mAh/g; in some designs, from about 360 mAh/g to about 380 mAh/g). In some designs, it may be advantageous for the intercalation-type carbonaceous powders used to cast the blended anode (which may be casted from a slurry comprising a mixture of different carbon powders, in some designs) to exhibit first cycle coulombic efficiency in the range from about 75% to about 99% (in some designs, from about 75% to about 85%; in some designs, from about 85% to about 90%; in some designs, from about 90% to about 95%; in some designs, from about 95% to about 96%; in some designs, from about 96% to about 97%; in some designs, from about 97% to about 99%). In some designs, it may be advantageous for the intercalation-type carbonaceous powders used to cast the blended anode (which may be casted from a slurry comprising a mixture of different carbon powders, in some designs) to exhibit a median BET specific surface area (SSA) in the range from about 0.5 $m^2/g$ to about 30 $m^2/g$ (in some designs from about 0.5 $m^2/g$ to about 1 $m^2/g$; in some designs from about 1 $m^2/g$ to about 2 $m^2/g$; in some designs from about 2 $m^2/g$ to about 3 $m^2/g$; in some designs from about 3 $m^2/g$ to about 4 $m^2/g$; in some designs from about 4 $m^2/g$ to about 6 $m^2/g$; in some designs from about 6 $m^2/g$ to about 10 $m^2/g$; in some designs from about 10 $m^2/g$ to about 30 $m^2/g$). In some designs, higher BET SSA may lead to higher first cycle losses and faster rate performance. In some designs, it may be advantageous for the intercalation-type carbonaceous powders used to cast the blended anode (which may be casted from a slurry comprising a mixture of different carbon powders, in some designs) to exhibit a median true density (e.g., as measured by a helium Pycnometer) in the range from about 1.9 $g/cm^3$ to about 2.27 $g/cm^3$ (in some designs, from about 1.9 $g/cm^3$ to about 1.95 g/cm3; in some designs, from about 1.95 $g/cm^3$ to about 2.00 g/cm3; in some designs, from about 2.00 $g/cm^3$ to about 2.05 $g/cm^3$; in some designs, from about 2.05 $g/cm^3$ to about 2.10 $g/cm^3$; in some designs, from about 2.10 $g/cm^3$ to about 2.15 $g/cm^3$; in some designs, from about 2.15 $g/cm^3$ to about 2.20 $g/cm^3$; in some designs, from about 2.20 $g/cm^3$ to about 2.27 $g/cm^3$). In some designs, it may be advantageous for the intercalation-type carbonaceous powders used to cast the blended anode (which may be casted from a slurry comprising a mixture of different carbon powders, in some designs) to exhibit a low median wt. % of hydrogen (H). In some designs, it may be advantageous for the median fraction of H to be below about 0.5 wt. % (in some designs, it may be more advantageous for the fraction of H to be below about 0.1 wt. %; in some designs, it may be more advantageous for the fraction of H to be below about 0.05 wt. %; in some designs, it may be more advantageous for the fraction of H to be below about 0.01 wt. %; in some designs, it may be more advantageous for the fraction of H to be below about 0.001 wt. %). In some designs, it may be advantageous for at least a fraction (e.g., from about 20 wt. % to about 100 wt. %) of the intercalation-type carbonaceous powders used to cast the blended anode (which may be casted from a slurry comprising a mixture of different carbon powders, in some designs) to comprise a surface layer (a shell). In some designs, the median thickness of such a shell may range from about 0.50 nm to about 200.0 nm (in some designs, from about 0.50 nm to about 2.00 nm; in some designs, from about 2.00 nm to about 5.00 nm; in some designs, from about 5.00 nm to about 10.00 nm; in some designs, from about 10.00 nm to about 20.00 nm; in some designs, from about 20.00 nm to about 200.00 nm). In some designs, such a shell may comprise one, two, three or more distinct layers. In some designs, such a shell may primarily (e.g., by about 20 wt. % to about 100 wt. %) comprise carbon. In some designs, at least a portion of such a carbon-containing shell may be deposited by the carbonization (pyrolysis) of the pre-deposited organic material (e.g., a natural or synthetic polymer or a resin, incl. but not limited to pitch, such as, for example, petroleum pitch, coal tar pitch, or plants' derived pitch) coating. In some designs, it may be advantageous for at least one component of the carbon coating to be deposited by a hydrothermal or a solvothermal process. In some designs, at least a portion of a shell may be deposited by CVD (including, but not limited to carbon CVD) or by ALD. In some designs, at least a portion of a shell (or portion of a shell layer) may comprise a ceramic material (e.g., a sulfide, an oxide, an oxy-nitride, an oxy-fluoride material, among others; in some designs from about 0.001 wt. % to about 100 wt. %). In some designs, a ceramic material may comprise at least one of the following electropositive elements: C, Li, H, Mg, Sr, Ba, Sc, Y, Zr, Al, Ti or Cr. In some designs, a ceramic material may comprise at least one of the following electronegative elements: O, N, S, Se, P, F.

In some designs, it may be advantageous for at least one type of the intercalation-type particles in the blended anodes to be a natural or an artificial graphite. In many cases, natural graphite is easier to deform during calendering (densification of the anodes), which may be beneficial to use in some designs of the blended anodes. As a result, higher electrode density may be obtained in the blended anodes in some designs. Furthermore, natural graphite may exhibit a higher volumetric capacity and/or higher first cycle coulombic efficiency. When a mixture of artificial and natural graphite is used in the design of "regular" pure intercalation-type anodes with moderately high reversible areal capacity loading (e.g., in excess of about 4 $mAh/cm^2$), the fraction of artificial graphite may be substantially higher (e.g., configured with a wt. % of natural graphite in the range from about 5 wt. % to about 20 wt. %, while the wt. % of artificial graphite is in the range from about 80 wt. % to about 95 wt. %). This is because for high loading electrodes the intercalation-type anodes with a high fraction of natural graphite may tend to form more torturous anodes and, as a result, may suffer from slow charging rate or faster degradation. In some designs, different design considerations may be used for the design of the blended anodes comprising conversion-type anode materials. In particular, in some designs for blended electrodes comprising a substantial fraction of conversion-type active materials (e.g., from about 15% to about 90% of the total capacity) it may be beneficial to utilize a higher fraction of natural graphite (e.g., from about 20 wt. % to about 100 wt. % as a fraction of all types of graphite anode materials in the blended anodes; in some designs from about 20 wt. % to about 30 wt.%; in some designs from about 30 wt. % to about 50 wt. %; in some designs from about 50 wt. % to about 75 wt. %; in some designs, from about 75 wt. % to about 100 wt. %). In some cases, the higher fraction of the capacity is coming from conversion-type active material, and larger sizes of conversion-type active material particles (relative to the size of the graphite particles) may be correlated with a higher fraction of natural graphite being utilized in some designs of the blended anodes. In some designs, it may be advantageous for at least one type of the intercalation-type particles in the blended anodes to exhibit a spheroidal or a potato-like shape or a pancake-like shape. In some designs, it may be advantageous for about 10-100 wt. % of the intercalation-type particles in the blended anodes to exhibit a spheroidal or potato-like shape or oblate spheroid shape or a pancake-like shape.

In some designs, it may be advantageous for at least one type of the intercalation-type particles in the blended anodes to comprise one of the following: (i) "non-graphitic" hard carbons (including spherical, spheroidal or potato-shaped hard carbon particles) or (ii) mixed carbons (soft carbon—hard carbon) materials (including mixed carbon spherical, spheroidal or potato-shaped particles) or (iii) soft carbons (including spherical, spheroidal or potato-shaped carbon particles, including but not limited to mesocarbon microbeads, MCMB). Such non-graphitic carbons may exhibit higher first cycle losses, lower density, lower volumetric capacity, higher average charge potential, higher average discharge potential and higher rate performance compared to natural or synthetic graphites or exhibit better cycle stability (e.g., particularly when regularly being exposed to current densities corresponding to high charging or discharging rates; e.g., from about 2 C to about 20 C rates).

In some applications, in order to reduce Li-ion battery fabrication costs and reduce the use of toxic solvents in slurry/casting electrode fabrications, it may be highly advantageous to either use dry electrode processing or to use water-based slurries for the blended anode fabrication. However, in some cases it may be challenging to attain high-quality, high-uniformity blended anodes in case of water-based slurry processing due to the difference in the density and/or wetting properties (e.g., hydrophilicity) of the surfaces of different active components of the active material blend. As a result, the produced blended anodes may suffer from inferior rate performance or cycle stability or volumetric capacity (in a desired temperature range) or other undesirable performance characteristics. One or more embodiments of the present disclosure are directed to overcoming this limitation.

In some designs, it may be advantageous for the majority (e.g., about 50-100 wt. %; preferably from about 75 wt. % to about 100 wt. %; in some designs from about 85 wt. % to about 100 wt. %; in some designs from about 90 wt. % to about 100 wt. %; in some designs from about 95 wt. % to about 100 wt. %) of the active materials in the blended anodes (including intercalation and conversion-type active materials) to exhibit a similar (e.g., within about ±25 degr.; in some designs within about ±10 degr.; in some designs within about ±5 degr.) wetting angle in contact with a pure water (or suitable solvent of a blended anode slurry). In some designs, it may be advantageous for the majority (e.g., about 50-100 wt. %; preferably from about 75 wt. % to about 100 wt. %; in some designs from about 85 wt. % to about 100 wt. %; in some designs from about 90 wt. % to about 100 wt. %; in some designs from about 95 wt. % to about 100 wt. %) of the active materials in the blended anodes to exhibit similar (e.g., within about ±20 degr.) wetting angle in contact with an aqueous solution of a binder (or a mixture of binders or a mixture of binder(s) and surfactant(s)) used for the blended anode fabrication (e.g., when a polymer or co-polymer binder is used in the same concentration as in the slurry; e.g., at the same pH as the pH of the slurry). In some designs, it may be advantageous for the majority (e.g., about 50-100 wt. %; preferably from about 75 wt. % to about 100 wt. %; in some designs from about 85 wt. % to about 100 wt. %; in some designs from about 90 wt. % to about 100 wt. %; in some designs from about 95 wt. % to about 100 wt. %) of the active materials in the blended anodes to exhibit wetting angle below about 90 degr. (in some designs, from about 90 degr. to about 80 degr.; in some designs from about 80 degr. to about 70 degr.; in some designs from about 70 degr. to about 60 degr.; in some designs, from about 60 degr. to about 45 degr.; in some designs, below 45 degr.) in contact with water or with an aqueous solution of a binder (or a mixture of binders or a mixture of binder(s) and surfactant(s)) used for the blended anode fabrication. The contact angle in powders may be determined, for example, by using, for example, (i) static tests (based on the Laplace equation for capillary rise in a tube) or (ii) the Washburn method (based on the measurements of the weight of the liquid (e.g., water) penetrating the powder bed by capillarity) or other suitable methods.

In some designs, it may be advantageous (e.g., in order to achieve a lower wetting angle in one or more active materials in contact with water or aqueous binder solution or in order to achieve a similar wetting angle in different types of active materials used in the slurry or to attain favorable distributions (in space) of components in a blended electrode, etc.) to treat the surface of at least one active powder material (used in the blended anode) by using one or more of the following techniques: (i) gas phase surface oxidation (e.g., in gaseous environment in the presence of one or more of the following: oxygen atoms, oxygen ions, oxygen-containing radicals, water molecules ($H_2O$), OH—anions/radicals, H+ cations, halogens (e.g., $F_2$ molecules or F— anions, etc.) or halogen (e.g., F)-containing radicals, nitrogen atoms, nitrogen ions, ammonia, nitrogen trifluoride ($NF_3$), nitrogen-containing radicals, to name a few among other oxidizing species; in some designs, thermal oxidation, plasma-induced oxidation, ozone-induced oxidation may be utilized); (ii) liquid phase chemical oxidation (e.g., by exposing the powders into the oxidizing acids or their mixtures, such as $H_2SO_4$, $HNO_3$, etc. (or solutions of acids) at temperatures up to about their boiling points; exposing the powders into the hydrogen peroxide ($H_2O_2$) or a solution of hydrogen peroxide); (iii) electrochemical oxidation; (iv) heat-treatment in reducing (e.g., gaseous) environment (e.g., to remove some or the majority of the functional groups, to change the surface termination, etc.), such as heat-treatment (e.g., at temperatures in the range from about 400° C. to about 1000° C.) in $H_2$, $N_2$, Ar, He, their various mixtures, vacuum, etc. In some designs, it may be advantageous (e.g., in order to achieve a similar wetting angle in different types of active materials used in the slurry or to attain similar affinity of different active materials to a binder or conductive additives, etc.) to treat the surface of at least some (e.g., about 20-100 wt. %) of the carbonaceous intercalation-type active materials and at least some (e.g., about 20-100 wt. %) of the conversion-type (incl. alloying type and mixed conversion-intercalation) active materials by using the same techniques or the same combination of techniques (in some designs by using the same or similar parameters; such as the composition of the treatment media; temperature of the treatment; pressure of the treatment; etc.).

In some designs, it may be advantageous (e.g., in order to achieve a similar wetting angle in different types of active materials used in the slurry or to attain similar affinity of different active materials to a binder or conductive additives, etc.) to coat the surface of at least some (e.g., about 20-100 wt. %) of the carbonaceous intercalation-type active materials and at least some (e.g., about 20-100 wt. %) of the conversion-type (incl. alloying type and mixed conversion-intercalation) active materials by a surface layer (a shell or a component of a shell) of a similar (or the same) composition (in some designs, of similar composition and similar microstructure). In some designs, such a surface layer may coat a significant portion (e.g. about 20-100%) of the surface of the individual particles.

In some designs, a surface layer on the surface of at least some (e.g., about 20-100 wt. %) of the carbonaceous intercalation-type active materials and/or at least some (e.g., about 20-100 wt. %) of the conversion-type (incl. alloying type and mixed conversion-intercalation) active materials may be deposited by using one, two or more of the following techniques: (i) hydrothermal deposition with or without heat-treatment(s); (ii) solvothermal deposition with or without heat-treatment(s); (iii) coating with an organic material (e.g., a natural or synthetic polymer or a resin, incl. but not limited to pitch, such as, for example, petroleum pitch, coal tar pitch, or plants' derived pitch) with or without subsequent carbonization; (iv) coating with an organometallic material with or without subsequent heat-treatment or carbonization; (v) coating with a metalorganic material with or without subsequent heat-treatment or carbonization; (vi) CVD with or without heat-treatment(s); (vii) ALD with or without heat-treatment(s); (viii) sol-gel with or without heat-treatment(s); (ix) electroless deposition with or without heat-treatment(s); (ix) electrodeposition with or without heat-treatment(s); (x) layer-by-layer (LbL) deposition with or without heat-treatment(s); (xi) electrophoretic deposition with or without heat-treatment(s); (xii) physical vapor deposition (PVD) (e.g., sputtering) with or without heat-treatment(s). In some designs, such a layer may be deposited on powders. In some designs, the powders may be advantageously agitated in order to deposit such coating layer(s) more uniformly or faster. In some designs, such a layer may be deposited on the electrodes. In some designs, such deposition on the electrode may be roll-to-roll.

In some designs, it may be advantageous (for various performance characteristics; particularly for blended anodes prepared from aqueous slurries) for the carbon surface layer-comprising composite conversion-type active material particles (including alloying-type particles and mixed conversion/intercalation particles) to exhibit a certain spectral signature detected in Raman spectroscopy studies. In particular, in some designs, it may be advantageous for the ratio of intensities of the carbon D band and carbon G band ($I_D/I_G$) in the Raman spectra of the majority (e.g., about 50-100 wt. %) of composite conversion-type particles (measured, for example, using the laser operating at a wavelength of about 532 nm; and analyzed, for example, in the spectral range from about 1000 to about 2000 wavenumber $cm^{-1}$ by fitting two Gaussian peaks after a linear background subtraction in this range) to range from $I_D/I_G$ of about 0.7 to $I_D/I_G$ of about 2.7 (in some designs, from about 0.7 to about 2.0; in some designs, from about 0.9 to about 2.1). Note that these ranges use the ratio of the absolute intensities of the D and G peaks (obtained by fitting the spectra by two G peaks and two D peaks using Gaussian models and using the intensities/heights of the tallest G peak and the tallest D peak), and not the ratio of the integrated intensities (areas under each of the D and G peaks). However, in some designs, it may be advantageous for the ratio of the integrated intensities of the D peak to G peak (areas under the corresponding peaks) (obtained by fitting the spectra by two G peaks and two D peaks using Gaussian models, calculating the sum of the areas under both Gaussian model G peaks ($I_{G\ total\ area}$), calculating the sum of the areas under both Gaussian model D peaks ($I_{D\ total\ area}$) and calculating the ratio of these two sums: $I_{D\ total\ area}/I_{G\ total\ area}$) to range from about 0.7 to about 2.7 (or 4, in some designs). In other designs, from about 0.7 to about 2.0.

In some designs, it may be advantageous for the full width at half maximum (FWHM) of the carbon G band in the Raman spectra of the majority of carbon-containing composite conversion-type particles (measured, for example, using the laser operating at a wavelength of about 532 nm; and analyzed, for example, in the spectral range from about 1000 to about 2000 wavenumber $cm^{-1}$ by fitting two Gaussian peaks after a linear background subtraction in this range) to range from about 10 $cm^{-1}$ to about 150 $cm^{-1}$ (in some designs, from about 50 $cm^{-1}$ to about 100 $cm^{-1}$).

In some designs, it may be advantageous (for various performance characteristics of the blended anodes) for at least some (e.g., about 20-100 wt. %; in some designs preferably from about 50 wt. % to about 100 wt. %) of the carbon surface layer-comprising conversion-type active material particles (including alloying-type particles and mixed conversion/intercalation particles) to have a carbon layer with a median value of the estimated (e.g., by using Raman spectroscopy or X-ray diffraction or related or other suitable techniques) in-plane crystallite size La in the range from about 10 Å (1.0 nm) to about 300 Å (30 nm) (in some designs, from about 1.2 nm to about 4.5 nm; in some designs, from about 1.7 nm to about 2.5 nm). In some designs, it may be advantageous for at least some (e.g., about 20-100 wt. %; in some designs preferably from about 50 wt. % to about 100 wt. %) of the carbon-comprising conversion-type active material particles (including alloying-type particles) to comprise carbon with a median value of the estimated (e.g., by using Raman spectroscopy or X-ray diffraction or related or other suitable techniques) in-plane crystallite size La in the range from about 10 Å (about 1.0 nm) to about 300 Å (about 30 nm) (in some designs, from about 1.2 nm to about 4.5 nm; in some designs, from about 1.7 nm to about 2.5 nm).

In some designs, it may be advantageous for both (i) the majority (e.g., about 50 wt. % or more) of the carbon surface layer-comprising conversion-type active material particles (including alloying-type particles and mixed conversion/intercalation particles; in some designs Si-comprising) and (ii) the majority (e.g., about 50 wt. % or more) of the intercalation-type carbonaceous active material particles (including, but not limited to carbon surface layer comprising) to exhibit the $I_D/I_G$ intensity ratio (in some designs, integrated intensity ration, $I_{D\ total\ area}/I_{G\ total\ area}$) in the Raman spectra of carbon (measured, for example, using the laser operating at a wavelength of about 532 nm; and analyzed, for example, in the spectral range from about 1000 to about 2000 wavenumber $cm^{-1}$ by subtracting a linear background and fitting the carbon spectra by two G peaks and two D peaks using Gaussian models and using the intensities/heights of the tallest G peak and the tallest D peak for the $I_D/I_G$ calculations) in the range from about 0.7 to about 2.7 (in some designs, from about 0.7 to about 2.0; in some designs, from about 0.9 to about 2.1).

In some designs, it may be advantageous for both (i) the majority (e.g., around 50 wt. % or more) of the carbon surface layer-comprising conversion-type active material particles (including alloying-type particles and mixed conversion/intercalation particles; in some designs Si-comprising) and (ii) the majority (e.g., about 50 wt. % or more) of the intercalation-type carbonaceous active material particles (including, but not limited to carbon surface layer comprising) to exhibit (FWHM) of the carbon G band in the Raman spectra (measured, for example, using the laser operating at a wavelength of about 532 nm; and analyzed, for example, in the spectral range from about 1000 to about 2000 wavenumber $cm^{-1}$ by fitting two Gaussian peaks after a linear background subtraction in this range) to range from about 10 $cm^{-1}$ to about 150 $cm^{-1}$ (in some designs, from about 50 $cm^{-1}$ to about 100 $cm^{-1}$).

In some designs, it may be advantageous for both (i) the majority (e.g., about 50 wt. % or more) of the carbon surface layer-comprising conversion-type active material particles (including alloying-type particles and mixed conversion/intercalation particles; in some designs Si-comprising) and (ii) the majority (e.g., about 50 wt. % or more) of the intercalation-type carbonaceous active material particles (including, but not limited to carbon surface layer comprising) to comprise carbon with a median value of the estimated (e.g., by using Raman spectroscopy or X-ray diffraction or related or other suitable techniques) in-plane crystallite size La in the range from about 10 Å (about 1.0 nm) to about 300 Å (about 30 nm) (in some designs, from about 1.2 nm to about 4.5 nm; in some designs, from about 1.7 nm to about 2.5 nm).

In some designs, a porosity (volume fraction in the electrode occupied by the spacing left between the active anode particles, binder and conductive additives in the anode and filled with electrolyte) needs to be carefully optimized for the application of blended anodes in Li-ion battery cell designs. Excessive porosity within the blended anodes may undesirably reduce volumetric energy density of some Li-ion batteries. At the same time, insufficient (for a given application) porosity may lead to unacceptably fast degradation in Li-ion cell applications or unacceptably low power or charging rate capabilities due to slower transport of Li ions during charging or discharging as the amount of highly ionically conductive electrolyte becomes small. The problems induced by insufficient porosity may become particularly detrimental for high electrode loadings (in excess of about 3.5-4 $mAh/cm^2$). In some cases, smaller electrode porosity may be tolerated in the anodes with smaller anode thickness. Similarly, in some designs, a larger electrode pore volume may be required for larger blended anode thickness and higher areal capacity loadings in the blended anode.

One conventional procedure to produce dense electrodes involves (i) slurry preparation, (ii) electrode casting on current collector foils and (iii) drying followed by (iv) pressure-rolling (also called "calendering") of the casted electrodes to increase their density, flatten electrode surface (reduce electrode surface roughness from about 1-20 micron to below about 0.1-0.5 micron), increase electrical conductivity of the electrode, (in some cases) increase cohesion of the electrode or adhesion to the current collector, reduce electrode porosity to an optimal value and attain other desired outcomes. While the ideal porosity and density of the blended anodes prior to their assembling into cells depends on multiple factors (from the composition of the blended anodes to areal capacity loadings to cell operating conditions and cell performance requirements), in some designs of the blended electrodes the porosity of dried and calendered electrodes may preferably range from about 5 vol. % to about 50 vol. % (in some designs, from about 15 vol. % to about 35 vol. %). Similarly, in some designs the packing efficiency of all active particles in the blended (calendered) anodes prior to assembling into cells may preferably range from about 50 vol. % to about 75 vol. % (in some designs, from about 55 vol. % to about 70 vol. %) with the rest of the pore volume (from about 25 vol. % to about 50 vol. %) being occupied by the binder, conductive additives and pores. Also, in some designs the density of most blended anodes (not considering the mass and volume of the current collector foils) may preferably range from about 1.0 $g/cm^3$ to about 2.0 $g/cm^3$ (in some designs, from about 1.1 $g/cm^3$ to about 1.6 $g/cm^3$).

In some designs, the first charge (lithiation)—induced volume increase in the conversion-type (e.g., Si-containing) active materials of the blended anodes may be larger compared to the first charge volume increase in the intercalation-type (e.g., carbonaceous) materials of the blended anodes. As such, in some designs, during the first charge the blended anode may experience larger increase in thickness compared to purely intercalation-type (e.g., carbonaceous) anode when cycled in a Li-ion pouch cell. At the same time, purely intercalation-type (e.g., graphite-based) anodes may exhibit substantial (e.g., about 2-12%) increase in the average thickness after the first "formation cycle" till the end of life when cycled in the range from about 0-10% depth-of-discharge (DOD) to about 90-100% DOD in Li-ion cells with typical negative-to-positive (NP) capacity loading ratios (e.g., from around 1.05 to about 1.20) in pouch cells (without pre-lithiation prior to the first charge; with no significant pressure (e.g., above about 1 atm.) applied during cycling). However, in some designs, it may be preferable (e.g., for attaining sufficiently high cycle life and other desirable properties) to use those conversion-type active material particles (or at least a significant fraction of those conversion-type active materials—e.g., in some designs, about 20-100 wt. %; in some designs, about 50-100 wt. %; in some designs, about 80-100 wt. %, relative to the total amount of all the conversion-type active material particles in the anode) in the blended anode that exhibit minimal electrode-level average increase in thickness at about 0-10% depth-of-discharge (DOD) (e.g. from about 0.0 to about 4.0% average increase in thickness; in some designs from about 0.0 to about 2%; in some designs from about 0.0 to about 1%) beyond the first "formation" cycle (or, in some designs, a few, 2-5, initial cycles) till the end of life when used in a pure form in a Li-ion battery cell designs (when anodes comprise only conversion-type active anode materials, binder(s) and additives without blending with carbonaceous intercalation-type active anode materials, e.g., without blending with graphite) and cycled in the range from about 0-10% DOD to about 90-100% DOD in pouch-type Li-ion cells with negative-to-positive (NP) capacity loading ratios from around 1.05 to about 1.20 (without pre-lithiation prior to the first charge; with no significant pressure (e.g., above about 1 atm.) applied during cycling). In some designs it may be preferable to use those conversion-type active material particles (or at least a significant fraction of the conversion-type active materials—e.g., in some designs, about 20-100 wt. %; in some designs, about 50-100 wt. %; in some designs, about 80-100 wt. %, relative to the total amount of all the conversion-type active material particles in the anode) in the blended anode that exhibit minimal electrode-level average increase in thickness at about 0-10% DOD (e.g. from about 0.0 to about 4.0%; in some designs from about 0.0 to about 2%; in some designs from about 0.0 to about 1%) beyond the first "formation" cycle (in some designs, a few, 2-5, initial cycles) till the cycle 200 (in some designs, till the cycle 400; in some designs till the cycle 800) when used in a pure form in a Li-ion battery cell designs (when anodes comprise only conversion-type active anode materials, binder(s) and additives and are not blended with carbonaceous intercalation-type active anode materials, e.g., not blended with graphite) and cycled in the range from about 0-10% depth-of-discharge (DOD) to about 90-100% DOD in Li-ion cells with negative-to-positive (NP) capacity loading ratios from around 1.05 to about 1.20 (without pre-lithiation prior to the first charge; with no significant pressure (e.g., above about 1 atm.) applied during cycling).

In some designs, the amount, type and various properties of the binder or binder components (e.g., swelling in electrolyte, mechanical properties, adhesion to active particles and the current collector, etc.) may have a significant impact on the performance characteristics of the blended anodes in Li-ion battery cells (e.g., cycle stability at different current densities, at different temperatures, rate performance, etc.) for a broad range of capacity loadings, but particularly those in excess of about 3.5-4 mAh/cm$^2$. The exact optimal binder composition and properties may often depend on the size, shape, surface chemistry and volume changes of the individual active material components in the blended anodes and their relative fractions. However, certain binder compositions have been found work particularly well, and certain properties of the binders may be particularly important for good performance, across a broad range of the blended (e.g., Si-comprising) anodes.

In some designs, it may be advantageous to use the same binders (or components of the binders) for the preparation of the blended anodes as those that work well for all the individual components (e.g., for both individual intercalation-type active material powders and their mixtures used in the blended anode and for the individual conversion-type active material powders and their mixtures used in the blended anode). In some designs, in order to identify a near-optimum (e.g., within about ±50%; in some designs within about ±25%) weight fraction of the binder in the blended electrode (as a fraction of all the solids in the electrode or all the solids in the slurry), one may effectively use a linear combination model (where wt. % of the binder in the blended electrode could be estimated by identifying near-optimal wt. % of the binders in the slurries comprising only intercalation-type active materials and only conversion-type active materials and multiplying them by the corresponding wt. fractions of intercalation-type and conversion-type active materials in the blended anode). Note that in some cases where binders comprise more than one binder component, the optimal ratio of such components in a binder may be substantially different for different active material components in the blended anode. Still, in some designs, the optimal ratio of such components of the binder for the blended anode may also be estimated by using a linear combination model.

Illustrative examples of the suitable and relatively common polymers (or components of the polymer mixtures) that may work well as binders (or components of binders) for a broad range of the blended anodes include, but are in no way not limited to: carboxy methyl cellulose (CMC)—based binders (including but not limited to Na-CMC, Li-CMC, K-CMC, etc. and their mixtures; in some designs, Li— salt may often be particularly favorable) particularly including those that additionally comprise elastic polymer nanoparticles, such as styrene butadiene rubber (SBR); polyacrylic acid (PAA) and their various salts (including but not limited to Na-PAA, Li-PAA, K-PAA, Ca-PAA and others and their mixtures; in some designs, Li-PAA salt may often be particularly favorable); (poly)alginic acid and various salts of (poly)alginic acid (Na-alginate, Li-alginate, Ca-alginate, K-alginate and many others and their various mixtures; in some designs, Li-alginate salt may often be particularly favorable); maleic acid and their various salts (e.g., Li, Na, K, etc.; in some designs, Li—salt may often be particularly favorable), various (poly)acrylates (including, but not limited to dimethylaminoethyl acrylate and many others), various (poly)acrylamides, various polyesters, styrene butadiene rubber (SBR), (poly)ethylene oxide (PEO), (poly)vinyl alcohol (PVA), cyclodextrin, maleic anhydride, methacrylic acid and its various salts (Li, Na, K, etc.; in some designs, Li—salt may often be particularly favorable), various (poly) ethylenimines (PEI), various (poly)amide imides (PAI), various (poly)amide amines, various other polyamine-based polymers, various (poly)ethyleneimines, sulfonic acid and their various salts, various catechol group-comprising polymers, various lignin-comprising or lignin-derived polymers, various epoxies, various cellulose-derived polymers (including, but not limited to nanocellulose fibers and nanocrystals, carboxyethyl cellulose, etc.), chitosan, other polymers (e.g., preferably water-soluble polymers) and their various copolymers and mixtures.

In some designs, it may be advantageous for the blended anodes to be cast from water-based slurries. Binders that comprise a significant portion of the polymers (e.g., about 15-100 wt. %; in some designs from about 50-100 wt. %, of all the solids in the binder) that exhibit no or relatively small (e.g., about 0.0001-5 vol. %; in some designs from about 0.001 vol. % to about 2 vol. %) swelling upon exposure to electrolytes may work particularly well in the design of the blended anodes.

In some designs, it may be advantageous for the binder for blended anodes comprising substantially volume-changing conversion-type active anode material particles to comprise two or more distinct components with substantially different shape, substantially different solubility in a slurry solvent (e.g., in some designs, by about 2 or more times; in some designs, one component may not be soluble at all), substantially different (e.g., by about 2 or more times) swelling in electrolyte and/or substantially different mechanical properties (e.g., elastic modulus, elasticity, etc. differing by about 2 or more times). In some designs, it may be advantageous to use elastic nanoparticles (e.g., with an average size in the range from around 10 nm to around 500 nm) in combination with more brittle and/or water-soluble binders (e.g., including those described above —CMC, Na-CMC, Li-CMC, K-CMC, alginic acid, Na-alginate, Li-alginate, PAA acid, Na-PAA, Li-PAA, mixed CMC salts, mixed alginate salts, mixed PAA salts, various acrylic binders, various alginates, their various mixtures and co-polymers, etc.) to overcome their brittle nature and be effectively utilized with both small and large (e.g., Si-containing) composite particles. In some designs, elastic nanofibers or nanoribbons (e.g., with an average diameter in the range from around 2 nm to around 500 nm, an average length in the range from around 10.0 nm to around 500,000.0 nm and an average aspect ratio in the range from around 3:1 to around 10,000:1) or elastic flakes (e.g., with an average thickness in the range from around 1 nm to around 500 nm, an average length in the range from around 10.0 nm to around 500,000.0 nm and an average aspect ratio in the range from around 3:1 to around 10,000:1; in some designs with holes) may be advantageously used instead of or in addition to conventional elastic nanoparticles. Suitable examples of composition of such particles include but are not limited to SBR, polybutadiene, polyethylene, polyethylene propylene, styrene ethylene butylene, ethylene vinyl acetate, polytetrafluoroethylene, perfluoroalkoxyethylene, isoprene, butyl rubber, nitrile rubber, ethylene propylene rubber, polyacrylic rubber, silicone rubber, fluorosilicone rubber, polyether block amide, polysiloxanes and their various co-polymers (such as polydimethylsiloxane), chlorosulfonated polyethylene, ethylene-vinyl acetate, their various mixtures and co-polymers, among other suitable elastomers. In some designs, a suitable mass fraction of such elastic nanoparticles (or nanofibers or nanoflakes) may range from around 5 wt. % to around 70 wt. % (as a fraction of the total binder content in the blended anode). While some conventional purely intercalation-type anodes (e.g., graphite based) may comprise spherical SBR particles (which may be made elastic, in some designs), these commonly comprise only from around 15% to around 50 wt. % of the total weight fraction of the binder. In contrast, in some designs it may be advantageous for the weight fraction of the elastic nanoparticles (or nanofibers or nanoflakes) (made of SBR or other elastic materials, including those described above) to range from around 55 wt. % to around 95 wt. % in the conversion-type anodes (e.g., Si comprising). The size of the volume-changing nanocomposite particles, the value of the volume changes and their shape may impact the optimal fraction of elastic particles. In some cases, larger volume changes, larger particles and more spherical (e.g., near-spherical or potato-shaped) particles (in contrast, for example, to flake-shaped or random shaped particles) may require a larger fraction of elastic particles in the binder. As such, the relative fraction of the elastic particles in the blended anodes may be estimated by using a linear combination model. In some designs, it may be advantageous for such elastic particles to exhibit certain mechanical properties. In some designs, maximum elongation (elongation at break) of elastic nanoparticles (or nanofibers or nanoflakes) may preferably range from around 20.0% to around 10,000.0% (in some designs, from around 50.0% to around 5000.0%). In some designs, a strain at yield of elastic nanoparticles (or nanofibers or nanoflakes) may preferably exceed about 20% (in some design, the strain at yield of the elastic nanoparticles may exceed about 100%).

In some designs, it may be advantageous to use water-soluble co-polymer binders for the blended anodes. In some designs, co-polymer binders may comprise a simple linear-chain structure (e.g., if it may be desirable to have plastic deformation within a binder at room or elevated temperatures to accommodate volume changes within conversion-type active material particles during charging or to accommodate electrode deformation during calendering, which, in turn, may be done either at room temperature, or, in some designs, at elevated temperatures). In other designs, co-polymer binders may be cross-linked. In some designs, cross-linked co-polymer binders may be utilized in the slurry (e.g., to reduce swelling or dissolution, for example, in water). In some designs, cross-linking may take place after the electrode casting. In some designs, it may be advantageous to induce some cross-linking after electrode calendering (e.g., to allow plastic deformation and stress relief during and/or after calendering). In some designs, it may be advantageous to induce cross-linking after the battery assembling (e.g., during so-called "formation cycles" or after the initial electrode expansion) in order to enhance mechanical strength/integrity/stability of the electrode after the initial expansion.

In some designs, water-soluble co-polymer binders may comprise at least one of the following components: vinyl (or butyl or methyl or propyl, etc.) acetate, vinyl (or butyl or methyl or propyl, etc.) acrylic, vinyl (or butyl or methyl or propyl, etc.) alcohol, vinyl (or butyl or methyl or propyl, etc.) acetate-acrylic, vinyl (or butyl or methyl or propyl, etc.) acrylate, styrene-acrylic, alginic acid (or its salts, e.g., Na, K, Ca, Mg, Li, Sr, Cs, Ba, La and other salts), acrylic acid (or its salts, e.g., Na, K, Ca, Mg, Li, Sr, Cs, Ba, La and other salts), vinyl (or butyl or methyl or propyl, etc.) siloxane (or other siloxanes), pyrrolidone, sterene, various sulfonates (e.g., styrene sulfonate, among others), various amines (incl. quaternary amines), various dicyandiamide resins, amide-amine, ethyleneimine, diallyldimethyl ammonium chloride.

In some designs, water-soluble co-polymer binders may comprise cellulose. In some designs, such a cellulose-comprising binder may comprise nanocellulose (nanofibers). In some designs, nanocellulose may comprise branched or dendritic cellulose nanofibers. In some designs, a nanocellulose-comprising binder may comprise at least one more binder component (e.g., CMC or others) with strong adhesion for the superior performance in the blended anode. In some designs, a nanocellulose-comprising binder may be water soluble.

In some designs, co-polymer binders may comprise poly (acrylamide) (that is, comprise acrylamide ($—CH_2CHCONH_2—$) subunits). In some designs, such poly (acrylamide)-comprising co-polymer binders may be water soluble. In some designs, such poly(acrylamide)-comprising co-polymer binders may also comprise acrylic acid, carboxylic acid, alginic acid or metal salt(s) thereof (e.g., Na, K, Ca, Mg, Li, Sr, Cs, Ba, La and other salts of such acids). Such and other additions may be utilized to tune the ionic character of the polymer, its solubility and interactions with both the solvents and active (electrode) particles (e.g., to achieve stability of a slurry, etc.).

In some designs, anion conducting heterogeneous polymers (such as alkoxysilane/acrylate or epoxy alkoxysilane, etc.), various anion conducting interpenetrating polymer networks, various anion conducting poly (ionic liquids) (cross-linked ionic liquids) or poly(acrylonitriles), various anion conducting polyquaterniums, various anion conducting comprising quaternary ammonium salts (e.g., benzyltrialkylammonium tetraalkylammonium, trimethyl ammonium, dimethyl ammonium, diallyldimethylammonium, etc.), various anion conducting co-polymers comprising ammonium groups, various anion conducting co-polymers comprising norbornene, various anion conducting co-polymers comprising cycloalkenes (e.g., cyclooctene), methacrylates, butyl acrylate, vinyl benzyl or poly(phenylene), various anion conducting co-polymers comprising organochlorine compounds (e.g., epichlorohydrin, etc.), various anion conducting co-polymers comprising ethers, bicyclic amines (e.g., quinuclidine), various anion conducting poly (ionic liquids) (cross-linked ionic liquids), various anion conducting co-polymers comprising other amines (e.g., diamines such as ethylene diamine, monoamines, etc.), various anion conducting co-polymers comprising poly (ether imides), various polysaccharides (e.g., chitosan, etc.), xylylene, guanidine, pyrodiniumn, among other units, may be advantageously used as co-polymer binders (or components of the polymer/co-polymer binder mixture) for the blended anodes in the context of one or more embodiments of the present disclosure. In some designs, a suitable co-polymer binder may be cationic and highly charged.

In some designs, various cation conducting polymers (including interpenetrating polymer networks) and cross-linked ionic liquids (e.g., with cation conductivity above around $10^{-10}$ S $sm^{-1}$) may be advantageously used for the blended anodes as binders or components of binders in the context with one or more embodiments of the present disclosure. In some designs, such polymers may advantageously exhibit medium-to-high conductivity (e.g., above around $10^{-10}$ S $sm^{-1}$, or more preferably above around $10^{-6}$ S $sm^{-1}$) for Li ions (in the case of Li or Li-ion batteries).

In some designs, various electrically conductive polymers or co-polymers (e.g., preferably with electrical conductivity above around $10^{-2}$ S $sm^{-1}$), particularly those soluble in water (or at least processable in water-based electrode slurries) may be advantageously used as binders or components of binders (e.g., components of the binder mixtures or components of co-polymer binders) for the blended anodes in the context of one or more embodiments of the present disclosure. In particular, sulfur (S) containing polymers/co-polymers, also comprising aromatic cycles, may be advantageously utilized. In some examples, S may be in the aromatic cycle (e.g., as in poly(thiophene)s (PT) or as in poly(3,4-ethylenedioxythiophene) (PEDOT)), while in other examples, S may be outside the aromatic cycle (e.g., as in poly(p-phenylene sulfide) (PPS)). In some designs, suitable conductive polymers/co-polymers may also comprise nitrogen (N) as a heteroatom. The N atoms may, for example, be in the aromatic cycle (as in poly(pyrrole)s (PPY), polycarbazoles, polyindoles or polyazepines, etc.) or may be outside the aromatic cycle (e.g., as in polyanilines (PANI)). Some conductive polymers may have no heteroatoms (e.g., as in poly(fluorene)s, polyphenylenes, polypyrenes, polyazulenes, polynaphthalenes. etc.). In some designs, the main chain may comprise double bonds (e.g., as in poly(acetylene)s (PAC) or poly(p-phenylene vinylene) (PPV), etc.). In some designs, it may be advantageous for the polymer/co-polymer binders to comprise ionomers (e.g., as in polyelectrolytes where ionic groups are covalently bonded to the polymer backbone or as in ionenes, where ionic group is a part of the actual polymer backbone). In some designs, it may be advantageous to use a polymer mixture of two or more ionomers. In some designs, such ionomers may carry the opposite charges (e.g., one negative and one positive). Examples of ionomers that may carry a negative charge include, but are not limited to various deprotonated compounds (e.g., if parts of the sulfonyl group are deprotonated as in sulfonated polystyrene). Examples of ionomers that may carry a positive charge include, but are not limited to various conjugated polymers, such as PEDOT, among others. An example of the suitable polymer mixture of two ionomers with opposite charges is poly(3,4-ethylenedioxythiophene) polystyrene sulfonate. In some designs, it may be advantageous to use polymer or co-polymer binders that comprise both conductive polymers and another polymer, that provides another functionality (e.g., serve as an elastomer to significantly increase maximum binder elongation or serve to enhance bonding to active materials or current collector, or serve to enhance solubility in water or other slurry solvents, etc.).

In some designs, co-polymer binders may advantageously comprise halide anions (e.g., chloride anions, fluoride anions, bromide anions, etc.) for the blended anodes. In some designs, co-polymer binders may advantageously comprise ammonium cations (e.g., in addition to halide anion, as, for example, in ammonium chloride). In some designs, co-polymer binders may advantageously comprise sulfur (S). In some designs, co-polymer binders may advantageously comprise allyl group (e.g., in addition to ammonium cations). For example, such co-polymer binders may advantageously comprise diallyldimethylammonium chloride (DADMAC) or diallyldiethylammonium chloride (DADEAC). Other suitable examples of such co-polymer binder components may include (but are not limited to): methylammonium chloride, N,N-diallyl-N-propylammonium chloride, methylammonium bromide, ethylammonium bromide, propylammonium bromide, butylammonium bromide, methylammonium fluoride, ethylammonium fluoride, propylammonium fluoride, butylammonium fluoride, to name a few.

In some designs, co-polymer binders for the blended anodes may comprise both poly(acrylamide) and ammonium halides (e.g., ammonium chloride) in their structure. As one suitable example, poly(acrylamide-co-diallyldimethylammonium chloride) (PAMAC) may be advantageously used as a co-polymer binder in the context of the present disclosure. In some designs, such PAMAC co-polymer binders may additionally comprise minor (e.g., less than around 5-10 wt. %) amounts of acrylic acid, carboxylic acid or alginic acid or metal salt(s) thereof (e.g., Na, K, Ca, Mg, Li, Sr, Cs, Ba, La and other salts of such acids).

The relative weight fraction of the binder in the blended anodes depend on the properties of the active material components and their relative fractions. Excessive binder content in the blended anode, for example, may undesirably reduce volumetric capacity of the electrodes or reduce electrode porosity and increase tortuosity, thus negatively affecting energy density or power density or both. In some designs, excessive binder content and insufficient remaining pore volume may also induce premature failure due to excessively increased resistance growing during cycling. Finally, higher binder content may increase total material costs. Too little binder, on the other hand, may provide insufficient mechanical robustness to the blended anode and induce premature electrode failure during cycling or delamination from the current collector in some designs. However, for many applications a suitable binder fraction ranges from about 0.5 wt. % to about 15 wt. % (in some designs, from about 0.5 wt. % to about 2.0 wt. %; in other designs, from about 2.0 wt. % to about 6.0 wt. %; in other designs, from about 6.0 wt. % to about 8.0 wt. %; in other designs, from about 8.0 wt. % to about 10.0 wt. %; in other designs, from about 10.0 wt. % to about 12.0 wt. %; in other designs, from about 12.0 wt. % to about 15.0 wt. %;) for the blended anodes (not considering the weight of the current collector foil).

In some designs, carbon nanotubes (incl. multiwalled, double-walled, single-walled), carbon nanofibers and other one dimensional (1D) carbon materials, exfoliated graphite, graphene, graphene oxide (incl. multiwalled, double-walled, single-walled, etc.) and other two dimensional (2D) carbon materials, carbon black or carbon onions and other zero dimensional (0D) carbon materials as well as various dendritic (e.g., connected or branched) carbon particles, small graphite particles and other structures three dimensional (3D) carbon materials may be effectively used as conductive carbon additives in blended anode construction. In some designs, conductive oxide, carbide or metal(s) in the form of 0D, 1D and 2D materials (e.g., nanoparticles, nanofibers or nanoflakes) may be successfully utilized as conductive additives. In some designs, conductive nanoparticles or nanofibers may be branched or dendritic. In some designs, conductive additives and active particles may have an opposite charge. In some designs, conductive additives and/or active particles may have functional groups attached to their surface. In some designs, heating of the electrode after casting or calendering may induce formation of chemical bonds between conductive additives and active particles. While the optimum content may vary greatly between designs, blended anodes in accordance with some designs may comprise from about 0.01 wt. % to about 6 wt. % of the conductive additives. In some designs, excessive content of conductive additives in the anodes may undesirably reduce volumetric capacity or increase pore tortuosity or increase first cycle losses, thus negatively affecting energy density or power density or both. Finally, higher content of conductive additives may increase total material costs. Too little conductive additives, however, may provide insufficient electrical connectivity within a blended anode, reduce its mechanical stability and also reduce its power rate and increase electrode resistance in some designs. As such, in some designs, it is generally desirable to reduce the amount of binder and conductive additives to the level where one or more other desired battery characteristics (e.g., sufficiently good mechanical stability, sufficiently low resistance, sufficiently high power, sufficiently good adhesion to the current collector foils, etc.) are attained for the desired application and application-specific specifications.

In some designs, it may be advantageous (e.g., for cell rate performance or stability or ease of manufacturing or for other considerations) to chemically bond conductive additives (e.g., carbon nanotubes or graphene ribbons or carbon flakes or carbon black or carbon fibers or metal nanofibers or metal flakes or metal nanoparticles) onto the outer surface of at least some (e.g., 2-100 wt. %) of active material particles. In some designs, such conductive additives may be grown on to the surface of active materials. In some designs, the growth of the conductive additives on the surface of active material powders may be conducted by using a vapor deposition technique (e.g., CVD, including a catalyst-assisted CVD). In some designs, conductive additives may be chemically attached or grown on to the surface of intercalation-type (e.g., carbonaceous) active materials. In some designs, conductive additives may be chemically attached or grown on to the surface of conversion-type (e.g., Si-containing) active materials.

In some designs, it may be advantageous to attach at least a portion (e.g., 2-100 wt. %) of a polymer or co-polymer binder and/or at least a portion (e.g., 2-100 wt. %) of conductive additives to the surface of at least some (e.g., 2-100 wt. %) of active particles prior to blended electrode assembling (e.g., by slurry preparation, casting, drying and calendering). If the electrode is prepared from a slurry, it may be advantageous in some designs to attach at least a position of a polymer or co-polymer binder and/or at least a portion of conductive additives to the surface of at least some of active particles prior to slurry mixing.

After electrode calendering, a "spring-back" effect (expansion of the electrode to some level after the initial compaction) may take place. Different types of conductive additives and different amounts of conductive additives may impact the degree of spring-back. For example, carbon nanotubes or nanofibers used as conductive additives may result in a larger spring-back amount compared to carbon black conductive additives. Similarly, in an example, the larger amounts of nanotubes or nanofibers or, in some cases, larger diameter and/or length of the nanotubes and nanofibers, may result in a larger spring-back amount. In some designs, different types of nanotubes and nanofibers (e.g., different microstructures, compositions, etc.) may result in a different amount of spring-back. In some designs, in order to reduce or minimize an often-undesirable impact of the "spring-back" effect while taking advantage of the favorable electrode properties of the blended anodes comprising carbon nanotubes, it may be advantageous in some designs to use a relatively small total amount of carbon nanotubes in the blended anode (e.g., from about 0.01 wt. % to about 3.0 wt. %—depending on the size and properties of the carbon nanotubes, the size, shape and density of the active material particles in the blended anode and the type of binder(s) in the blended anode to attain the most favorable properties; in some designs from about 0.01 wt. % to about 0.1 wt. %; in other designs from about 0.1 wt. % to about 0.2 wt. %; in other designs from about 0.2 wt. % to about 0.3 wt. %; in other designs from about 0.3 wt. % to about 0.4 wt. %; in other designs from about 0.4 wt. % to about 0.5 wt. %; in other designs from about 0.5 wt. % to about 0.6 wt. %; in other designs from about 0.6 wt. % to about 0.7 wt. %; in other designs from about 0.7 wt. % to about 0.8 wt. %; in other designs from about 0.8 wt. % to about 0.9 wt. %; in other designs from about 0.9 wt. % to about 1.0 wt. %; in other designs from about 1.0 wt. % to about 1.5 wt. %; in other designs from about 1.5 wt. % to about 2.0 wt. %; in other designs from about 2.0 wt. % to about 3.0 wt. %). Similarly, it may be advantageous in some designs to use carbon nanotubes with a relatively small diameter (e.g., median diameter of the individual tubes in the range from about 0.6 nm to about 6 nm). In some designs, when carbon nanotubes are used in combination with carbon black conductive additives, it may be advantageous for the carbon black to comprise a majority (e.g., from about 50.01 wt. % to 99.99 wt. %; in some designs from about 75 wt. % to about 99 wt. %) of all the conductive carbon additives in the blended anodes.

Attaining certain mechanical properties of the blended anode coatings may enable their superior performance in batteries. For example, in some designs, it may be advantageous for the blended anode coating to exhibit a tensile strain to (cohesive) failure (or elongation to break) that is commensurate with (within about 20%) or significantly in excess (e.g., by about 20-500% relatively to the overall coating thickness increase) of the expected overall anode coating thickness increase during the battery use (e.g., when considering all cycles, from the first to the last cycle). For example, if the blended anode coating thickness increases by, for example, about 10% from the cell assembling till the end of cell life, than it may be advantageous, in some designs, for such a blended anode to exhibit a tensile strain to failure from about 8% to about 60%. Note that in the ideal case the relevant strain to failure is the strain along the axis normal to the plane of the current collector and should ideally be measured when the electrode is immersed into the electrolyte. However, in some designs it may be easier to assess the strain to failure along the axis normal to the plane of the current collector. It may also be difficult to conduct measurements when the electrode is immersed in exactly the same electrolyte as used for the battery construction and the approximate electrolyte composition (e.g., determined by identifying the major solvents (e.g., about 20-100% wt. % relative to all the solvents in the electrolyte composition) and an approximate salt composition, within about ±50%). As such, in some cases, such measurements of the strain to failure along the axis normal to the plane of the current collector and in an approximate electrolyte composition (in some designs, without salts added to the solution) may serve as a sufficiently good approximation and may be used for the anode coating construction. Indeed, the coating may exhibit relatively isotropic mechanical properties in terms of the strain to failure along different directions. In some designs, measuring the strain to failure in the plane of the coating by applying a standard tensile testing approach to a free-standing coating in a dogbone sample geometry may work well. Overall, the relative thickness changes (and thus the desired strain-to-failure for the coatings) depend on the properties and composition of the blended anodes as well as the cell construction (e.g., pouch cell vs. cylindrical cell vs. coin cell, etc.; soft case-vs. hard case, etc.). However, for most of the blended anodes, the range of preferred (in some designs) minimum strain to failure values (as measured in the direction parallel to that of the current collector foil) in a blended anode may vary from about 5% to about 150% for a coating saturated with electrolyte (infiltrated with a suitable electrolyte).

In some designs, it may be advantageous for the compressive yield strength of the casted blended anode coating (comprised of a mix of active materials, binder, and conductive additives) to be sufficiently low such that irreversible densification of the coating may be achieved by calendering without exceeding the fracture strength of the active materials. In some designs, a compressive yield strength below about 600 MPa may be preferred. In some designs, a yield strength below about 300 MPa may be preferred. In some designs, a yield strength below about 150 MPa may be preferred.

In some designs, while integrating a blended anode into a cell, the coating may be subjected to significant bending stresses during folding and winding processes, which may undesirably result in delamination of the coating from the current collector. It may thus be advantageous for the calendered blended anode coating to be sufficiently well-adhered to the current collector to be capable of withstanding a cylindrical mandrel bend test for mandrel diameters ranging from about 100 mm to about 2 mm.

In some designs, the adhesion strength of blended anode coatings may be advantageously assessed after calendering using a 1800 peel test. The peel test may be performed, for example, by adhering a 0.5"-wide strip of 3M 401M tape to the coating and measuring the average force required to peel a 20 mm-long strip of the coating from the current collector at 2 mm/s. In some designs, it may be advantageous to produce and use in cell construction such blended anodes that exhibit average value of such a force in the range from about 0.01 N to about 50 N (in some designs, in the range from about 0.05 N to about 50 N; in some designs, more preferably in the range from about 0.1 N to about 10 N) to ensure sufficiently robust adhesion of the coating to the current collector during cycling.

In some designs, it may be preferred that the maximum shear stress at the coating-current collector interface to be below the fatigue limit for the interface or at a sufficiently low fraction of the shear strength that fatigue failure does not occur before about 1000-10,000 cycles.

A broad range of copper (Cu) foils are traditionally used as anode current collectors in low potential anodes (such as those based on graphite or blended anodes). However, in the context of one or more embodiments of the present disclosure, some of such current collectors may experience undesirable volume changes and, in some cases, fractures during cycling (particularly during the initial so-called "formation" cycles) due to the volume-changing nature of the high-capacity conversion-type anode particles that adhere to the current collectors. At the same time, in some designs, it may also be undesirable for the current collector foils to expand significantly (e.g., by more than about 1-6% in each dimension) due to stresses in the electrodes. As such, it may be advantageous in some designs to utilize foils with higher hardness, higher elastic modulus and higher fracture toughness than typical Cu foils used in most commercial cells. In some designs, the preferable average thickness of the metal (e.g., Cu) current collector foils may range from about 4 micron to about 18 micron (in some designs, from about 7 micron to about 11 micron).

In addition to pure Cu foils, other metal foils comprising metals such as nickel (Ni), titanium (Ti), iron (Fe), steel (including stainless steel), vanadium (V), their alloys as well as Cu-rich (e.g., about 85-99.8 at. % Cu) alloys, and layered metal foils comprising at least one near pure Cu (e.g., about 99.5-100 at. % Cu) and at least one Cu-poor (e.g., about 0-99.5 at. % Cu) layer may be effectively utilized in some designs. In some designs, current collector foils for the blended anodes may exhibit better mechanical properties (such as higher strength, higher fracture toughness, higher resilience to creep and fatigue, to name a few) than those used in pure intercalation-type carbonaceous anodes.

Such alternative metals may be more difficult to produce in a thin foil form (e.g., about 5-18 μm) and may be more expensive. In addition, such alternative metals may exhibit lower electrical conductivity. For various reasons, such materials are never used in conventional commercial Li-ion battery cells as anode current collectors. However, in the context of one or more embodiments of the present disclosure, in some designs, it may be advantageous for the blended anode current collector foils to comprise Ni, Ti, Fe, or other metals or Cu alloys (instead of pure Cu) to achieve the desirable performance and mechanical stability. In some designs, such anode current collector foils may be thin (e.g., about 5-18 μm) and comprise about 5-100 wt. % of Ti, Ni, Fe. In some designs, it may be also be advantageous to produce thin (e.g., in the range from about 0.01 to 3 μm) coatings of copper (Cu) on the surface of Ni, Ti, Fe, or carbon—based foil (or mesh or foam) current collectors. In some designs, the deposition of Cu may be conducted by electrodeposition, sputtering, or other suitable methods. In some designs, the layer of Cu may provide the following benefits: (i) advantageously improve adhesion to the electrode; (ii) advantageously improve electrical conductivity; and (iii) advantageously improve welding of the tabs, among other benefits. In some designs, the strength and mechanical properties of Cu foils may be enhanced be utilizing Cu alloys comprising Ni, Fe, Ti, Mg, or other suitable elements (that preferably exhibit minimal alloying with Li at low electrochemical potentials) in amounts exceeding approximately 2 wt. %.

Conventional cells commonly use solid metal foils (e.g., Cu foils) as the anode current collector and solid metal foils (e.g., Al foils) as the cathode current collector. However, in some designs, blended anodes according to aspects of the disclosure may be substantially thinner than pure graphite (or carbon-based) anodes due to higher volumetric capacity of the blended anodes (e.g., dure to the presence of high capacity conversion-type active materials). Furthermore, due to volume changes in the conversion-type active materials during cycling, such blended anodes may reduce adhesion to the current collectors' foils during cycling in some designs. If such battery cells are mechanically damaged (e.g., distorted or indented or penetrated, etc.), the Cu foil current collector may get into a direct contact with the cathode current collectors (e.g., Al foil). As a result, the produced internal short-circuit may rapidly dissipate such a significant amount of cell energy as to induce a fire or even an explosion. In some designs, in order to mitigate potential damages in the cells comprising conversion-type or blended anodes, it may be beneficial for the current collectors to comprise a multi-layered (e.g., sandwich-like) structure, where an insulative polymer layer (porous or dense; with or without mechanically reinforcing fibers or nanofibers or flakes or nanoflakes) is enclosed within electrically conductive metallic surface layers (e.g., Cu or other metals for the anode current collector and/or Al or other metals for the cathode current collector, as described above). In this case, rapid heating of the current collector would induce polymer melting and fracture of the current collector (e.g., similar to a fuse), thereby reducing or minimizing the total energy released and thus reducing or minimizing potential damages. In some designs, it may be beneficial for the metal layer(s) to exhibit average thickness in the range from about 0.1 micron to about 4.0 micron. In some designs, it may be beneficial for the polymer layer to exhibit average thickness in the range from about 2.0 micron to about 12.0 micron. In some designs, the polymer in the polymer layer may be thermoplastic. In some designs, it may be beneficial for the thermoplastic polymer in the polymer layer to exhibit melting at relatively low temperatures (e.g., from around 100 to around 200° C.).

In some designs, the strength and mechanical properties of the anode current collectors as well as adhesion to the electrodes may be enhanced by incorporating carbon or metallic (e.g., Ni, Fe, Ti, and other metals and metal alloys, including Cu) or ceramic (e.g., oxides, nitrides, carbides, etc.) or polymer (nano)fibers or nanotubes or nanowires or flakes or nanoflakes or various dendritic or branched particles into the bulk of the current collectors or depositing such fibers or nanotubes or nanowires or flakes or nanoflakes or various dendritic or branched particles onto the surface of the anode current collectors. In some designs, the average thickness of such composite current collectors may range from around 3 to around 25 micron. Smaller thickness may not be sufficient to provide the required mechanical strength or conductivity for certain applications, while larger thickness may undesirably reduce the volumetric or gravimetric energy density of cells and increase their cost to impractical levels for certain applications.

Most commercial foils (e.g., Cu foils) used in certain commercial cells (e.g., with graphite anodes) are typically produced by electrodeposition. These may exhibit crystalline grains oriented perpendicular to the foil orientation (sometimes referred to as 'column-shaped grains") and/or may exhibit limited maximum elongation and fracture toughness. In some designs, however, foils produced by rolling (e.g., pressure-rolling) may be advantageous for use with at least some of the described blended anodes with volume changing conversion-type active material particles because such particles may exhibit higher strength, higher fracture toughness and better fatigue resistance. In some designs, such foils may advantageously exhibit grains (e.g., crystalline grains) that are flattened (or elongated) in the direction parallel to the plane (or surface) of the foil. In some designs, an average aspect ratio of such grains may advantageously exceed 2.0 (e.g., be in the range from around 2.0 to around 1000.0). In some designs, an average size (e.g., length) of the grains in the plane of the foil may range from the around 0.2 micron to about 4,000 microns. In some designs, the rolled foils (alternatively referred to as "roll-thinned metal foils") may be annealed prior to use to reduce the amount of built-in stresses, increase average grain size and/or increase ductility of the foils. Rolled foils, however, may suffer from low surface roughness and, as a result, may have weaker adhesion to the electrode. In some designs, it may be advantageous to use rolled foils that comprise a top/surface layer. In some designs, the layer may exhibit similar or the same metal composition as the bulk/center portion of the rolled foils. In some designs, such a top/surface layer may be deposited by electrodeposition or other means on the rolled foils or produced by etching or laser micromachining or mechanical or other means in order to enhance surface roughness so as to increase adhesion to the electrode surface. In some designs, the desired range of thicknesses for such a layer may range from about 50 nm to about 7 micron (e.g., on each side of the foil).

In some designs, it may be preferred for the current collector foils used in the blended anodes to exhibit specific tensile strength in the range from about 400 MPa to about 2000 MPa (in some designs, from about 500 MPa to about 1000 MPa).

In contrast to the rule of mixtures that may be used in some designs for identifying a suitable composition and properties of the blended anodes, the electrolytes for use in high-performance Li-ion batteries with the blended anodes often may not comprise a simple mixture of the electrolytes used in Li-ion batteries with pure intercalation-type (e.g., graphite) anodes and pure conversion-type (e.g., Si-comprising) anodes. This is because some of the electrolyte components used in pure conversion-type (e.g., Si-comprising) anodes (for example, propylene carbonate, PC solvent) may lead to rapid failures of the graphite-comprising anodes (for example, due to solvent molecules' co-intercalation into the graphitic structure). Similarly, some of the electrolyte compositions that form a stable solid electrolyte interphase (SEI) layer on the surface of graphite anode may not be able to form a stable SEI on the surface of conversion-type (e.g., Si-containing) anode particles, in some designs.

It should also be noted that in some designs, different electrolyte compositions may offer the most favorable performance for cells comprising identical blended anodes and different cathodes (e.g., for different intercalation-type operating at different voltages including high voltage (charging at greater than about 4.35 V vs. $Li/Li^+$; in some designs great than about 4.45 V vs. $Li/Li^+$) intercalation-type cathodes, low-voltage (charging at less than about 4.0 V vs. $Li/Li^+$) intercalation-type cathodes, medium voltage (between about 4.0-4.35 V vs. $Li/Li^+$) intercalation-type cathodes, conversion type cathodes comprising S, conversion-type cathodes comprising F, etc.).

Conventional electrolytes for Li-ion batteries with intercalation-type cathodes and either pure intercalation-type anodes or blended anodes are generally composed of a 0.8-1.2 M solution of a single Li salt (such as $LiPF_6$) in a mixture of carbonate solvents with 1-2 wt. % of other organic additives. Common organic additives may include nitriles, esters, sulfones, sulfoxides, phosphorous-based solvents, silicon-based solvents, ethers, and others. Such additive solvents may be modified (e.g., sulfonated or fluorinated).

In some designs, other (not just $LiPF_6$) Li salts or salt mixtures may be favorably used in Li-ion cells with blended anodes (in some designs in combination with $LiPF_6$ salt). Examples of such salts include, but are not limited to: lithium tetrafluoroborate ($LiBF_4$), lithium perchlorate ($LiClO_4$), lithium hexafluoroantimonate ($LiSbF_6$), lithium hexafluorosilicate ($Li_2SiF_6$), lithium hexafluoroaluminate ($Li_3AlF_6$), lithium bis(oxalato)borate ($LiB(C_2O_4)_2$, lithium difluoro(oxalate)borate ($LiBF_2(C_2O_4)$), various lithium imides (such as $SO_2FN^-(Li^+)SO_2F$ (LiFSI), $CF_3SO_2N^-(Li^+)SO_2CF_3$, $CF_3CF_2SO_2N^-(Li^+)SO_2CF_3$, $CF_3CF_2SO_2N^-(Li^+)SO_2CF_2CF_3$, $CF_3SO_2N^-(Li^+)SO_2CF_2OCF_3$, $CF_3OCF_2SO_2N^-(Li^+)SO_2CF_2OCF_3$, $C_6FSSO_2N^-(Li^+)SO_2CF_3$, $C_6F_5SO_2N^-(Li^+)SO_2C_6F_5$ or $CF_3SO_2N^-(Li^+)SO_2PhCF_3$, and others), and others. In some designs, it may be particularly advantageous for such salts not to comprise any significant fraction of HF. In some designs, it may be advantageous for the pH of such salts to range from around 6.0 to around 10.0 (in some designs, from around 7.0 to around 9.0).

In some designs, such salts may be selected so that the Li salts (or their solvated counterparts) form a eutectic system (with a reduced melting point). In one example, several Li imide salts (e.g., a mixture of $SO_2FN^-(Li^+)SO_2F$ and a $CF_3SO_2N^-(Li^+)SO_2CF_3$ salts or a mixture of $CF_3SO_2N^-(Li^+)SO_2CF_3$ and $CF_3CF_2SO_2N^-(Li^+)SO_2CF_3$ or a mixture of $CF_3SO_2N^-(Li^+)SO_2CF_3$ and $CF_3CF_2SO_2N^-(Li^+)SO_2CF_2CF_3$, etc.) may form such a system. In some designs, such salts and their relative fractions may be selected to induce freezing point depression. In some designs, the most favorable relative fractions of the salts may be selected to minimize the freezing point (via such a freezing point depression). In some designs, other Li and non-Li salts may be added in small quantities (e.g., from around 0.001M to around 0.500M) to further depress the electrolyte melting point, improve SEI properties and reduce dissolution of active materials or their components. In some designs, the non-Li salts may be salts of Mg, K, Ca or Na. In some designs, the non-Li salts may be salts of rare earth metals (e.g., La).

In some designs utilizing two or more salts (e.g., three salts or four salts or five salts, etc.), it may be advantageous for at least one of the salts to comprise $LiPF_6$ (in the case of rechargeable Li or Li-ion batteries). In some designs, it may be further advantageous for one other salt to also be a salt of Li. It may be further advantageous for at least one other (non-$LiPF_6$) salt to be electrochemically unstable in the electrolyte (e.g., decompose on the anode) upon reduction of the anode potential to below about 0.3-2.3 V vs. $Li/Li^+$. In some designs, it may be advantageous for the salt decomposition to take place at above about 0.3 V vs. $Li/Li^+$, more preferably above about 1V vs. $Li/Li^+$(and in some designs, more preferably above about 1.5V vs. $Li/Li^+$). It may be further advantageous for the non-$LiPF_6$ salt in the electrolyte to induce or catalyze electrolyte reduction at above about 0.3 V vs. $Li/Li^+$, more preferably above about 1V vs. Li/Li+ (and in some designs, more preferably above about 1.5V vs. $Li/Li^+$or even above about 2.0 V vs. $Li/Li^+$). It may be further advantageous for the (e.g., partially decomposed) non-$LiPF_6$ salt in the electrolyte to react with at least some of the solvent molecules in the electrolyte to form oligomers. In some designs, a non-$LiPF_6$ salt may be LiFSI salt. Furthermore, in the case of the electrolyte comprising both $LiPF_6$ salt and LiFSI salt, the ratio of the molar fractions of $LiPF_6$ and LiFSI salts may preferably be in the range from around 100:1 to around 1:1. The exact optimal ratio may depend on the electrode characteristics, electrolyte solvent mix utilized and cycling regime (temperature, cell voltage range, etc.). In some designs, a non-$LiPF_6$ salt may be lithium fluorophosphate ($LiPO_2F_2$ or LFO). Furthermore, in the case of the electrolyte comprising both $LiPF_6$ salt and LiFSI salt, the ratio of the molar fractions of $LiPF_6$ and LFO salts may preferably be in the range from around 100:1 to around 1:1. The exact optimal ratio may depend on the electrode characteristics, electrolyte solvent mix utilized and cycling regime (temperature, cell voltage range, etc.).

In some designs of the cells comprising blended anodes (or, more broadly, anodes comprising conversion (incl. alloying) type active materials), it may be advantageous to have a total salt concentration in the electrolyte in the range from around 0.8M to around 2.4M (in some designs, from about 0.8M to about 1.2M; in other designs, from about 1.2M to about 1.4M; in other designs, from about 1.4M to about 1.6M in other designs, from about 1.6M to about 1.8M; in other designs, from about 1.8M to about 2.0M; in other designs, from about 2.0M to about 2.2M; in other designs, from about 2.2M to about 2.4M), while utilizing a small fraction of at least one at least partially fluorinated solvent in the electrolyte mixture in the range from around 1 vol. % to about 30 vol. % (in some designs, from about 1 vol. % to about 12 vol. %; in other designs, from about 12 vol. % to about 30 vol. %), as a fraction of all the solvents in the electrolyte. It may be further advantageous for the electrolyte solvent mixture to comprise both linear and cyclic molecules. In some designs, at least some of the linear molecules may advantageously be branched (comprise one or more branches).

In some designs, it may be preferred for the electrolyte to comprise an ethylene carbonate (EC) among cyclic molecule co-solvent(s) in electrolyte (e.g., in the range from about 1 vol. % to about 30 vol. %, as a fraction of all the solvents in the electrolyte; in some designs from about 1 vol. % to about 3 vol. %; in other designs from about 3 vol. % to about 6 vol. %; in other designs from about 6 vol. % to about 10 vol. %; in other designs from about 10 vol. % to about 15 vol. %; in other designs from about 15 vol. % to about 20 vol. %; in other designs from about 20 vol. % to about 25 vol. %; in other designs from about 25 vol. % to about 30 vol. %; in other designs from about 30 vol. % to about 35 vol. %; in other designs from about 35 vol. % to about 40 vol. %). In some designs, it may be preferred for the electrolyte to comprise a propylene carbonate (PC) among cyclic molecule co-solvent(s) in electrolyte (e.g., in the range from about 1 vol. % to about 30 vol. %, as a fraction of all the solvents in the electrolyte; in some designs from about 1 vol. % to about 3 vol. %; in other designs from about 3 vol. % to about 6 vol. %; in other designs from about 6 vol. % to about 10 vol. %; in other designs from about 10 vol. % to about 15 vol. %; in other designs from about 15 vol. % to about 20 vol. %; in other designs from about 20 vol. % to about 25 vol. %; in other designs from about 25 vol. % to about 30 vol. %; in other designs from about 30 vol. % to about 35 vol. %; in other designs from about 35 vol. % to about 40 vol. %). In some designs, it may be preferred for the electrolyte to comprise a vinylene carbonate (VC) or a vinyl ethylene carbonate (VEC) among cyclic molecule co-solvent(s) in electrolyte (e.g., in the range from about 0.1 vol. % to about 12 vol. %, as a fraction of all the solvents in the electrolyte; in some designs from about 0.1 vol. % to about 1 vol. %; in other designs from about 1 vol. % to about 2 vol. %; in other designs from about 2 vol. % to about 3 vol. %; in other designs from about 3 vol. % to about 4 vol. %; in other designs from about 4 vol. % to about 5 vol. %; in other designs from about 5 vol. % to about 6 vol. %; in other designs from about 6 vol. % to about 7 vol. %; in other designs from about 7 vol. % to about 8 vol. %; in other designs from about 8 vol. % to about 12 vol. %). In some designs, it may be advantageous for at least one of the cyclic molecules to comprise fluorine atoms. In some designs, it may be preferred for the electrolyte to comprise a fluoroethylene carbonate (FEC) co-solvent in electrolyte (e.g., in the range from about 0.1 vol. % to about 12 vol. %, as a fraction of all the solvents in the electrolyte; in some designs from about 0.1 vol. % to about 1 vol. %; in other designs from about 1 vol. % to about 2 vol. %; in other designs from about 2 vol. % to about 3 vol. %; in other designs from about 3 vol. % to about 4 vol. %; in other designs from about 4 vol. % to about 5 vol. %; in other designs from about 5 vol. % to about 6 vol. %; in other designs from about 6 vol. % to about 7 vol. %; in other designs from about 7 vol. % to about 8 vol. %; in other designs from about 8 vol. % to about 12 vol. %). In some designs, it may be advantageous for the total fraction of all cyclic co-solvents in the electrolyte to comprise from about 10 vol. % to about 40 vol. % of all the solvents in the electrolyte.

In some designs, it may be preferred for electrolyte to comprise branched analogues of EC or PC (e.g., in the range from about 1 vol. % to about 30 vol. %, as a fraction of all the solvents in the electrolyte). Examples of branched analogues of EC and PC for use are but not limited to 4,5-dimethyl-1,3-dioxolan-2-one, 4,4,5-trimethyl-1,3-dioxolan-2-one, 4,4-dimethyl-1,3-dioxolan-2-one, 4-ethyl-1,3-dioxolan-2-one, 4-propyl-1,3-dioxolan-2-one, 4-isopropyl-1,3-dioxolan-2-one.

In some designs, it may be preferred for the electrolyte to comprise one or more ester co-solvent(s) in electrolyte (e.g., in the range from about 20 vol. % to about 90 vol. % total, as a fraction of all the solvents in the electrolyte; in some designs from about 20 vol. % to about 40 vol. %; in other designs from about 40 vol. % to about 60 vol. %; in other designs from about 60 vol. % to about 70 vol. %; in other designs from about 70 vol. % to about 80 vol. %; in other designs from about 80 vol. % to about 90 vol. %).

In some designs, it may be preferred for the electrolyte to comprise one or more branched ester co-solvent(s) in electrolyte (e.g., in the range from about 20 vol. % to about 90 vol. % total, as a fraction of all the solvents in the electrolyte; in some designs from about 20 vol. % to about 40 vol. %; in other designs from about 40 vol. % to about 60 vol. %; in other designs from about 60 vol. % to about 70 vol. %; in other designs from about 70 vol. % to about 80 vol. %; in other designs from about 80 vol. % to about 90 vol. %).

In some designs, it may be preferred for the electrolyte to comprise one or more branched carbonate co-solvent(s) in electrolyte (e.g., in the range from about 5 vol. % to about 60 vol. % total, as a fraction of all the solvents in the electrolyte; in some designs from about 5 vol. % to about 10 vol. %; in other designs from about 10 vol. % to about 20 vol. %; in other designs from about 20 vol. % to about 30 vol. %; in other designs from about 30 vol. % to about 40 vol. %; in other designs from about 40 vol. % to about 60 vol. %).

In some designs, it may also be advantageous for at least one of the linear (or branched) molecule co-solvents to comprise one, two or more fluorine atoms (per molecule). In some designs, it may also be advantageous for at least one of the linear (or branched) molecule co-solvents to comprise one, two or more nitrogen atoms (per molecule).

The following electrolyte compositions may be beneficial for use in Li and Li-ion cells with blended anodes. These electrolyte compositions may comprise one or more of the following components: (a) low-melting point (LMP) solvent or solvent mixture; (b) regular melting point (RMP) solvent or solvent mixture; (c) additive (ADD) solvent or solvent mixture (added, for example, to improve anode electrolyte interphase properties or to improve cathode electrolyte interphase properties or to stabilize Li salts or to provide other useful functionality); (d) main (MN) Li salt or Li salt mixture; (e) additive (ADD) salt or salt mixture (not necessarily Li-based) (added, for example, to improve anode electrolyte interphase properties or to improve cathode electrolyte interphase properties or to stabilize Li salts or to provide other useful functionality); (f) other functional additives (OFADD) (added, for example, to enhance cell safety), where LMP solvent or LMP solvent mixture may preferably contribute to about 10-about 95 vol. % of the volume of all solvents in the electrolyte (for cells with high-capacity nanostructured or blended anodes, a more favorable volume fraction of LMP solvents may range from about 20 vol. % to about 90 vol. %; in some designs—from about 20 vol. % to about 40 vol. %; in other design—from about 40 vol. % to about 60 vol. %; in other designs from about 60 vol. % to about 75 vol. %; in other designs from about 75 vol. % to about 90 vol. %); where RMP solvent or RMP solvent mixture may preferably contribute from about 5 to about 90 vol. % of the volume of all solvents in the electrolyte (in some designs—from about 5 vol. % to about 10 vol. %; in other designs—from about 10 vol. % to about 15 vol. %; in other designs—from about 15 vol. % to about 20 vol. %; in other designs—from about 20 vol. % to about 25 vol. %; in other designs—from about 25 vol. % to about 30 vol. %; in other designs—from about 30 vol. % to about 40 vol. %; in other designs—from about 40 vol. % to about 90 vol. %); and where ADD solvent or solvent mixture may preferably contribute to about 0-about 6 vol. % of the volume of all solvents in the electrolyte; in some designs, about 0-about 12 vol. % of the volume of all solvents in the electrolyte. Particular values of the optimum volume fractions of the LMP, RMP and ADD solvents or solvent mixtures for particular applications may depend on the cell operating potentials, cell operating (or cell storage) temperature, areal capacity loadings, thickness and tortuosity of the electrodes, rates of charge and discharge desirable for cells in a given application, among other factors.

Examples of suitable esters for use as, for example, LMP solvent(s) or co-solvent(s) may include, but are not limited to, various formates (e.g., methyl formate, ethyl formate, propyl formate, butyl formate, amyl formate, hexyl formate, heptyl formate, etc.), various acetates (e.g., methyl acetate, ethyl acetate, propyl acetate, butyl acetate, amyl acetate, hexyl acetate, heptyl acetate, etc.), various propionates (e.g., methyl propionate, ethyl propionate, propyl propionate, butyl propionate, amyl propionate, hexyl propionate, heptyl propionate, etc.), various butyrates (e.g., methyl butyrate, ethyl butyrate, propyl butyrate, butyl butyrate, amyl butyrate, hexyl butyrate, heptyl butyrate, etc.), various valerates (e.g., methyl valerate, ethyl valerate, propyl valerate, butyl valerate, amyl valerate, hexyl valerate, heptyl valerate, etc.), various caproates (e.g., methyl caproate, ethyl caproate, propyl caproate, butyl caproate, amyl caproate, hexyl caproate, heptyl caproate, etc.), various heptanoates (e.g., methyl heptanoate, ethyl heptanoate, propyl heptanoate, butyl heptanoate, amyl heptanoate, hexyl heptanoate, heptyl heptanoate, etc.), various caprylates (e.g., methyl caprylate, ethyl caprylate, propyl caprylate, butyl caprylate, amyl caprylate, hexyl caprylate, heptyl caprylate, etc.), various nonaoates (e.g., methyl nonaoate, ethyl nonaoate, propyl nonaoate, butyl nonaoate, amyl nonaoate, hexyl nonaoate, heptyl nonaoate, etc.), various decanoates (e.g., e.g., methyl decanoate, ethyl decanoate, propyl decanoate, butyl decanoate, amyl decanoate, hexyl decanoate, heptyl decanoate, etc.), methyl 2-methylpropionate, methyl 2,2-dimethylpropionate (also called methyl trimethylacetate), methyl 2-methylbutyrate, ethyl 2-methylpropionate (also called ethyl isobutyrate), ethyl 2,2-dimethylpropionate (also called ethyl trimethylacetate), ethyl 2-methylbutyrate, methyl 3-methylbutyrate (also called methyl isovalerate), ethyl 3-methylbutyrate (also called ethyl isovalerate), 2-fluoro-2-methylpropionate, methyl 2-fluoropropionate, methyl 2-methyl-3-cyanopropionate, 2,2,2-trifluoroethyl isobutyrate, 2-cyanoethyl isobutyrate, 2,5-dicyanopentyl isobutyrate, 2-(2,2-dioxido-3H-1,2-oxathiol-4-yl)ethyl isobutyrate, 4-(methylsulfonyl)benzyl isobutyrate, 2-((difluorophosphoryl)oxy)ethyl isobutyrate, 2-((1,3,2-dioxaphospholan-2-yl)oxy)ethyl isobutyrate, 2-((trimethoxysilyl)oxy)ethyl isobutyrate, 2-(azidomethoxy)ethyl pivalate, allyl isobutyrate, but-2-yn-1-yl propionate, and fluorinated versions of the above-discussed esters, to name a few examples.

Examples of solvents suitable for use as RMP solvents in the electrolyte (or for the fabrication of RMP solvent mixtures in the electrolyte) may comprise: various carbonates (fluorinated acyclic carbonates may be particularly advantageous for use in cells with high voltage cathodes), various sulfones (e.g., dimethyl sulfone, ethylmethyl sulfone, etc.) and various sulfoxides, various lactones, various phosphorous based solvents (e.g., various linear and various cyclic phosphonates and phosphates, such as dimethyl methylphosphonate, triphenyl phosphate, 2-fluoro-1,3,2-dioxaphospholane 2-oxide, (2,2,2-trifluoroethoxy)-1,3,2-dioxaphospholane 2-oxide, etc.), various silicon based solvents, various types of higher melting point esters (e.g., esters with melting points above about minus (−) 50° C.), various ethers (e.g., dioxolane, monoglyme, diglyme, triglyme, tetraglyme, and polyethylene oxide, etc.), various cyclic ester-based molecules (e.g., butyrolactones and valerolactones), various dinitriles (e.g., succinonitrile, adiponitrile, and glutaronitrile), and various ionic liquids (e.g., imidazoliums, pyrrolidiniums, piperidiniums, etc., may be particularly useful in cells comprising high voltage cathodes). RMP solvent(s) may also be (either fully or partially) fluorinated. The most widely used (in Li-ion battery) fluorinated solvent is a fluoroethylene carbonate (FEC). FEC helps to form a more stable (more cross-linked compared to ethylene carbonate, EC) SEI, but its excessive use (e.g., above about 6-12 vol. %) may also induce cell performance reduction, particularly at elevated temperatures or/and in cells comprising high voltage cathodes operating at above about 4.2 V vs. $Li/Li^+$. Examples of solvents suitable for use as ADD solvents in the electrolyte (or for the fabrication of ADD solvent mixture in the electrolyte) may include various carbonates (including fluorinated carbonates), various sulfones (including fluorinated ones), various sulfoxides (including fluorinated ones), various lactones (including fluorinated ones), various phosphorous-based solvents (including fluorinated ones), various silicon-based solvents (including fluorinated ones) and various ethers (including fluorinated ones), various nitriles and dinitriles, among others. Nitriles and dinitriles typically suffer from unfavorable SEI formation on the anode, but in small quantities (e.g., in some cases, below around 10 vol. %, in some cases, below around 5 vol. %; in some cases, below around 2 vol. %) their applications in the electrolyte mix may improve electrolyte conductivity and cell performance, particularly where high voltage cathodes are utilized. In some cases (e.g., when high (e.g., above about 20 vol. %) content of so-called “SEI formers” are utilized in electrolyte), nitriles and dinitriles may also be components of a LMP solvent mixture.

As used herein, LMP refers to a melting point (of a solvent or a solvent mixture) that is generally below a threshold (e.g., below minus (−) 60° C.), such as in the range, for example, from about minus (−) 150° C. to about minus (−) 60° C. As used herein, RMP refers to a melting point (of a solvent or a solvent mixture) that is generally above a threshold (e.g., above minus (−) 60° C.), such as in the range from, for example, about minus (−) 60° C. to about plus (+) 30° C. In a further example, LMP may refer to a melting point (of a solvent or a solvent mixture) in a narrower range, such as from about minus (−) 140° C. to about minus (−) 70° C. or from about minus (−) 120° C. to about minus (−) 80° C.

In one or more embodiments of the present disclosure, it may further be advantageous for the LMP solvent(s) (or at least one major component of the LMP solvent mixture) in the electrolyte to exhibit a boiling point in excess of about +50° C. (more preferably, in excess of about +70° C.; and still more preferably, in excess of about +80° C.).

In some designs, various cyclic or linear or branched esters (e.g., γ-valerolactone, γ-methylene-γ-butyrolactone, γ-hexalactone, α-angelica lactone, α-methylene-γ-butyrolactone, ε-caprolactone, 5,6-dihydro-2H-pyran-2-one, γ-butyrolactone, δ-hexalactone, α-methyl-γ-butyrolactone, phthalide, γ-caprolactone, ethyl propionate, propyl acetate, methyl formate, ethyl acetate, propyl propionate, methyl propionate, ethyl propionate, methyl valerate, methyl butyrate, ethyl butyrate, butyl valerate, butyl butyrate, propyl propionate, methyl 2-methylpropionate, methyl 2,2-dimethylpropionate (also called methyl isobutyrate), methyl 2-methylbutyrate, ethyl 2-methylpropionate (also called ethyl isobutyrate), ethyl 2,2-dimethylpropionate, ethyl 2-methylbutyrate, methyl 2-fluoro-2-methylpropionate, methyl 2-fluoropropionate, methyl 2-methyl-3-cyanopropionate, 2,2,2-trifluoroethyl isobutyrate, 2-cyanoethyl isobutyrate, 2,5-dicyanopentyl isobutyrate, 2-(2,2-dioxido-3H-1,2-oxathiol-4-yl)ethyl isobutyrate, 4-(methylsulfonyl)benzyl isobutyrate, 2-((difluorophosphoryl)oxy)ethyl isobutyrate, 2-((1,3,2-dioxaphospholan-2-yl)oxy)ethyl isobutyrate, 2-((trimethoxysilyl)oxy)ethyl isobutyrate, 2-(azidomethoxy)ethyl pivalate, allyl isobutyrate, but-2-yn-1-yl propionate, etc.), (in some designs—without functional groups and in some designs with additional functional groups (e.g., halogens, alcohols, alkanes, alkenes, alkynes, ketones, aldehydes, ethers, amines, amides, imides, nitriles, sulfonyls, carboxylic acids, phosphates, etc.)), various cyclic or linear or branched ethers (e.g., tetrahydrofuran, tetrahydropyran, furan, 2-methyl tetrahydrofuran, 2-ethyl tetrahydrofuran, 4-methylpyran, pyran, 12-crown-4, 15-crown-5, 18-crown-6, 4-methyl-1,3-dioxane, dimethyl ether, methyl t-butyl ether, diethyl ether, methoxyethane, dioxane, dioxolane, monoglyme, diglyme, triglyme, tetraglyme, methyl tert-butyl ether (MTBE), also known as tert-butyl methyl ether, isobutyl methyl ether, 1-methoxy-2-methylpropane, ethyl tert-butyl ether (ETBE), tert-Amyl methyl ether (TAME), diisopropyl ether, propyl tert-butyl ether, 1-methylethyl 2-methylpropyl ether, 2,2-dimethylpropylethyl ether, isobutyl propyl ether, etc.), (in some designs without functional groups and in some designs with additional functional groups (e.g., halogens, alcohols, alkanes, alkenes, alkynes, ketones, aldehydes, ethers, amines, amides, imides, nitriles, sulfonyls, carboxylic acids, phosphates, etc.)), various anhydrides (e.g., glutaric anhydride, succinic anhydride, maleic anhydride, phthalic anhydride, cyclobutane-1,2,3,4-tetracarboxylic dianhydride, butyric anhydride, isobutyric anhydride, etc.), (in some designs without functional groups and in some designs with additional functional groups (e.g., halogens, alcohols, alkanes, alkenes, alkynes, ketones, aldehydes, ethers, amines, amides, imides, nitriles, sulfonyls, carboxylic acids, phosphates, etc.)), and fluorinated versions of the above-discussed solvents and their mixtures may be advantageously utilized as LMP solvents or co-solvents in the LMP mix.

In some designs, adding different functional groups to selected electrolyte solvents (e.g., to at least some of the solvent(s) in the LMP or LMP mixture(s), such as anhydrides, ethers, esters and others or to at least some of the solvents from the RMP or RMP mixture(s)) may provide various advantages in certain applications. For example, adding electron donating material(s) (such as alkanes, methoxy, amines, etc.) may reduce reduction potential (that is make it harder to reduce), which may be advantageous when such a reduction for a particular solvent needs to be avoided or minimized (e.g., when such solvent(s) are not used to form an SEI, but are added to maintain high ionic conductivity within the electrode pores at cell operating temperatures). In another example, adding electron withdrawing material (s) (such as a fluorine, esters, nitro groups, etc.) may increase the solvent reduction potential (make it easier to reduce), which may be advantageous when such solvent(s) are used as components of a stable SEI formation. In an example, forming such an SEI at elevated potentials (before other electrolyte solvent components are reduced) may prevent undesirable reduction of other solvents (e.g., solvents that form a less stable SEI or less ionically conductive SEI or SEI with less favorable other characteristics) on the electrode surface. In addition, such solvents may offer higher oxidation potentials (which may be advantageous for maintaining improved stability and reducing leak rates, etc.) if cathodes are exposed to high electrode potentials (e.g., above about 4.4 V vs. $Li/Li^+$).

In the case of electron withdrawing material(s), replacement of selected hydrogen atoms in such solvents or co-solvents by fluorine atoms (e.g., by using various fluorination reactions or other mechanisms) may be particularly advantageous in some designs. Specifically, electrolyte solvents/co-solvents (e.g., components of the LMP and/or RMP electrolyte solvent components) that already work reasonably well in applications (e.g., form a somewhat stable SEI layer) may additionally benefit (e.g., show increased cycle stability or other benefits) from at least partial fluorination, particularly if conversion-type comprising blended anodes are utilized in cell construction. Such a reaction may increase SEI formation potential and enhance electrochemical stability of electrodes (e.g., via enhanced stability of the protective anode SEI or cathode SEI layer) during cycling. Suitable examples include various fluorinated esters, various fluorinated ethers, various fluorinated anhydrides in the case of LMP components and various other fluorinated solvents (including carbonates, nitriles, sulfones, larger esters, etc.) in the case of RMP components. It will be appreciated that the optimum fluorination or content of the fluorinated solvent may vary from application to application. For example, excessive fluorination or using too much of the fluorinated solvents may be undesirable in some applications (e.g., if the battery cathode may be exposed to high temperatures (e.g., above about 40° C.) and high operating potentials (e.g., above about 4.4 V vs. $Li/Li^+$)). In addition, excessive fluorination or using too much of the fluorinated solvents may reduce electrolyte wetting of some of the separators or electrodes and thus reduce capacity utilization and rate performance, particularly at lower temperature. The optimum content of the fluorinated solvent may depend on cell operation, as well as electrode and separator surface chemistry and properties.

In some designs, the use of solvents (co-solvents) (e.g., as components of the LMP or RMP electrolyte solvent components) that exhibit double bond(s) in their structure (e.g., one, less than one or more than one double bonds per solvent molecule) or other opportunities to form a polymer upon chemical or electrochemical reaction(s) may be advantageous for the formation of more stable SEI (e.g., via alkene polymerization). Solvent molecules that contain both a double bond and a fluorine may be particularly attractive for forming an SEI with favorable characteristics (e.g., improved stability, etc.). Similarly, solvents (co-solvents) that may undergo ring opening polymerizations (e.g., in solvents with a ring structure that contains an alkene or a variety of heteroatoms, such as propane sulfone) may also be advantageously utilized as electrolyte components due to their ability to form a more stable SEI in some designs. Examples of suitable double bond molecules may comprise vinylene carbonate, maleic anhydride, tetrachloroethylene, trichloroethylene, cyclohex-2-en-1-one, 5,6-dihydro-2H-pyran-2-one, cyclohexa-3,5-diene-1,2-dione, cyclopenta-2,4-dien-1-one, furan-2(5H)-one, diallyl carbonate, methyl allyl carbonate, vinyl acetate, vinyl propioniate, vinyl butyrate, vinyl isobutyrate, vinyl trimethyl acetate, vinyl isovalerate, allyl acetate, allyl propionate, allyl butyrate, allyl isobutyrate, allyl trimethylacetate, allyl isovalerate, methyl acrylate, methyl methacrylate, ethyl methacrylate.

In some designs, the use of solvents (co-solvents) (e.g., as components of the LMP or RMP electrolyte solvent components) that exhibit chlorine-carbon bond(s) in their structure (e.g., one, less than one or more than one chlorine-carbon bonds per solvent molecule) or other opportunities to form SEI with favorable characteristics charge transfer resistance characteristics (e.g., improved stability, etc.). The examples of chlorine-carbon bond molecules may comprise tetrachloroethylene, trichloroethylene, hexachloro-1,3-butadiene, chloroethylene carbonate, 4,5-dichloro-1,3-dioxolan-2-one, 4-chloro-5-fluoro-1,3-dioxolan-2-one, 4-chloro-5-methyl-1,3-dioxolan-2-one, 4-chloro-1,3-dioxol-2-one, 4-(chloromethyl)-1,3-dioxolan-2-one.

In some designs, it may be beneficial to have a mixture of solvents in the electrolyte composition, one or more of which exhibit a broad electrochemical stability window and one or more others of which exhibit a narrower electrochemical stability window (at least in combination with the electrolyte salt). In some designs, it may be beneficial for the difference in the electrochemical stability window of at least some of the electrolyte solvents to exceed about 1V. In some designs, it may be advantageous for at least one component of the LMP solvent mix to exhibit a higher electrochemical stability window than at least one component of the RMP solvent mix (at least when used with the same electrolyte salt).

In some designs, it may be advantageous for the LMP solvents in the suitable electrolyte compositions to exhibit a certain molecular size for optimal performance. The optimal size or size distribution of the LMP molecules may depend on the electrode characteristics, electrolyte solvent mix utilized and cell cycling regime (temperature, voltage range, etc.). In an example, an average LMP molecule (e.g., in a LMP solvent mix, if more than one LMP solvent is utilized or in a single-solvent LMP composition) may preferably comprise from around 9 atoms to around 30 atoms per solvent molecule. In some designs, it may also be advantageous that an average LMP molecule (e.g., in LMP solvent mix or in a single-solvent LMP composition) comprises from around 3 to around 10 carbon atoms in its molecular structure. In some designs, smaller LMP molecules (particularly smaller linear molecules) may result in reduced cell cycle stability. In some designs, larger LMP molecules (particularly larger linear molecules) may result in undesirably reduced rate performance of cells. In some designs, if linear esters are used as components of LMP solvent(s), it may be advantageous for such esters to comprise from about 3 to about 9 carbon atoms per molecule, on average. In some designs, if LMP solvent(s) comprise esters with side branches (additional functional groups), it may be advantageous for such esters to comprise from about 4 to about 12 carbon atoms per molecule, on average. In some designs, the average ester molecules (in LMP co-solvents) with 4-to-8 carbon atoms per molecule (on average) may provide the most stable performance in cells. In some designs, the average ester molecules (in LMP co-solvents) with 5-to-7 carbon atoms per molecule (on average) (in some designs with 5 carbon atoms per molecule) may provide the most stable performance in cells. In some designs, it may be advantageous for about 50 vol. % or more of the LMP solvents to comprise ester molecules with 5 or 6 carbon atoms per molecule (on average).

In some designs where ester(s) are used as co-solvent(s) in the suitable electrolyte mixture (e.g., for some cells with blended anodes and with high-voltage intercalation cathodes), it may be advantageous for the total fraction of esters in electrolyte solvent to range from about 20 vol. % to about 90 vol. % (in some designs comprising linear or branched esters, from about 20 vol. % to about 40 vol. %; in other designs—from about 40 vol. % to about 50 vol. %; in other designs—from about 50 vol. % to about 60 vol. %; in other designs—from about 60 vol. % to about 70 vol. %; in other designs—from about 70 vol. % to about 80 vol. %; in other designs—from about 80 vol. % to about 90 vol. %) as a total vol. fraction of all the solvents in the electrolyte. In some designs, both lower and higher ester fractions may lead to noticeably reduced cycle stability, particularly at elevated temperatures.

In some designs where ester(s) are used as co-solvent(s) in the suitable electrolyte mixture (e.g., for some cells with blended anodes and with intercalation cathodes, including high-voltage intercalation cathodes), it may be advantageous for the branched esters to comprise from about 40 vol. % to about 100 vol. % of all the esters in the electrolyte (in some designs, from about 40 vol. % to about 50 vol. %; in other designs, from about 50 vol. % to about 60 vol. %; in other designs, from about 60 vol. % to about 70 vol. %; in other designs, from about 70 vol. % to about 80 vol. %; in other designs, from about 80 vol. % to about 100 vol. %). The use of higher fraction of branched esters may reduce gassing on the cathode (particularly at higher voltages or at higher temperatures), improve cycle life, reduce cell swelling at the end of life and provide other performance or safety benefits. Some of such benefits may also translate to cells comprising pure conversion-type anodes that do not comprise intercalation-type materials (e.g., graphites or soft carbons or hard carbons).

In some designs, it may be advantageous (for improved cell performance) to use a combination of two, three or more branched or linear esters of the same chemical formula, but different molecular structure in the electrolyte solvent mix. For example, use a combination of two, three or more of the following branched or linear esters may be used: ethyl isobutyrate ($C_6H_{12}O_2$), methyl isovalerate ($C_6H_{12}O_2$), isopropyl propionate ($C_6H_{12}O_2$), isobutyl acetate ($C_6H_{12}O_2$), isoamyl formate ($C_6H_{12}O_2$); methyl valerate ($C_6H_{12}O_2$), ethyl butyrate ($C_6H_{12}O_2$), propyl propionate ($C_6H_{12}O_2$), butyl acetate ($C_6H_{12}O_2$) and amyl formate ($C_6H_{12}O_2$). Or, in another example, use a combination of two, three or more of the following esters: ethyl isovalerate ($C_7H_{14}O_2$), isomethyl caproate ($C_7H_{14}O_2$), isoethyl valerate ($C_7H_{14}O_2$), isopropyl butyrate ($C_7H_{14}O_2$), isobutyl propionate ($C_7H_{14}O_2$), isoamyl acetate ($C_7H_{14}O_2$), isohexyl formate ($C_7H_{14}O_2$), methyl caproate ($C_7H_{14}O_2$), ethyl valerate ($C_7H_{14}O_2$), propyl butyrate ($C_7H_{14}O_2$), butyl propionate ($C_7H_{14}O_2$), amyl acetate ($C_7H_{14}O_2$), hexyl formate ($C_7H_{14}O_2$). Or, in another example, use a combination of two, three or more of the following esters: methyl isobutyrate ($C_5H_{10}O_2$), ethyl isopropionate ($C_5H_{10}O_2$), isopropyl acetate ($C_5H_{10}O_2$), isobutyl formate ($C_5H_{10}O_2$), methyl butyrate ($C_5H_{10}O_2$), ethyl propionate ($C_5H_{10}O_2$), propyl acetate ($C_5H_{10}O_2$), butyl formate ($C_5H_{10}O_2$).

In some designs, it may be advantageous (for improved cell performance—e.g., improved rate or improved stability, etc.) to use a combination of two, three or more esters (and in some designs—combinations of ethers or anhydrides) with a similar chemical formula, e.g., where the number of carbon atoms differs by no more than 3 (e.g., to use a combination of branched (or linear) esters with chemical formulas of $C_5H_{10}O_2$, $C_6H_{12}O_2$ and $C_7H_{14}O_2$) in the electrolyte. In some designs, it may be advantageous if such a combination of esters (or ethers or anhydrides) exhibits a lower melting point than each of the individual solvents (e.g., individual esters or individual ethers or individual anhydrides).

In some designs, it may be advantageous (for improved cell performance) to use a combination of esters (and in some designs—combinations of ethers or combination of anhydrides) with and without functional groups in the electrolyte. In some designs, it may be advantageous for the linear (or branched or cyclic) part of such esters (or ethers) to be the same or similar so that the presence of (e.g., different) functional groups sets these esters (or ethers) apart.

In some designs when a combination of branched and linear esters or branched and cyclic esters or cyclic and linear esters or branched, linear and cyclic esters (and in some designs combinations of esters and ethers) is used and when they have functional groups, it may be advantageous (for improved cell performance) for at least some of the esters or ethers to remain unfunctionalized.

In some designs, it may be advantageous (for improved cell performance) to use a combination of branched and linear esters or branched and cyclic esters or cyclic and linear esters or branched, linear and cyclic esters in the electrolyte.

In some designs, when a combination of linear, branched or cyclic esters is used and when at least some of them have functional groups, it may be advantageous (for improved cell performance) for at least some of the linear, branched or cyclic esters to have the same functional group.

In some designs (when a mixture of various esters is used), it may be advantageous for the linear or branched esters in the electrolyte mix to exhibit either the same chemical tail (the same R group) or belong to the same sub-class.

In some designs, it may be advantageous (for improved cell performance) to use a combination of ethers and esters in the electrolyte. In some designs, it may be advantageous for the number of carbon atoms in the ester molecules not to exceed the number of carbon atoms in the ether molecules by more than five (e.g., have 2 or 3 carbon atoms in ether molecules and have 5 or 6 or 7 carbon atoms in ester molecules).

In some designs, it may be advantageous (for improved cell performance) to use a combination of esters, ethers and anhydrides (e.g., branched) in the electrolyte.

In some designs, when a combination of esters, ethers and anhydrides is used, it may be advantageous for the linear (or branched or cyclic) part of such esters (or ethers or anhydrides) to be the same or similar so that the presence of (e.g., different) functional groups sets these esters (or ethers or anhydrides) apart.

In some designs, it may be advantageous (for improved cell performance) to use a combination of two or more (e.g., linear, branched or cyclic) anhydrides in the electrolyte.

In some designs (e.g., with cells with high voltage cathodes), it may be advantageous (for improved cell performance) to use sulfones as components of RMP solvents. In some designs, it may be advantageous for the sulfones to comprise from about 17 vol. % to about 97 vol. % of all the RMP solvents in the electrolyte formulation. In some designs, it may be advantageous for the sulfones to comprise both cyclic and linear (or, more generally, not cyclic) sulfones.

Figure 2:
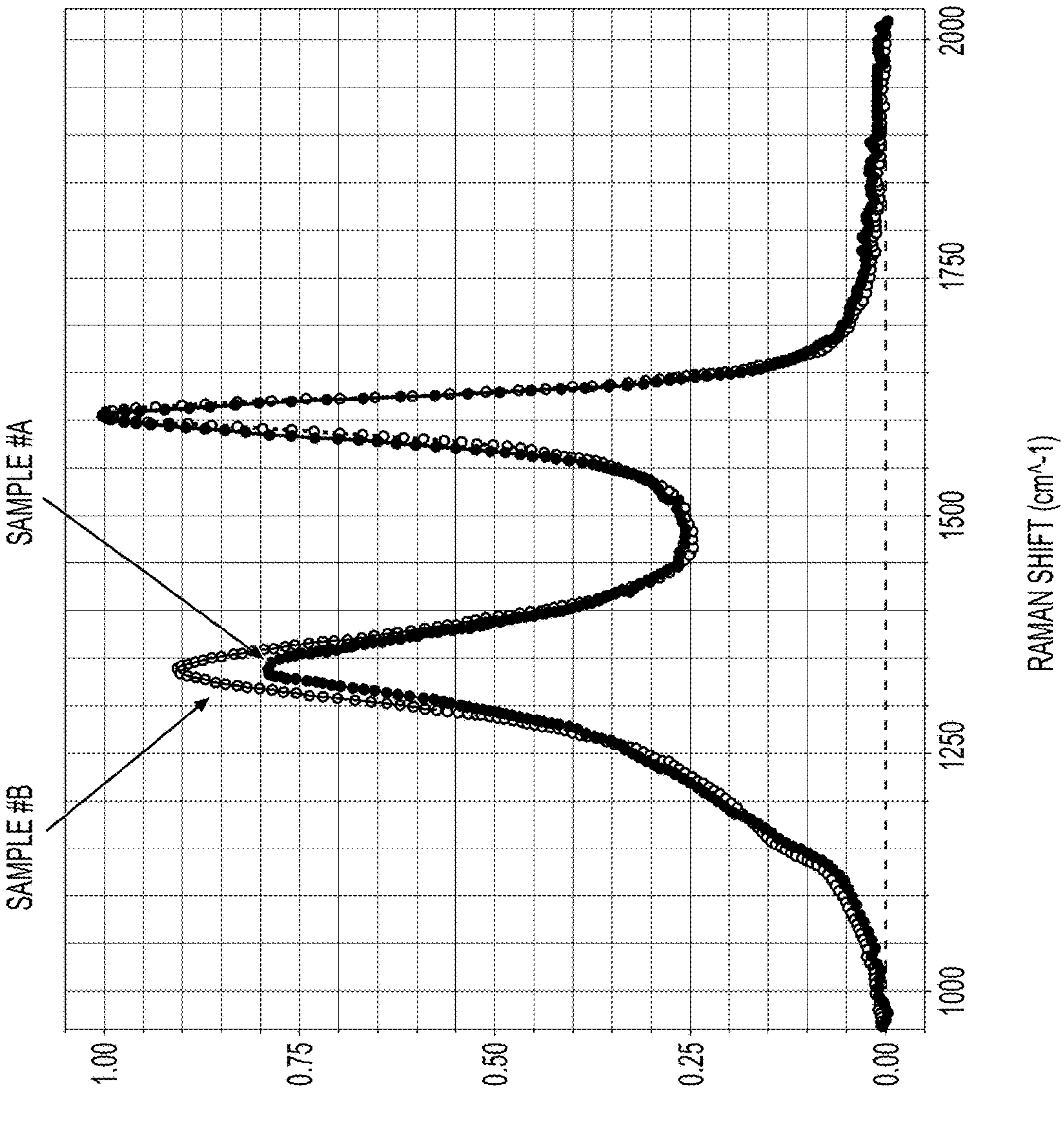
FIG. 2 illustrates example Raman spectra of the C-containing conversion-type anode particles that may be used in the exemplary formulation of the blended anode.

FIG. 2 illustrates exemplary Raman spectra of suitable conversion-type Si-comprising and C-comprising active particles showing favorable carbon signature and favorable (e.g., higher) $I_D/I_G$ ratio for the composite particle and the carbon-comprising coating layer. In particular, Raman spectra is shown for a Sample A comprised of conversion-type Si-comprising composite particles (e.g., arranged as powder) with a shell comprising a conductive carbon coating layer, and a Sample B is also comprised of conversion-type Si-comprising composite particles (e.g., arranged as powder) with a shell comprising a conductive carbon coating layer. Higher $I_D/I_G$ ratio may correspond to better stability and rate performance in blended anodes, in some designs.

Figure 3:
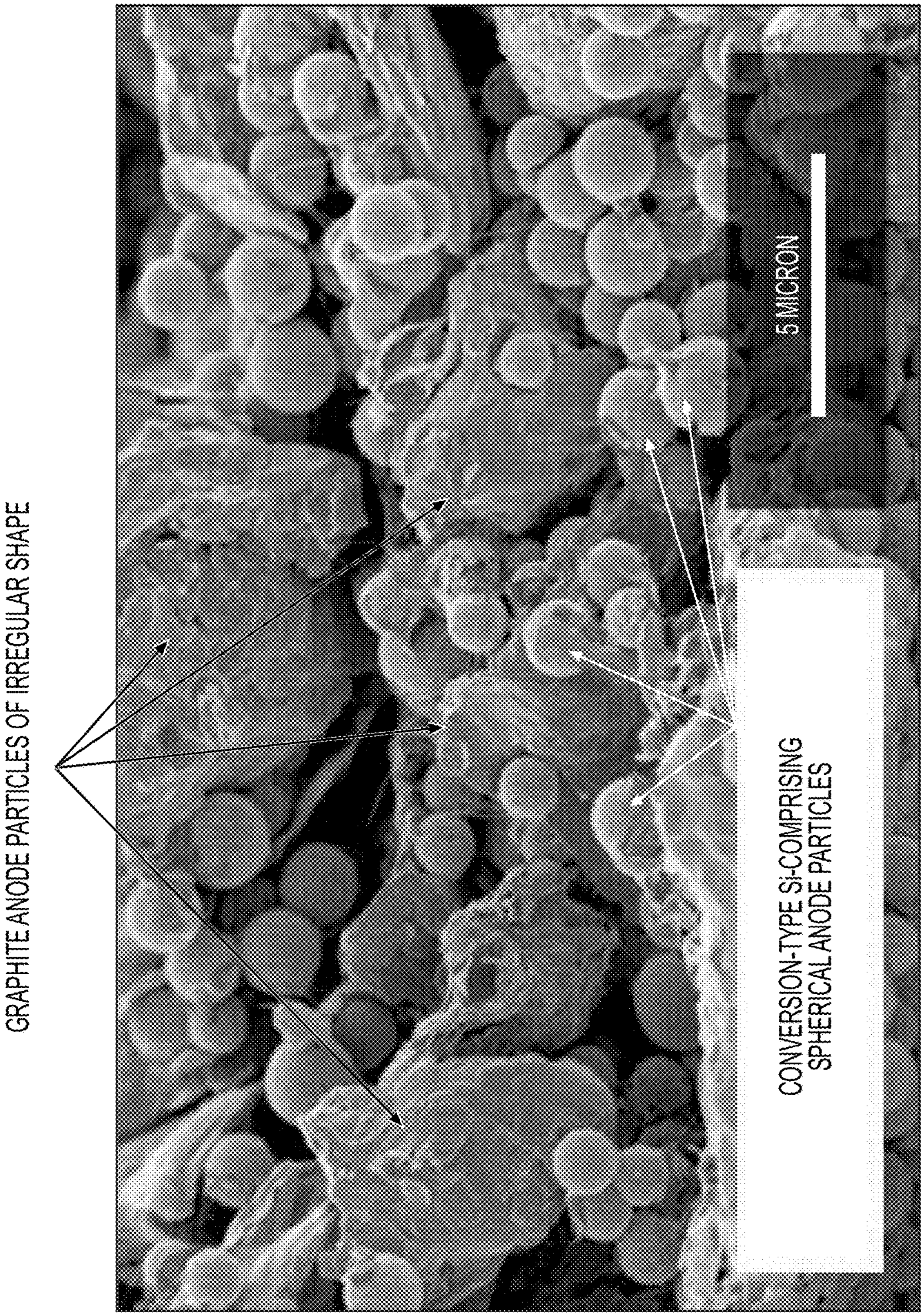
FIG. 3 illustrates an example scanning electron microscopy (SEM) image of the blended anode with suitable composition and properties.

FIG. 3 illustrates an exemplary suitable aqueous slurry-coated blended anode comprising (a) ~19.2 wt. % (relative to the total weight of active materials) of suitable conversion-type Si-comprising active material particles with near spherical shape, BET SSA in the range of 5-10 $m^2/g$ and median size (diameter) within a 1-2 micron range and (b) ~81.8 wt. % (relative to the total weight of active materials) of artificial graphite particles with irregular shape, BET SSA in the range of 1-1.5 $m^2/g$ and median $D_v50$ size (average dimensions) within a 12-20 micron range. These graphite particles exhibit reversible capacity of up to ~340 mAh/g and first cycle coulombic efficiency up to ~94%. These Si-comprising active material particles exhibit reversible capacity in the range of 1500-1700 mAh/g and first cycle coulombic efficiency up to ~92%. The blended anodes also comprise a two component CMC/SBR binder (with a relative fraction of CMC and SBR of –25 wt. % and –75 wt. %, respective to the total weight of CMC and SBR combined). The blended (calendered) anode density was estimated in the range of 1.3-1.5 $g/cm^3$. The packing efficiency of active particles in the blended anode was estimated to be in the range of 58-65 vol. %.

Figure 4:
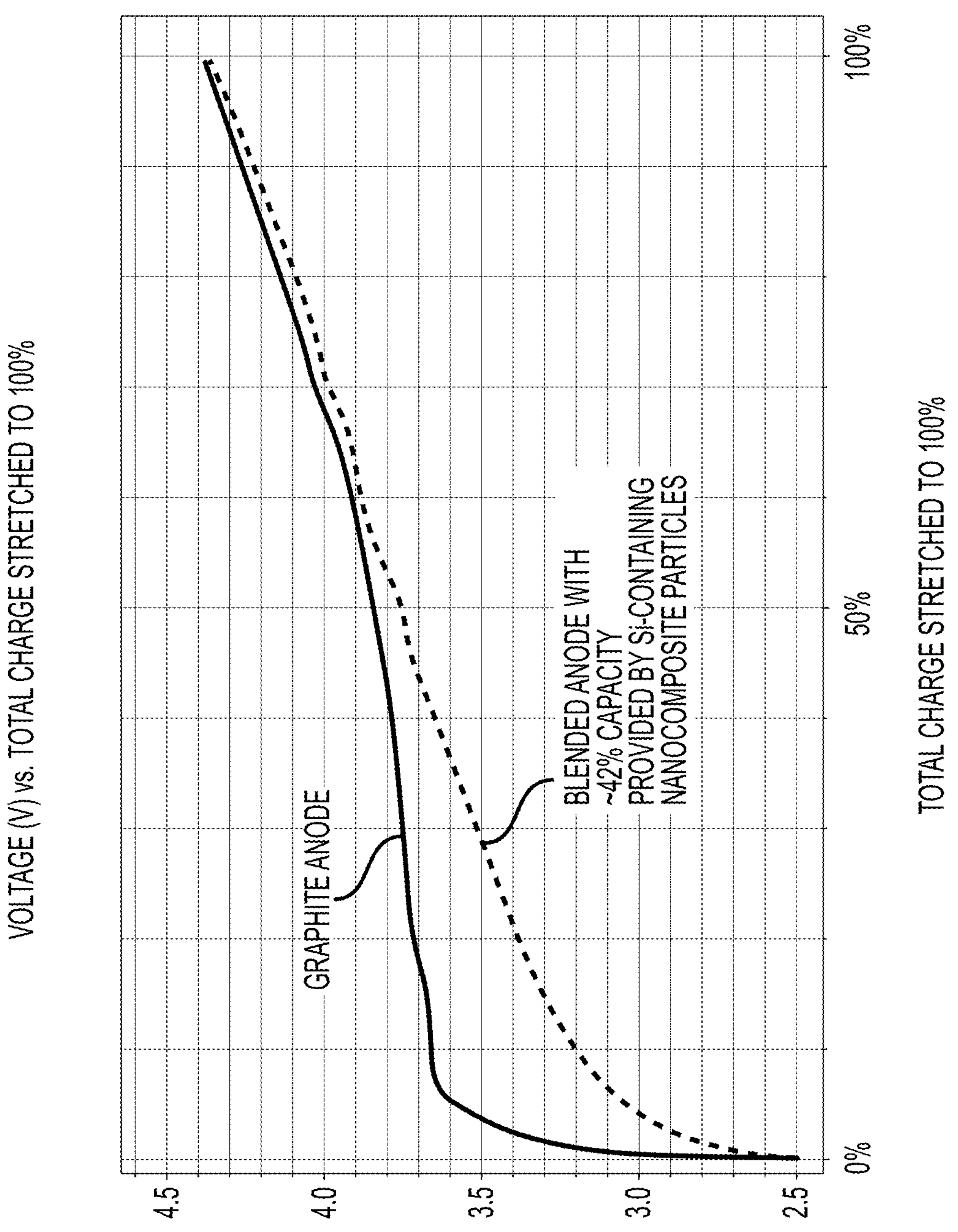
FIG. 4-8 illustrate example performance characteristics of the blended anodes with suitable composition and properties.

FIG. 4 illustrates exemplary discharge voltage curves for cells comprising LCO cathodes matched with either graphite or blended anode, where 42% capacity of the blended anode was provided by Si-containing porous nanocomposite powder. In this particular example the Si-containing porous nanocomposite powder was near spheroidal in shape and exhibited core-shell structure and the following characteristics: average particle size (diameter) in the range from about 1 to about 2 micron; specific surface area in the range from about 2.5 to about 25 $m^2/g$; closed pore volume in the range from about 0.2 $cm^3/g$ to about 0.8 $cm^3/g$, total porosity in the range from about 20 vol. % to about 70 vol. %; comprised conductive $sp^2$-bonded carbon and showed $I_D/I_G$ ratio of Raman D- and G-bands' peak intensities in the range from about 1 to about 2 when measured using a laser operating at a wavelength of 532 nm; comprised from about 40 wt. % to about 50 wt. % silicon (Si), comprised less than 2 wt. % oxygen (O). The blended anode comprised CMC and SBR blended binder and carbon nanotube carbon additives. The blended cell electrolyte comprised over 40% of low melting point esters as LMP co-solvents.

Figure 5A:
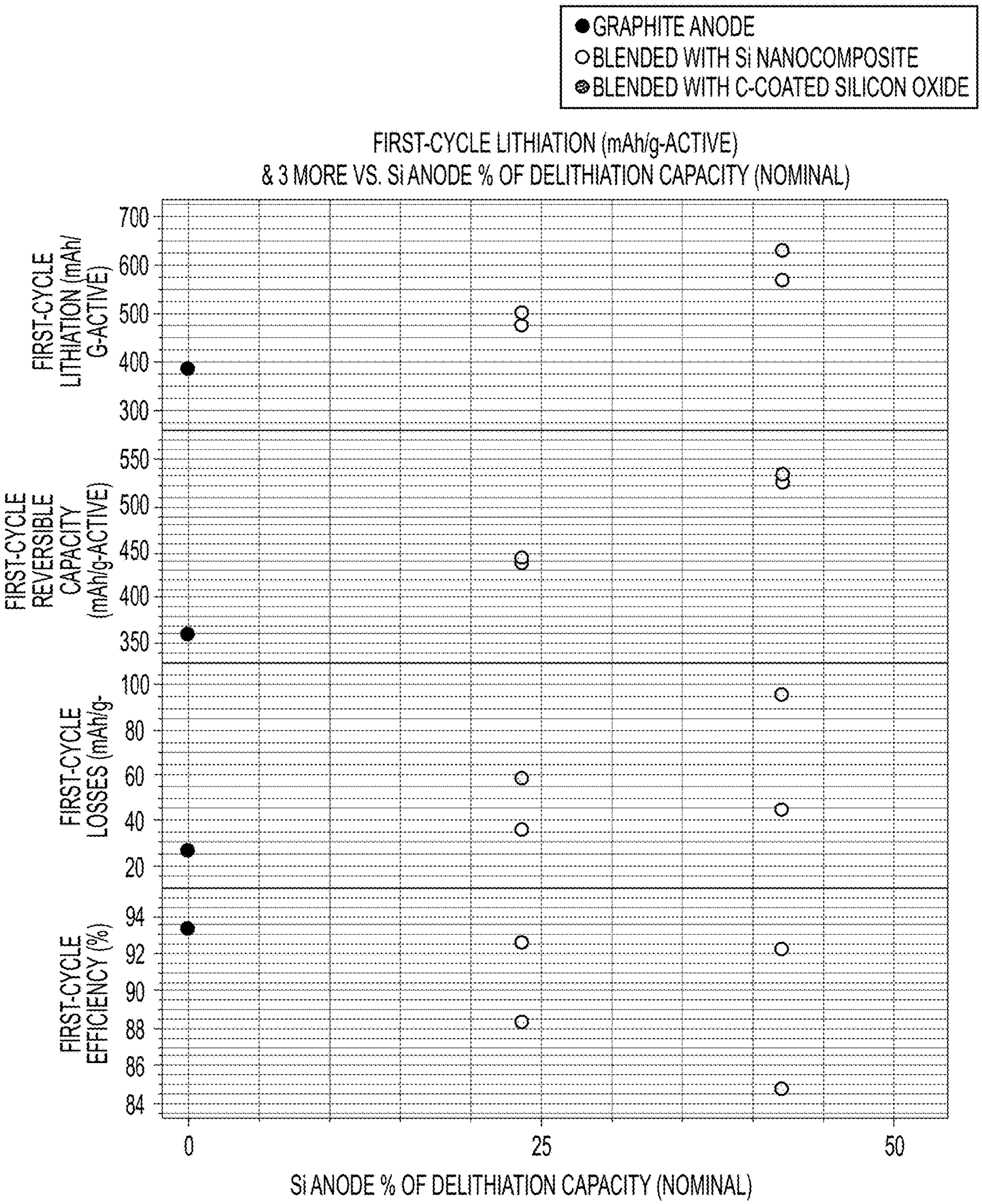

FIG. 5A illustrates exemplary selected performance characteristics (first cycle lithiation capacity, delithiation capacity, first cycle losses and first cycle coulombic efficiency) of a graphite anode vs that of the blended anodes with different % of total capacity contributed by Si-comprising particles: porous core-shell silicon-comprising nanocomposite powder or carbon-coated silicon oxide powder, having the microstructures, chemistries and characteristics as described in aspects of the present disclosure. The blended anodes comprised CMC and SBR blended binder.

Figure 5B:
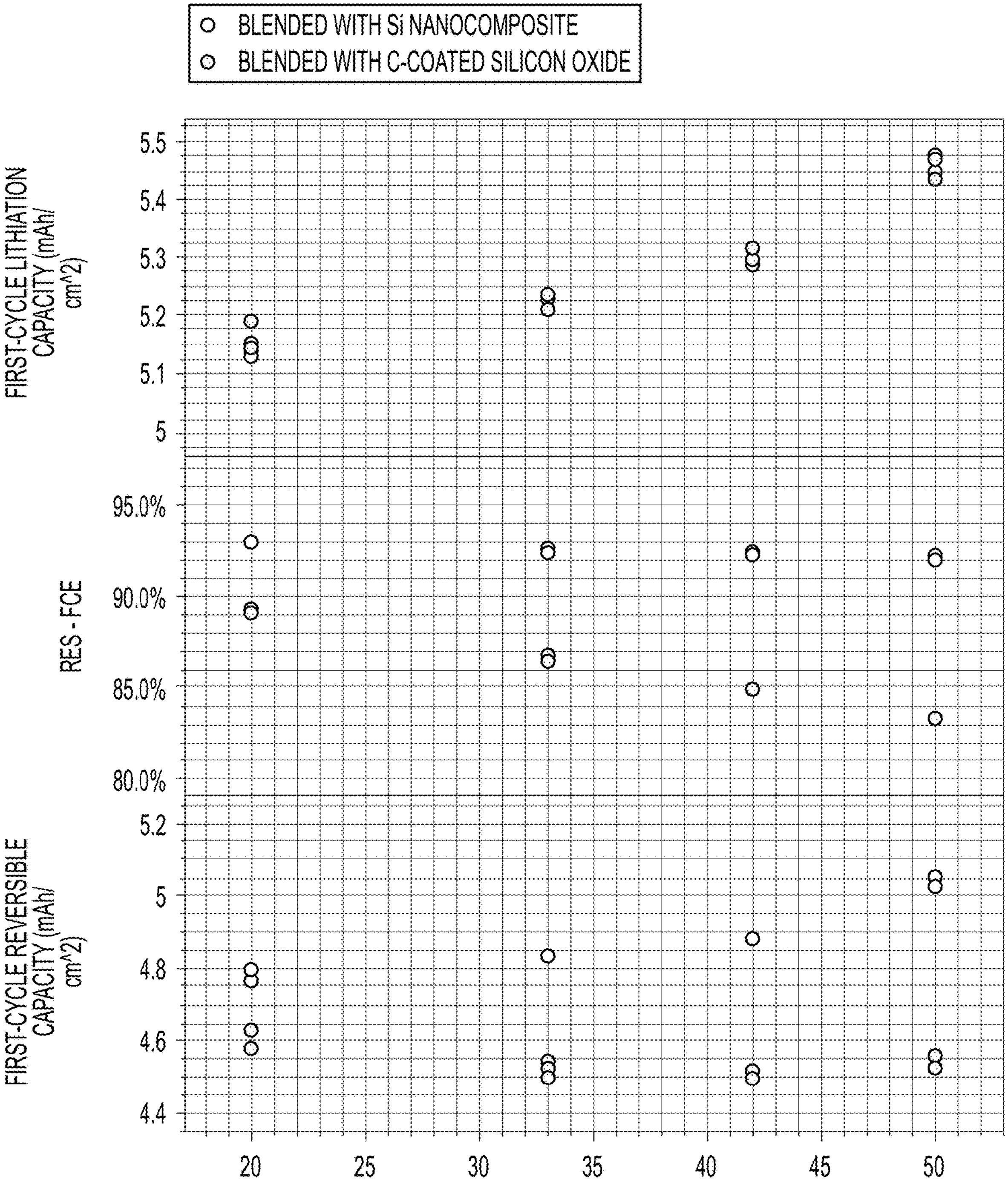

FIG. 5B illustrates exemplary selected performance characteristics (first cycle areal lithiation capacity, first cycle coulombic efficiency, first cycle areal reversible capacity) of a graphite anode vs that of the blended anodes with different % of total capacity contributed by Si-comprising particles: porous core-shell silicon-comprising nanocomposite powder or carbon-coated silicon oxide powder, having the microstructures, chemistries and characteristics as described in this disclosure. The blended anodes comprised CMC and SBR blended binder and no conductive additives. The active materials contributed up to ~97 wt. % of the blended anodes (not considering the weight of the Cu current collector foil).

Figure 6:
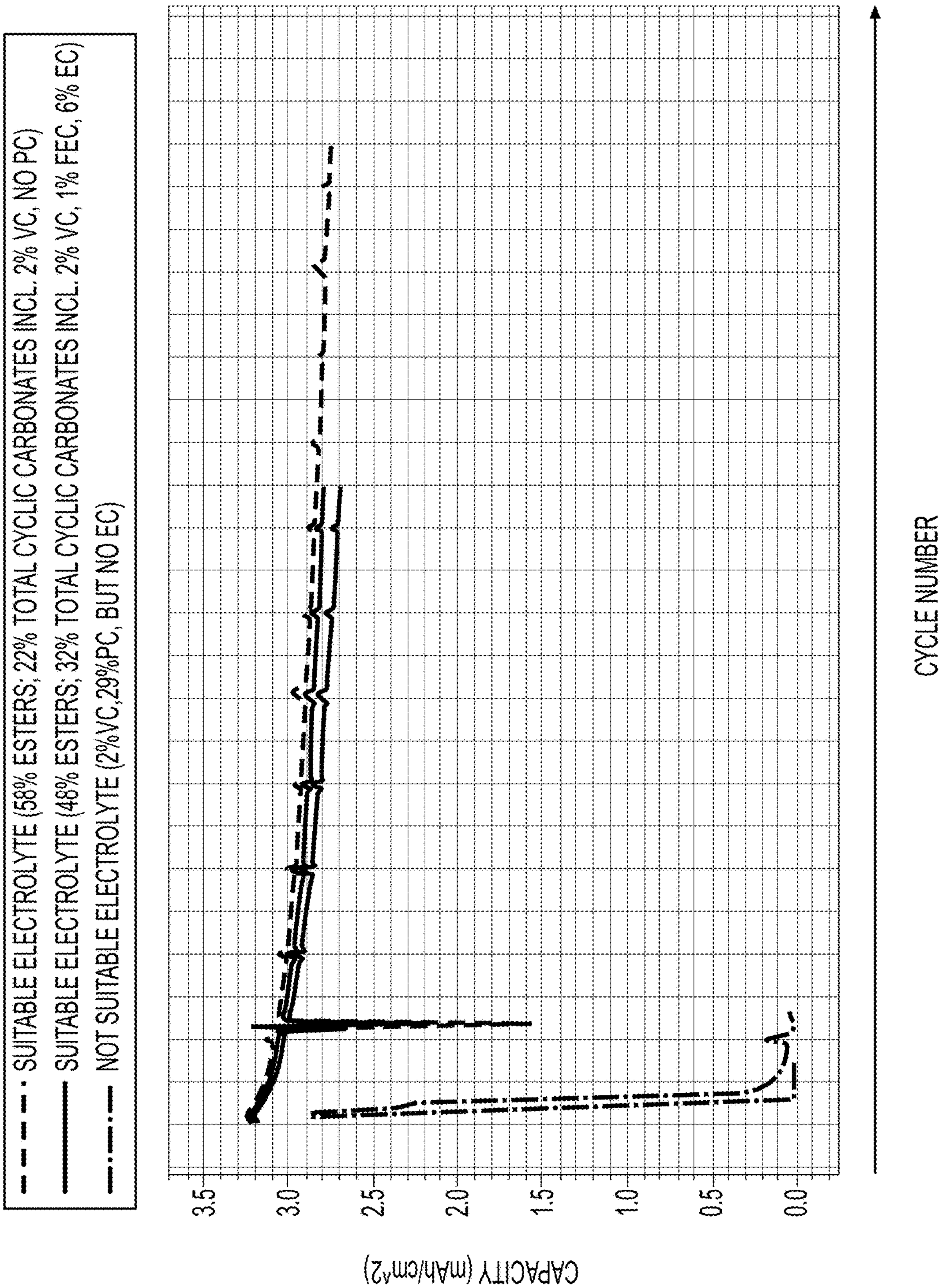

FIG. 6 illustrates cycle stability of exemplary full cells based on LCO cathodes and blended anode with CMC and SBR blended binder, carbon nanotubes' conductive additives and with ~42% capacity provided by Si-containing nanocomposite particles of suitable composition and properties (the rest provided by graphite) in three $LiPF_6$-based electrolytes: two suitable and one not suitable. The unsuitable electrolyte comprised a significant fraction of PC co-solvent (29 vol. %) and no EC. The suitable electrolytes comprised VC or EC or both and high-volume fractions of ester co-solvents (58 vol. % or 48 vol. %, respectfully). These ester co-solvent molecules had an average of 5 carbon atoms per molecule. These cells were built having moderate capacity loadings (3-3.5 $mAh/cm^2$ reversible) and cycled (repeatedly charged and discharged) within 2.5-4.4 V at ~C/2 rates.

Figure 7A:
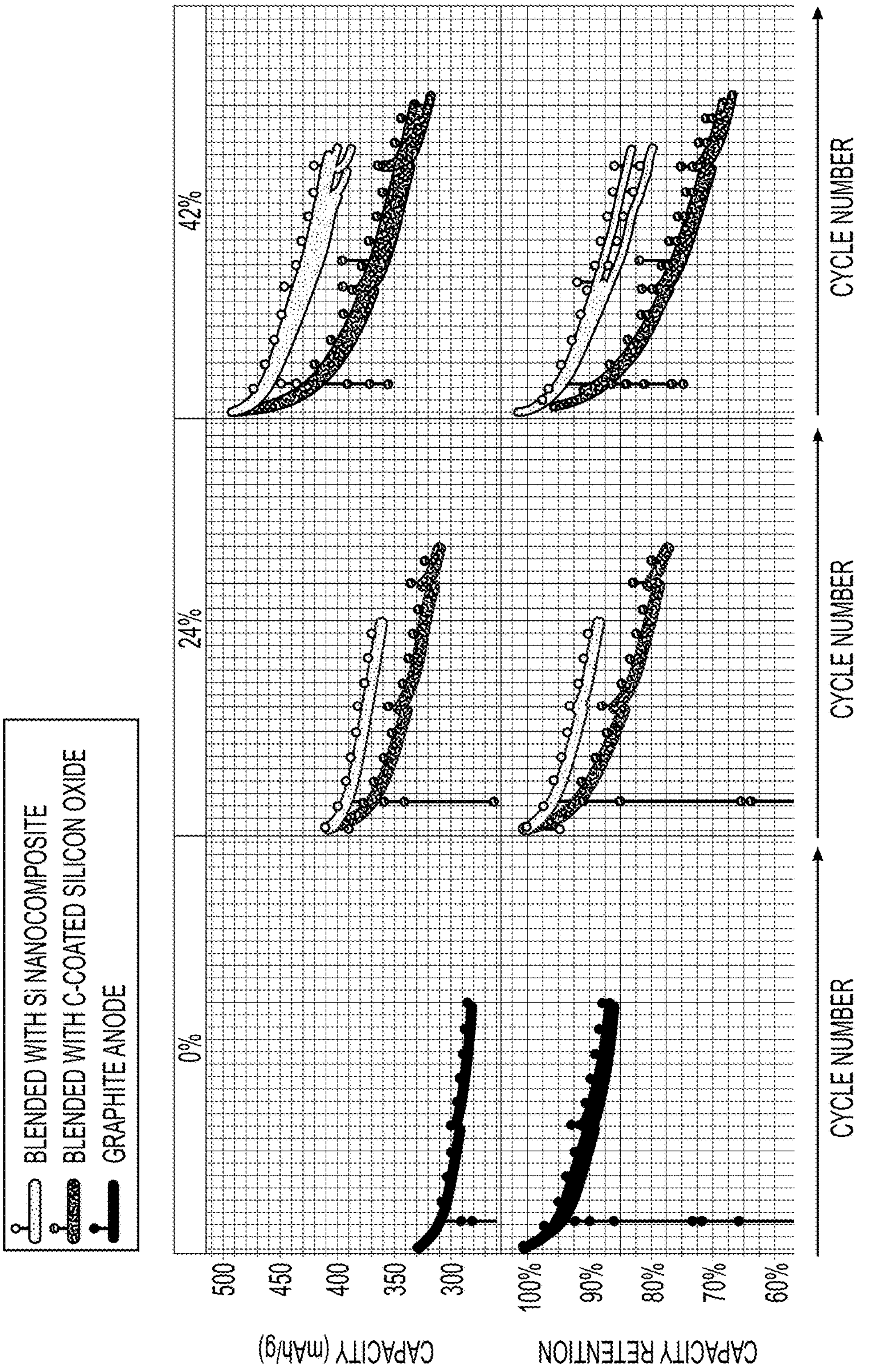

FIG. 7A illustrates capacity and capacity retention of exemplary full cells based on layered intercalation-type cathode (LCO) and either intercalation-type anode (graphite) or blended anodes with 24% and 42% anode areal capacity provided either by core-shell Si-containing porous nanocomposite particles of suitable composition and properties or carbon-coated silicon oxide ($SiO_x$) particles. Superior cycle stability (only slightly inferior to graphite anode) was demonstrated in a blended anode with the suitable Si-based porous nanocomposite particles. In some designs, even better cycle stability could be attained if LCO is substituted with NCM or NCA cathodes, particularly Ni-rich cathodes.

Figure 7B:
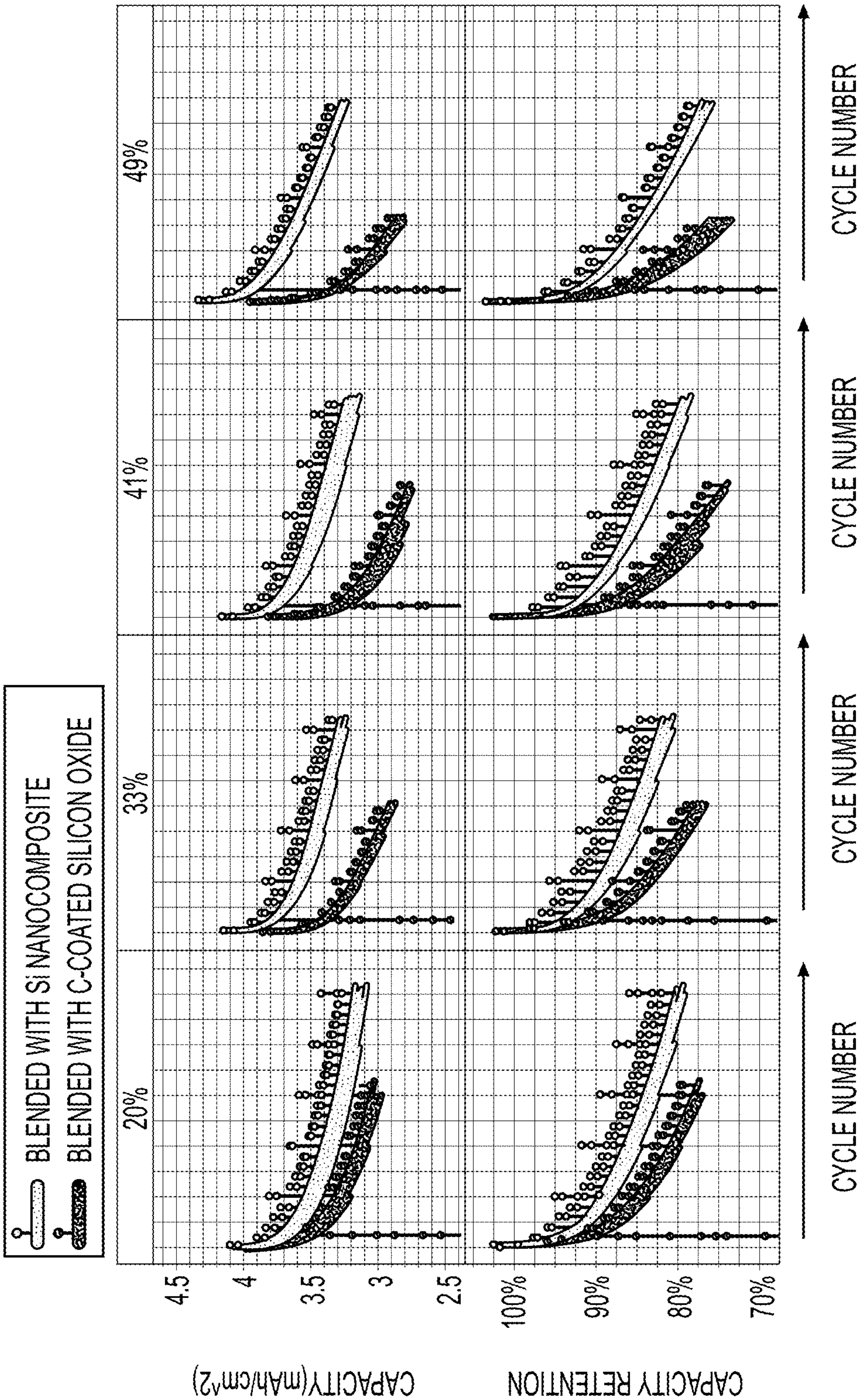

FIG. 7B illustrates areal capacity and capacity retention of exemplary full cells based on layered Ni-rich intercalation-type cathode (NCM-811) and blended anodes with 20%, 33%, 41% and 49% anode areal capacity provided either by core-shell Si-containing porous nanocomposite particles of suitable composition and properties or carbon-coated silicon oxide ($SiO_x$) particles. Superior cycle stability (only slightly inferior to graphite anode) was demonstrated in a blended anode with the suitable Si-based porous nanocomposite particles. Cell were cycled at C/2 rate in the voltage range of 2.5-4.2V.

Figure 8:
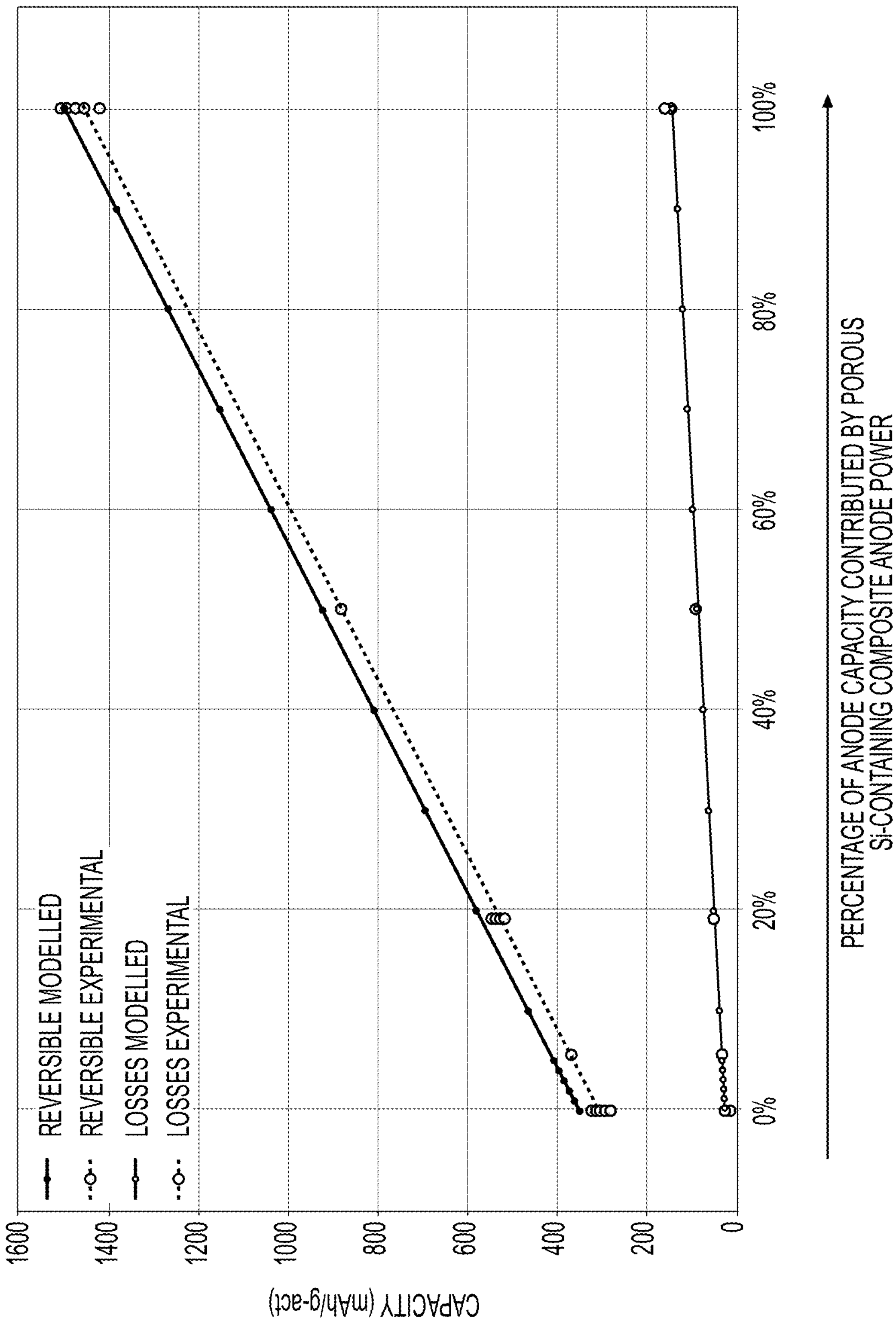

FIG. 8 illustrates an exemplary comparison of modeled vs. experimentally attained capacity & formation losses for exemplary anodes having different % of capacity contributed by Si-containing nanocomposite particles in the blended anodes (except for 0 and 100%, where the anode is either purely graphite-based or purely Si-containing nanocomposite-based).

In some designs, conversion-type anode material of the blended anode may exhibit one, two, or more or all of the following favorable characteristics, composition or properties: median specific reversible capacity in the range from about 1400 mAh/g to about 2200 mAh/g; first cycle coulombic efficiency in the range from about 88% to about 96%, from about 40 wt. % to about 60 wt. % Si in its composition, wherein the Si is present in the form of distributed Si nanoparticles having volume-averaged size in the range from about 2 nm to about 40 nm; a core-shell nanocomposite powder morphology; average thickness of the outer shell in the range from about 1 nm to about 20 nm; internal porosity with internal pores inaccessible to electrolyte in the assembled cell with the pore volume ranging from about 0.1 to about 1 $cm^3/g$ and with average internal pore sizes ranging from about 1 nm to about 50 nm; average density in the range from about 1 to about 2 $g/cm^3$; specific surface area in the range from about 1 to about 25 $m^2/g$; less than about 2 wt. % oxygen (O); less than about 0.5 wt. % hydrogen (H); from about 6 wt. % to about 60 wt. % carbon (C), wherein the properties of such a carbon are such that the ratio of intensities of Raman D-band to Raman G-band ($I_D/I_G$) is in the range from about 0.7 to about 2 when recorded on a conversion-type anode material powder using a Raman spectrometer equipped with a laser operating at a wavelength of around 532 nm; a core-shell structure, wherein the shell comprises $sp^2$-bonded carbon.

In some designs, the blended anode may exhibit one, two, or more or all of the following favorable characteristics, composition or properties: a gravimetric capacity (not counting the weight of the current collector foil) in the range from about 400 mAh/g to about 1200 mAh/g; reversible areal capacity in the range from about 3 to about 4.5 $mAh/cm^2$ (e.g., for electronic devices) or from about 4.5 to about 8 $mAh/cm^2$ (e.g., for electric vehicles); comprise at least one of the following: soft carbon, hard carbon, synthesis (or artificial) graphite, natural graphite; a density (not counting the weight of the current collector) in the range from about 1.2 $g/cm^3$ to about 1.8 $g/cm^3$; comprise from about 2 wt. % to about 7 wt. % of the polymer or co-polymer binder (not counting the weight of the current collector); comprise at least one of the following polymers or co-polymers in the binder: PAA or its salts, CMC, alginic acid of its salts, SBR.

In some designs, the Li-ion battery cell with the suitable blended anode may comprise intercalation-type cathode material comprising at least one of the following transition metals: Ni, Co, Mn, Fe. In some designs, such cathodes may comprise LCO, NCM, NCA, LMO, NCMA and related cathode materials. In other designs, such cathodes may comprise LFP, LFMP, other olivine-type and related cathode materials.

In one illustrative example, a Li-ion battery cell is disclosed comprising the following: (a) porous blended anode of suitable composition (e.g., a blend of graphite(s) or soft carbon(s) with Si-comprising active material, as described above) and properties exhibiting specific capacity (accounting for the mass and volume of all active materials, conductive additives and the binder, but not counting the weight and volume of the current collector) in the range from about 380 mAh/g to about 800 mAh/g, areal reversible capacity loading in the range from about 3 $mAh/cm^2$ to about 6.5 $mAh/cm^2$, and porosity in the range from about 15 vol. % to about 50 vol. %; (b) porous intercalation-type cathode (such as LCO, NCM, NCA, NCMA, LMO, LFP, LMFP, etc. or their mixture) exhibiting specific capacity (accounting for the weight and volume of all active materials, conductive additive and the binder, but not counting the weight and volume of the current collector) in the range from about 150 mAh/g to about 240 mAh/g, areal reversible capacity loading in the range from about 2.7 $mAh/cm^2$ to about 6.0 $mAh/cm^2$, and porosity in the range from about 10 vol. % to about 30 vol. %; (c) a porous separator comprising both ceramic (such as aluminum oxide or magnesium oxide, in some examples) and polymer components, total thickness in the range from about 5 micron to about 15 micron and total porosity in the range from about 30 vol. % to about vol. 75% (when compressed in a stacked or rolled cell); (d) liquid electrolyte infiltrating the porous anode, separator and cathode, wherein the electrolyte comprises from about 1M to about 1.6M concentration of Li salts (such as $LiPF_6$, LFO, $LiNO_3$, LiFSI, LiTFSI, etc. or their mixture) dissolved in a mixture of (i) one, two, three or more nitriles in the amount from about 0.1 vol. % to about 2 vol. % in total (e.g., added to improve stability of the cathode), (ii) one, two, three or more esters (such as ethyl isobutyrate, methyl isovalerate, isopropyl propionate, isobutyl acetate, isoamyl formate, methyl valerate, ethyl butyrate, propyl propionate, etc. or their mixture) in the amount from about 60 vol. % to about 92 vol. % in total, (iii) one, two, three or more cyclic carbonates (such as FEC, VC, VEC, PC, EC, etc. or their mixture) in the amount from about 6 vol. % to about 39.9 vol. % in total; wherein the total Li-ion battery cell capacity ranges from about 1.5 Ah to about 150 Ah. In this particular illustrative example electrolyte comprises little (e.g., about 0-10 vol. %) or no linear or branched carbonates. In case of LCO cathodes, the cell may be charged, for example, to about 4.4-4.5V. In case of NCA or NCM or NCMA cathodes, the cell may be charged, for example, to about 4.2-4.35V.

In some designs, the electrolyte used in the Li-ion battery cells with the suitable blended anode may advantageously comprise both esters (such as linear or branched esters or their various combinations) as LMP co-solvent(s) and cyclic carbonates (among other co-solvents). In some designs, the esters may advantageously (e.g., for improved stability of the anode SEI and longer cycle stability) be primarily (or solely) branched esters. In some designs, the volume fraction of esters (e.g., branched esters or a mixture of branched and linear esters) may advantageously range from about 20 vol. % to about 90 vol. % as a fraction of all the solvents in the electrolyte. In some designs, the esters (e.g., branched esters or a mixture of linear and branched esters, etc.) molecules may have on average between around 5 and around 7 carbon (C) atoms per molecule. In some designs, such electrolyte mixtures may additionally comprise nitrile additives.

This description is provided to enable any person skilled in the art to make or use embodiments of the present invention. It will be appreciated, however, that the present invention is not limited to the particular formulations, process steps, and materials disclosed herein, as various modifications to these embodiments will be readily apparent to those skilled in the art. That is, the generic principles defined herein may be applied to other embodiments without departing from the spirit or scope of the invention.

The invention claimed is:

1. A Li-ion battery, comprising:

an anode electrode and a cathode electrode;

an electrolyte ionically coupling the anode electrode and the cathode electrode; and a separator electrically separating the anode electrode and the cathode electrode;

wherein the anode electrode comprises a mixture of conversion-type anode material-comprising composite particles and intercalation-type anode material-comprising particles, wherein the intercalation-type anode material-comprising particles are separate from the conversion-type anode material-comprising composite particles in the mixture, wherein the conversion-type anode material-comprising composite particles each comprise a porous, electrically-conductive, scaffolding matrix material that includes one or more internal pores in which conversion-type anode material particles are disposed, wherein the conversion-type anode material-comprising composite particles are outside of any internal pores present in the intercalation-type anode material-comprising particles, wherein the conversion-type anode material-comprising composite particles exhibit median specific reversible capacity in the range from 1400 mAh/g to 2800 mAh/g, wherein the conversion-type anode material-comprising composite particles exhibit first cycle coulombic efficiency in the range from 88% to 96%, and wherein (a) a ratio of intensities of Raman D-band to Raman G-band ($I_D/I_G$) is in the range from 1.0 to 2.7 and (b) a full width at half maximum (FWHM) of the Raman G-band is in a range of 50 to 150 $cm^1$, when recorded on the conversion-type anode material-comprising composite particles while arranged as a powder using a Raman spectrometer equipped with a laser operating at a wavelength of around 532 nm.

2. The Li-ion battery of claim 1, wherein the conversion-type anode material-comprising composite particles comprise from 40 wt. % to 60 wt. % Si.

3. The Li-ion battery of claim 1, wherein the conversion-type anode material-comprising composite particles comprise a core-shell nanocomposite particle.

4. The Li-ion battery of claim 3, wherein an average thickness of an outer shell in the core-shell nanocomposite particle ranges from 1 nm to 20 nm.

5. The Li-ion battery of claim 1, wherein the conversion-type anode material-comprising composite particles comprise one or more internal pores inaccessible to the electrolyte.

6. The Li-ion battery of claim 5, wherein a volume of the one or more internal pores ranges from 0.1 to 1 $cm^3/g$.

7. The Li-ion battery of claim 5, wherein an average size of the one or more internal pores ranges from 1 nm to 50 nm.

8. The Li-ion battery of claim 1, wherein the conversion-type anode material-comprising composite particles exhibit density in the range from 1 to 2 $g/cm^3$.

9. The Li-ion battery of claim 1, wherein the conversion-type anode material-comprising composite particles exhibit specific surface area in the range from 1 to 25 $m^2/g$.

10. The Li-ion battery of claim 1, wherein the conversion-type anode material-comprising composite particles comprise Si-comprising nanoparticles having volume-averaged size in the range from 2 nm to 40 nm.

11. The Li-ion battery of claim 1, wherein the conversion-type anode material-comprising composite particles comprise less than 2 wt. % oxygen (O).

12. The Li-ion battery of claim 1, wherein the conversion-type anode material-comprising composite particles comprise less than 0.5 wt. % hydrogen (H).

13. The Li-ion battery of claim 1, wherein the conversion-type anode material-comprising composite particles comprise from 6 wt. % to 60 wt. % carbon (C).

14. The Li-ion battery of claim 13, wherein the conversion-type anode material-comprising composite particles exhibit a core-shell structure, wherein a shell of the core-shell structure comprises $sp^2$-bonded carbon.

15. The Li-ion battery of claim 1, wherein the anode electrode, excluding any current collector foil component, exhibits a gravimetric capacity in the range from 400 mAh/g to 1200 mAh/g.

16. The Li-ion battery of claim 1, wherein the anode electrode, the cathode electrode, or both, exhibit reversible areal capacity in the range from 3 to 4.5 $mAh/cm^2$ or from 4.5 to 8 $mAh/cm^2$.

17. The Li-ion battery of claim 1, wherein the intercalation-type anode material-comprising particles comprise soft carbon, hard carbon, synthetic graphite, and/or natural graphite.

18. The Li-ion battery of claim 1, wherein the anode electrode, excluding any current collector foil component, exhibits a density in the range from 1.2 $g/cm^3$ to 1.8 $g/cm^3$.

19. The Li-ion battery of claim 1, wherein the anode electrode comprises a polymer or co-polymer binder.

20. The Li-ion battery of claim 19, wherein the anode electrode, excluding any current collector foil component, comprises from 2 wt. % to 7 wt. % of the polymer or co-polymer binder.

21. The Li-ion battery of claim 19, wherein the polymer or co-polymer binder comprises alginic acid or its salts, polyacrylic acid (PAA) or its salts, carboxymethyl cellulose (CMC), styrene-butadiene rubber (SBR), or a combination thereof.

22. The Li-ion battery of claim 1, wherein the cathode electrode comprises intercalation-type cathode material-comprising particles that include Ni, Co, Mn, Fe, or a combination thereof.

23. The Li-ion battery of claim 1, wherein the electrolyte comprises both one or more esters and one or more cyclic carbonates.

24. The Li-ion battery of claim 23, wherein a volume fraction of the one or more esters ranges from 20 vol. % to 90 vol. % as a fraction of all solvents in the electrolyte.

25. The Li-ion battery of claim 23, wherein the one or more esters comprise one or more branched esters, and wherein the one or more branched esters comprise ester molecules that have on average between around 5 and around 7 carbon (C) atoms per molecule.

26. The Li-ion battery of claim 1, wherein the FWHM of the Raman G-band is in a range of 50 to 100 $cm^{-1}$, when recorded on the conversion-type anode material-comprising composite particles while arranged as a powder using a Raman spectrometer equipped with a laser operating at a wavelength of around 532 nm.

* * * * *